United States Patent
Renner et al.

(10) Patent No.: US 11,595,520 B2
(45) Date of Patent: Feb. 28, 2023

(54) CONFERENCE CALLS AND MEETINGS VIA ELECTRONIC MESSAGING INTERFACE

(71) Applicant: Verizon Patent and Licensing Inc., Basking Ridge, NJ (US)

(72) Inventors: W. Karl Renner, Great Falls, VA (US); Stephen Vaughan Murphy, Ashburn, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 17/192,001

(22) Filed: Mar. 4, 2021

(65) Prior Publication Data
US 2021/0195019 A1 Jun. 24, 2021

Related U.S. Application Data

(63) Continuation of application No. 16/685,828, filed on Nov. 15, 2019, now Pat. No. 10,979,564, which is a
(Continued)

(51) Int. Cl.
*H04M 3/42* (2006.01)
*H04M 3/56* (2006.01)
*H04M 7/00* (2006.01)

(52) U.S. Cl.
CPC ....... *H04M 3/42365* (2013.01); *H04M 3/563* (2013.01); *H04M 7/0045* (2013.01);
(Continued)

(58) Field of Classification Search
CPC .......... H04M 3/42365; H04M 3/563; H04M 7/0045; H04M 2201/42; H04M 2203/5054; H04M 2203/5063
(Continued)

(56) References Cited

U.S. PATENT DOCUMENTS 4,977,520 A 12/1990 McGaughey et al.
4,995,074 A 2/1991 Goldman et al.
(Continued)

FOREIGN PATENT DOCUMENTS

EP 1071295 A2 1/2001
EP 1309164 5/2003
(Continued)

OTHER PUBLICATIONS

Rochelle Communications, Inc., Caller ID Business Solutions, Model ANI-232: Product Overview, Dec. 27, 2002; http://www.rochellecti.com/pani232e.php, 1 page.
(Continued)

*Primary Examiner* — Ahmad F. Matar
*Assistant Examiner* — Jirapon Intavong

(57) ABSTRACT

Initiating a conference call includes receiving a conference call request message from an initiating user specifying a plurality of other users and determining an availability of the other users to receive conference call invitations. A conference call is initiated between the initiating user and one or more of the other users that are determined to be available. The availability of one or more of the other users determined to be unavailable is monitored and interaction with a conference call invitation by one or more of the other users determined to be unavailable is enabled upon their monitored availability changing from unavailable to available. The interaction with the conference call invitation by the other users is conditioned on whether the conference call is still in progress.

20 Claims, 35 Drawing Sheets

Related U.S. Application Data continuation of application No. 13/617,934, filed on Sep. 14, 2012, now Pat. No. 10,530,926, which is a continuation of application No. 11/298,981, filed on Dec. 12, 2005, now Pat. No. 8,358,762.

(60) Provisional application No. 60/663,266, filed on Mar. 21, 2005.

(52) U.S. Cl.
CPC ........ *H04M 3/565* (2013.01); *H04M 2201/42* (2013.01); *H04M 2203/5054* (2013.01); *H04M 2203/5063* (2013.01)

(58) Field of Classification Search
USPC .................................................. 379/202.01
See application file for complete search history.

(56) References Cited

U.S. PATENT DOCUMENTS

| | | |
|---|---|---|
| 5,099,346 A | 3/1992 | Lee et al. |
| 5,197,000 A * | 3/1993 | Vincent ................ G06Q 10/109 |
| | | 705/7.19 |
| 5,197,092 A | 3/1993 | Bamburak |
| 5,329,578 A | 7/1994 | Brennan et al. |
| 5,375,161 A | 12/1994 | Fuller et al. |
| 5,408,526 A | 4/1995 | McFarland et al. |
| 5,455,851 A | 10/1995 | Chaco et al. |
| 5,537,467 A | 7/1996 | Cheng et al. |
| 5,548,836 A | 8/1996 | Banniser et al. |
| 5,557,659 A | 9/1996 | Hyde-Thomson |
| 5,625,676 A | 4/1997 | Greco et al. |
| 5,631,904 A | 5/1997 | Fitser et al. |
| 5,646,982 A | 7/1997 | Hogan et al. |
| 5,651,054 A | 7/1997 | Dunn et al. |
| 5,668,862 A | 9/1997 | Bannister et al. |
| 5,684,868 A | 11/1997 | Alexander |
| 5,703,941 A | 12/1997 | Nakajima et al. |
| 5,703,943 A | 12/1997 | Otto |
| 5,771,280 A | 6/1998 | Johnson |
| 5,805,587 A | 9/1998 | Norris et al. |
| 5,809,128 A | 9/1998 | McMullin |
| 5,812,653 A | 9/1998 | Jodoin et al. |
| 5,841,966 A | 11/1998 | Irribarren |
| 5,848,134 A | 12/1998 | Sekiguchi et al. |
| 5,894,504 A | 4/1999 | Alfred et al. |
| 5,933,477 A | 8/1999 | Wu |
| 5,949,414 A | 9/1999 | Namikata et al. |
| 6,016,478 A * | 1/2000 | Zhang ............... G06Q 10/06314 |
| | | 705/7.19 |
| 6,067,561 A | 5/2000 | Dillon |
| 6,115,455 A | 9/2000 | Picard |
| 6,144,644 A | 11/2000 | Bajzath et al. |
| 6,175,859 B1 | 1/2001 | Mohler |
| 6,208,996 B1 | 3/2001 | Ben-Shachar et al. |
| 6,215,857 B1 | 4/2001 | Kasiviswanathan |
| 6,282,275 B1 | 8/2001 | Gurbani et al. |
| 6,295,341 B1 | 9/2001 | Muller |
| 6,301,609 B1 | 10/2001 | Aravamudan et al. |
| 6,311,231 B1 | 10/2001 | Bateman et al. |
| 6,356,633 B1 | 3/2002 | Armstrong |
| 6,366,661 B1 | 4/2002 | Devillier et al. |
| 6,373,836 B1 | 4/2002 | Deryugin et al. |
| 6,377,668 B1 | 4/2002 | Smock et al. |
| 6,389,007 B1 | 5/2002 | Shenkman et al. |
| 6,404,747 B1 | 6/2002 | Berry et al. |
| 6,421,425 B1 | 7/2002 | Bossi et al. |
| 6,430,289 B1 | 8/2002 | Liffick |
| 6,430,604 B1 | 8/2002 | Ogle et al. |
| 6,453,164 B1 | 9/2002 | Fuller et al. |
| 6,460,073 B1 | 10/2002 | Asakura |
| 6,463,038 B1 | 10/2002 | Wilson |
| 6,463,145 B1 | 10/2002 | O'Neal et al. |
| 6,477,246 B1 | 11/2002 | Dolan et al. |
| 6,496,501 B1 | 12/2002 | Rochkind et al. |
| 6,518,994 B1 | 2/2003 | Johnson et al. |
| 6,532,286 B1 | 3/2003 | Burg |
| 6,567,807 B1 | 5/2003 | Robles et al. |
| 6,574,599 B1 | 6/2003 | Lim et al. |
| 6,577,622 B1 | 6/2003 | Schuster et al. |
| 6,584,494 B1 | 6/2003 | Manabe et al. |
| 6,604,129 B2 | 8/2003 | Slutsman et al. |
| 6,618,747 B1 | 9/2003 | Flynn et al. |
| 6,631,399 B1 | 10/2003 | Stanczak et al. |
| 6,636,888 B1 | 10/2003 | Bookspan et al. |
| 6,671,365 B2 | 12/2003 | Kemppainen |
| 6,687,745 B1 | 2/2004 | Franco et al. |
| 6,697,824 B1 | 2/2004 | Bowman-Amuah |
| 6,700,966 B2 | 3/2004 | Takagi et al. |
| 6,721,784 B1 | 4/2004 | Leonard et al. |
| 6,732,103 B1 | 5/2004 | Strick et al. |
| 6,732,185 B1 | 5/2004 | Reistad |
| 6,738,461 B2 | 5/2004 | Trandal et al. |
| 6,775,378 B1 | 8/2004 | Villena et al. |
| 6,782,414 B1 | 8/2004 | Xue et al. |
| 6,854,007 B1 | 2/2005 | Hammond |
| 6,934,367 B1 | 8/2005 | LaPierre et al. |
| 6,987,847 B1 | 1/2006 | Murphy et al. |
| 6,999,566 B1 | 2/2006 | Eason et al. |
| 6,999,577 B2 | 2/2006 | Wang et al. |
| 7,007,067 B1 | 2/2006 | Azvine et al. |
| 7,133,506 B1 | 11/2006 | Smith |
| 7,167,552 B1 * | 1/2007 | Shaffer ............... H04L 12/1818 |
| | | 379/206.01 |
| 7,363,345 B2 | 4/2008 | Austin-Lane et al. |
| 7,412,050 B2 | 8/2008 | Renner et al. |
| 7,660,849 B1 | 2/2010 | Shaffer |
| 7,761,507 B2 | 7/2010 | Herf et al. |
| 10,051,106 B2 * | 8/2018 | Vendrow ............. H04M 7/0027 |
| 2001/0016823 A1 | 8/2001 | Richards et al. |
| 2001/0053213 A1 | 12/2001 | Truong et al. |
| 2002/0021307 A1 | 2/2002 | Glenn et al. |
| 2002/0032742 A1 | 3/2002 | Anderson |
| 2002/0034289 A1 | 3/2002 | Pershan |
| 2002/0075303 A1 * | 6/2002 | Thompson ........ H04M 3/42374 |
| | | 715/751 |
| 2002/0120687 A1 | 8/2002 | Diacakis et al. |
| 2002/0123328 A1 | 9/2002 | Snip et al. |
| 2002/0131565 A1 | 9/2002 | Scheuring et al. |
| 2002/0151294 A1 | 10/2002 | Kirby et al. |
| 2002/0160757 A1 | 10/2002 | Shavit et al. |
| 2002/0160805 A1 | 10/2002 | Laitinen et al. |
| 2002/0165729 A1 | 11/2002 | Kuebert et al. |
| 2003/0018704 A1 | 1/2003 | Polychronidis et al. |
| 2003/0023551 A1 | 1/2003 | Brown et al. |
| 2003/0046296 A1 | 3/2003 | Doss et al. |
| 2003/0052915 A1 | 3/2003 | Brown et al. |
| 2003/0053612 A1 | 3/2003 | Henrikson et al. |
| 2003/0055897 A1 | 3/2003 | Brown et al. |
| 2003/0105820 A1 | 6/2003 | Haims et al. |
| 2003/0131143 A1 | 7/2003 | Myers |
| 2003/0133558 A1 | 7/2003 | Kung et al. |
| 2003/0158902 A1 | 8/2003 | Volach |
| 2003/0208547 A1 | 11/2003 | Branimir |
| 2003/0227894 A1 | 12/2003 | Wang et al. |
| 2003/0233265 A1 | 12/2003 | Lee et al. |
| 2003/0233416 A1 | 12/2003 | Beyda |
| 2004/0010808 A1 | 1/2004 | deCarmo |
| 2004/0019645 A1 | 1/2004 | Goodman et al. |
| 2004/0039630 A1 | 2/2004 | Begole et al. |
| 2004/0078440 A1 | 4/2004 | Potter et al. |
| 2004/0161090 A1 | 8/2004 | Digate et al. |
| 2004/0203766 A1 | 10/2004 | Jenniges et al. |
| 2005/0031110 A1 | 2/2005 | Haimovich et al. |
| 2005/0034079 A1 | 2/2005 | Gunasekar et al. |
| 2005/0071427 A1 | 3/2005 | Dorner et al. |
| 2005/0102245 A1 | 5/2005 | Edlund et al. |
| 2005/0152523 A1 | 7/2005 | Fellenstein et al. |
| 2005/0198321 A1 * | 9/2005 | Blohm .................. G06Q 10/00 |
| | | 709/228 |
| 2006/0136422 A1 | 6/2006 | Matveief |
| 2006/0164508 A1 | 7/2006 | Eshkoli et al. |

(56) References Cited

U.S. PATENT DOCUMENTS

| | | |
|---|---|---|
| 2006/0239212 A1 | 10/2006 | Pirzada |
| 2007/0081651 A1 | 4/2007 | Iyer |
| 2008/0270211 A1 | 10/2008 | Vander Veen |

FOREIGN PATENT DOCUMENTS

| | | |
|---|---|---|
| WO | WO 00/60809 | 10/2000 |
| WO | WO 02/25907 | 3/2002 |

OTHER PUBLICATIONS

Openwave Systems, Inc., "Openwave™ United Messaging", Part No. DSUM-RI-004, Oct. 2001, 2 pages.
Rick James: "FINALLY1 Interactive 'Call Waiting' While You're Surfing?", Internet Document, [Online], pp. 1-4, Retrieved from the Internet: www.monitor.ca/monitor/issues/vol4iss12/feature7.html, [retrieved on Sep. 2, 2004].
Supplementary European Search Report, PCT/US2004/032435, dated May 4, 2007, 3 pages.
Supplementary European Search Report, PCT/US2004/023383, dates May 4, 2007, 3 pages.
Anonymous: "Does the Internet Have Call Waiting?", Internet Document, [Online] Copyright 2002, Tech TV, Inc., pp. 1-2. Retrieved from the Internet: www.techtv.com/screensavers/print/0.023102.2256423.00.html, [retrieved on Oct. 2, 2002].
Anonymous: "Did Someone Just Call You?", Internet Document, [Online] Copyright 2002, CallWave, Inc., p. 1, Retrieved from the Internet: www.callwave.com, [retrieved on Oct. 2, 2002].
Anonymous: "Internet Answering Machine™ Software", Internet Document, [Online] Copyright 2002, CallWave, Inc. pp. 1-2, [Retrieved from the Internet: www.callwave.com/lindoutmore.asp?ct=hpt_fom, Oct. 2, 2002].
Microservices: CommWorks Find Me—Follow Me Application; Dec. 11, 2002, commworks.com; pp. 1-2.
Microservices: CommWorks Message Alert System; Dec. 11, 2002; commworks.com; pp. 1-3.
Microservices: ComnWorks Messsge Delivery System, Dec. 11, 2002; commworks.com; pp. 1-2.
Commorks 8250 Personal Communications Managersent System; Dec. 11, 2002: commworks.com; pp. 1-2.
CommWorks IP Messaging; Dec. 11, 2002; commworks.com; pp. 1-2.
WebleySystems: CommuniKate Unitied Communications Features List; Dec. 11, 2002; webley.com; pp. 1-3.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions: Nov. 6, 2002; upoc.com; pp. 1-6.
Microsoft Press Pass; Nov. 7, 2002; microsoft.com; pp. 1-9.
Adeptta, Features; Nov. 27, 2002, adeptre.com; pp. 1-2.
Solutions Smartdelivery; Nov. 6, 2002; centerpost.com; pp. 1-2.
Net Alerts Overview; Nov. 7, 2002; microsoft.com; pp. 1-3.
Adeptra Services Overview; Nov. 7, 2002; adsptra.com; pp. 1-7.
Ipipi Frequently Asked Questions: Nov. 6, 2002; ipipi.com: pp. 1-2.
Ozmosys Enterprise; Nov. 7, 2002; ozmosys.com; pp. 1-3.
Teraltech; Nov. 7, 2002: teraitech.com; 1 page.
Global Solutions Directory: Nov. 7, 2002; software.ibm.com; pp. 1-5.
Convergys Interactive Alerts Reduce Customer Care Costs and Improve Customer Satisfaction; convergys.com; pp. 1-2, Jan. 22, 2002.
Upside, About Our Product: upsideweb.com; pp. 1-5, Nov. 6, 2002.
International Search Report, PCT/US03/26762, dated Apr. 18, 2004.
International Search Report, Application No. PCT/US04/23383, dated Mar. 28, 2005.
International Search Report, Application No. PCT/US04/32435, dated Apr. 7, 2005.

* cited by examiner

900

```
MANUAL DIAL-IN INFORMATION

YOU HAVE ACCEPTED THE CONFERENCE CALL INVITATION.

THE CONFERENCE CALL CONNECTION NUMBER IS:
1-888-999-9999

YOUR IDENTITY PASSCODE IS:
U78925

THE CONFERENCE CALL HAS BEEN IN PROGRESS FOR:
0 MINUTES 24 SECONDS.

THE EXPECTED CONFERENCE CALL DURATION IS:
30 MINUTES
```

MANUAL DIAL-IN INFORMATION

YOU HAVE REJECTED THE CONFERENCE CALL INVITATION.
HOWEVER, YOU MAY STILL JOIN THE CONFERENCE CALL BY
MANUALLY DIALING IN WHILE THE CALL IS IN PROGRESS.

THE CONFERENCE CALL CONNECTION NUMBER IS:
1-888-999-9999

YOUR IDENTITY PASSCODE IS:
U78925

THE CONFERENCE CALL HAS BEEN IN PROGRESS FOR:
12 MINUTES 24 SECONDS.

THE EXPECTED CONFERENCE CALL DURATION IS:
30 MINUTES

┌─────────────────────────────────────────────────────────┐
│ CONFERENCE CALL INVITATION                              │
├─────────────────────────────────────────────────────────┤
│                                                         │
│           YOU HAVE RECEIVED A CONFERENCE                │
│               CALL INVITATION FROM                      │
│                                                         │
│           ┌─────────────────────────────┐               │
│           │        BOB DEVANE           │               │
│           │       (703)123-4567         │               │
│           │        DULLES, VA           │               │
│           │     5:45 EDT - 05/17/02     │               │
│           └─────────────────────────────┘               │
│                                                         │
│           THE TOPIC OF THE CONFERENCE CALL IS:          │
│           "REVIEW PARODI PROJECT PROGRESS"              │
│                                                         │
│           THIS CONFERENCE CALL IS DIRECTED TO:          │
│           THE ULTRASOUND HARDWARE GROUP                 │
│           AND IS EXPECTED TO LAST 30 MINUTES            │
│               WHAT WOULD YOU LIKE TO DO?                │
│                                                         │
│        ( JOIN THE CONFERENCE CALL AS AN ACTIVE PARTICIPANT ) │
│                                                         │
│        (  JOIN THE CONFERENCE CALL AS A LISTENER  )     │
│                                                         │
│        (    DO NOT JOIN THE CONFERENCE CALL    )        │
│                                                         │
│     ┌─────────────────────────────────────────────────┐ │
│     │ ☒ SEND A MESSAGE TO OTHER POTENTIAL CONFERENCE  │ │
│     │         CALL PARTICIPANTS                       │ │
│     │ ☒ JOIN CONFERENCE CALL OVER TELEPHONE NETWORK   │ │
│     │ ☐ JOIN CONFERENCE CALL OVER INTERNET            │ │
│     │ ☐ JOIN CONFERENCE CALL BY MANUALLY DIALING IN   │ │
│     └─────────────────────────────────────────────────┘ │
└─────────────────────────────────────────────────────────┘
```

CONFERENCE CALL MANAGEMENT

THE TOPIC OF THE CONFERENCE CALL IS "REVIEW PARODI PROJECT PROGRESS".

THIS CONFERENCE CALL IS DIRECTED TO THE ULTRASOUND HARDWARE GROUP AND IS EXPECTED TO LAST 30 MINUTES.

WHAT WOULD YOU LIKE TO DO?

- CANCEL THE CONFERENCE CALL
- RESCHEDULE THE CONFERENCE CALL

CONFERENCE CALL STATUS

| INVITEE | STATUS? |
|---|---|
| MARKUS5 | ACTIVE |
| DEVOPAR | ACTIVE |
| SORNSO | |
| DOORST | |
| ARGUSB | |
| BOTSME | |
| FURORP | |

CONFERENCE CALL INVITEE CHAT

MARKUS5: WANT TO TALK ABOUT THIRD MILESTONE.

DEVOPAR: JOHN IS WITH ME AND WILL JOIN THE CALL

SORNSORPENTOR: CAN'T MAKE IT, HAVE CUSTOMER AT 6PM

BOBDEVANE123: LET'S TRY TO WRAP THIS UP IN 30 MINUTES.

ONLINE CALL INVITEES

DOORSTYP
MARKUS5
DEVOPAR
SORNSORPENTOR
BOTSMEMBER
ARGUSBILL6
FURORPLANED

CALL INITIATOR
BOBDEVANE123

FIG. 14

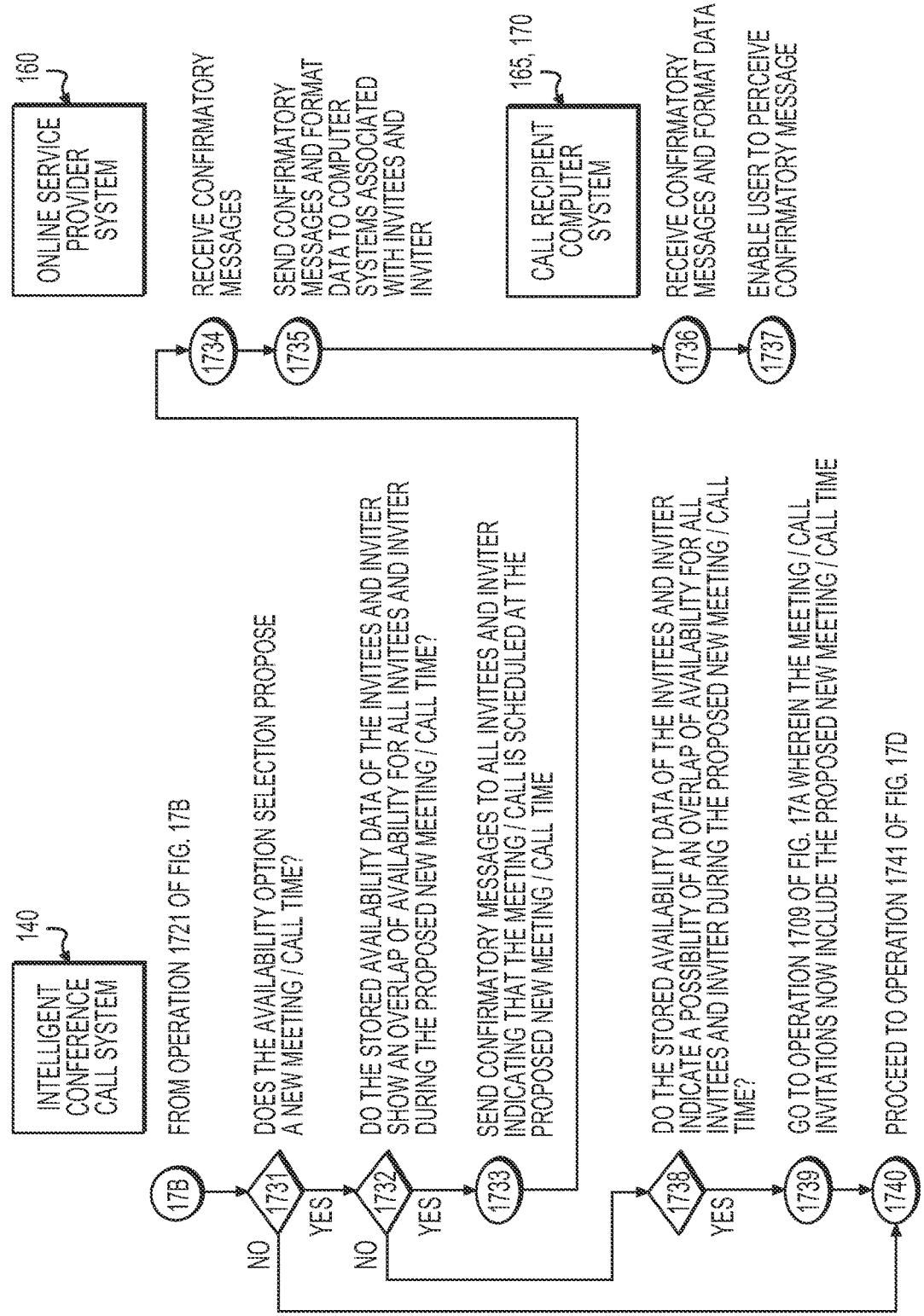

MEETING / CONFERENCE CALL SCHEDULING OPTIONS

PLEASE PROVIDE THE FOLLOWING INFORMATION REGARDING
THE MEETING / CONFERENCE CALL YOU WISH TO SCHEDULE:

GENERAL

| MEETING / CALL TOPIC | REVIEW PARODI PROJECT PROGRESS |
|---|---|
| COMMUNITY OF INTEREST | THE ULTRASOUND HARDWARE GROUP |
| LOCATION | |

DAY OF MEETING / CALL

| PROPOSED DAY OF MEETING / CALL | 10/31/05 |
|---|---|

DURATION AND START TIME OF MEETING

| PROPOSED START TIME OF MEETING / CALL | 10AM |
|---|---|
| DURATION OF MEETING / CALL | 1 HOUR |

SCHEDULING PREFERENCES

| START TIME WINDOW | 9AM TO 5PM |
|---|---|
| START TIME PREFERENCE | ☒ AS EARLY AS POSSIBLE IN PROPOSED DAY<br>☐ AS LATE AS POSSIBLE IN PROPOSED DAY |

YOUR AVAILABILITY

☒ DO NOT SPECIFY YOUR AVAILABILITY ON PROPOSED DAY
☐ SAME AS START TIME WINDOW
☐ MANUALLY SPECIFY YOUR AVAILABILITY ON PROPOSED DAY
☐ AUTOMATICALLY SPECIFY YOUR AVAILABILITY BASED ON YOUR CALENDAR ( SUBMIT )   ( CANCEL )

*FIG. 18*

MEETING / CALL PARTICIPANT AVAILABILITY OPTIONS

THE FOLLOWING POTENTIAL MEETING / CALL PARTICIPANTS ARE CURRENTLY AVAILABLE / UNAVAILABLE TO RECEIVE INVITATIONS:

| AVAILABLE | UNAVAILABLE |
|---|---|
| MARKUS5 | GRUMSBY |
| DEVOPAR | KRIEGAN |
| SORNSORPENTOR | MERDOC |
| DOORSTYP | UGLOR |
| ARGUSBILL6 | TOURNIQUET |
| BOTSMEMBER | ZAKFIN |
| FURORPLANED | |

PLEASE CHOOSE FROM THE FOLLOWING OPTIONS:

- PROCEED WITH SCHEDULING MEETING / CALL WITH AVAILABLE RECIPENTS
- PROCEED WITH SCHEDULING MEETING / CALL, WITH AVAILABLE RECIPIENTS AND AUTOMATICALLY SEND MEETING / CALL INVITATIONS TO UNAVAILABLE RECIPIENTS AS THEY BECOME AVAILABLE
- DO NOT PROCEED WITH SCHEDULING MEETING / CALL. NOTIFY ME WHEN ALL RECIPIENTS ARE AVAILABLE
- DO NOT PROCEED WITH SCHEDULING MEETING / CALL, BUT PROCEED WITH SCHEDULING MEETING / CALL AUTOMATICALLY WHEN ALL RECIPIENTS ARE AVAILABLE
- CANCEL SCHEDULING MEETING / CALL
- SELECT ANOTHER COMMUNITY OF INTEREST

MEETING / CALL SCHEDULING

YOU HAVE RECEIVED A CONFERENCE
CALL INVITATION FROM

BOB DEVANE
(703)123-4567
DULLES, VA
5:45 EDT - 05/17/02

THE TOPIC OF THE CONFERENCE CALL IS:
"REVIEW PARODI PROJECT PROGRESS"

THIS CONFERENCE CALL IS DIRECTED TO:
THE ULTRASOUND HARDWARE GROUP
AND IS EXPECTED TO LAST 1 HOUR.

─ 2005

PLEASE SELECT FROM ONE OF THE FOLLOWING OPTIONS REGARDING YOUR
AVAILABILTY TO PARTICIPATE IN A CONFERENCE CALL AT 10-11 AM ON 10/31/05.

2015 ─ ☐ I AM AVAILABLE TO JOIN THE CONFERENCE CALL AT 10AM-11AM ON 10/31/05.
2020 ─ ☐ I WILL NOT BE ABLE TO JOIN THE CONFERENCE CALL AT ALL ON 10/31/05.
2030 ─ ☒ I AM AVAILABLE TO JOIN A CONFERENCE CALL ON 10/31/05 BUT I WOULD
PREFER THAT THE CONFERENCE CALL TAKE PLACE FROM 11 AM-12PM

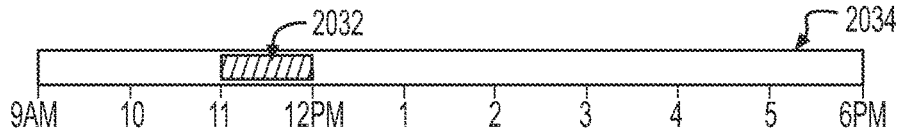

2040 ─ ☐ I AM AVAILABLE TO JOIN A CONFERENCE CALL ON 10/31/05 AT ANY
OF THE FOLLOWING MANUALLY ENTERED TIMES

2050 ─ ☐ I AM AVAILABLE TO JOIN A CONFERENCE CALL ON 10/31/05 AT ANY
OF THE TIMES SHOWN AVAILABLE ON MY CALENDAR ( SUBMIT ) ─ 2060

MEETING / CALL SCHEDULING CONFIRMATION

A CONFERENCE CALL HAS BEEN SUCCESSFULLY SCHEDULED FOR 10/31/05 FROM 9-10AM

THE CONFERENCE CALL PARTICIPANTS ARE:

> BOB(INVITER)
> MARKUS5
> DEVOPAR

☒ UPDATE CALENDAR
☐ SETUP CONFERENCE CALL REMINDER
☒ AUTOMATICALLY SEND OUT / ACCEPT CONFERENCE CALL INVITATIONS AT SCHEDULED CALL START TIME ( SUBMIT )

| MEETING / CALL SCHEDULING |
|---|

THE CONFERENCE CALL CANNOT BE
SCHEDULED ON 10/31/05 BECAUSE NOT ALL
OF THE PARTICIPANTS ARE AVAILABLE ( CANCEL SCHEDULING THE MEETING / CALL )

( ATTEMPT TO SCHEDULE THE MEETING / CALL
ON AN ALTERNATE DAY AND TIME )

( SCHEDULE THE MEETING / CALL AT A SPECIFIED TIME ON 10/31/05 )

( SCHEDULE THE MEETING / CALL AT A TIME ON 10/31/05 DURING
WHICH THE LARGESET NUMBER OF PARTICIPANTS ARE AVAILABLE )

( SCHEDULE THE MEETING / CALL AT A TIME ON 10/31/05 DURING
WHICH SELECTED PARTICIPANTS ARE AVAILABLE )

*FIG. 22*

CONFERENCE CALLS AND MEETINGS VIA ELECTRONIC MESSAGING INTERFACE

CROSS-REFERENCE TO RELATED APPLICATION(S)

This application is a continuation of and claims the benefit of priority to U.S. Nonprovisional patent Ser. No. 16/685,828, filed on Nov. 15, 2019, which is a continuation of U.S. application Ser. No. 13/617,934, filed Sep. 14, 2012, now U.S. Pat. No. 10,530,926, issued on Jan. 7, 2020, which is a continuation of U.S. Nonprovisional patent Ser. No. 11/298,981, filed on Dec. 12, 2005, now U.S. Pat. No. 8,358,762, issued on Jan. 22, 2013, which claims priority to and incorporates by reference U.S. Provisional Patent Application No. 60/663,266, filed Mar. 21, 2005, and titled CONFERENCE CALLS AND MEETINGS VIA AN ELECTRONIC MESSAGING INTERFACE. This application incorporates by reference U.S. application Ser. No. 10/895,389, filed on Jul. 21, 2004, and titled CONFERENCE CALLS VIA AN INTELLIGENT CALL WAITING INTERFACE, U.S. patent application Ser. No. 10/414,167, filed Apr. 15, 2003, and titled COMMUNICATION DEVICE MONITORING, U.S. patent application Ser. No. 10/674,797, filed Oct. 1, 2003, and titled MULTI-USER CALL WAITING, and U.S. patent application Ser. No. 10/320,712, filed Dec. 17, 2002, and titled CASCADED DELIVERY OF AN ELECTRONIC COMMUNICATION.

TECHNICAL FIELD

This document relates to a conference call/scheduling system that enables a caller/inviter to send conference call/meeting invitations to multiple online users and initiate or schedule a conference call/meeting with invited online users in accordance with their responses to the conference call/meeting invitations.

BACKGROUND

Several techniques are known for establishing conference calls between three or more parties. For example, a host may call each party to the conference and individually bridge each called party onto the conference call. Alternatively, a "dial-in" telephone number with associated access code may be used to join all parties at a common bridge. Each party dials into the bridge, eliminating the need for the host to call each party individually. In yet another technique, a host calls a central number and specifies the participants to the conference call. The network then places outbound calls to each of the specified participants, and the participants join the conference call by answering the outbound calls.

SUMMARY

In one general aspect, initiating a conference call includes receiving a conference call request message from an initiating user specifying a plurality of other users and determining an availability of the other users to receive conference call invitations. A conference call is initiated between the initiating user and one or more of the other users that are determined to be available. The availability of one or more of the other users determined to be unavailable is monitored and interaction with a conference call invitation by one or more of the other users determined to be unavailable is enabled upon their monitored availability changing from unavailable to available. The interaction with the conference call invitation by the other users is conditioned on whether the conference call is still in progress.

Implementations may include one or more of the following features. For example, a meeting response message that specifies the determined availability may be sent to the initiating user. The initiating user may specify one or more of the other available users that will receive conference call invitations and/or may specify one or more of the other unavailable users whose availability will be monitored.

The one or more other previously unavailable users to which are sent conference call invitations may be allowed to join the conference call in progress. The conference call invitation may be sent automatically or in response to a request by the initiating user.

Enabling interaction with a conference call invitation by one or more of the other users may include sending a conference call invitation to one or more of the other users upon their monitored availability changing from unavailable to available. Monitoring the availability of one or more of the other users may include monitoring the online presence of one or more of the other users, monitoring the availability of a telecommunication device owned or operated by one or more of the other users, and/or monitoring the login status of one or more of the other users.

In another general aspect, scheduling a meeting includes receiving a meeting request from an initiating user. The meeting request specifies two or more other users. The availability of the two or more other users to receive meeting scheduling invitations is monitored and a notification message is sent to the initiating user upon the monitored availability indicating that the two or more other users are concurrently available.

Implementations may include one or more of the following features. For example, the meeting may include a meeting between the initiating user and two or more of the other users at a physical location. The meeting may include a conference call and the meeting scheduling invitations may include conference call scheduling invitations. The notification message may be structured and arranged to notify the initiating user that the two or more other users are concurrently available.

A conference call may be initiated between the initiating user and the two or more other users upon the two or more other users becoming concurrently available. The meeting scheduling invitations may be sent to the two or more other users upon the two or more other users becoming concurrently available. The meeting scheduling invitations may be sent automatically or in response to a request by the initiating user.

Monitoring the availability of one or more of the other users may include monitoring the online presence of one or more of the other users, monitoring the availability of a telecommunication device owned or operated by one or more of the other users, and/or monitoring the login status of one or more of the other users.

In another general aspect, scheduling a multiple party meeting includes receiving a meeting request message from an initiating user. The meeting request message specifies one or more other potential meeting participants. Meeting setup data is accessed, and a first proposed meeting date is determined based on the meeting request and the meeting setup data. The other potential meeting participants perceive first electronic scheduling invitations that include the first proposed meeting date. User availability data is accessed for the one or more other potential meeting participants in response to the first electronic scheduling invitations. The user availability data indicates that at least one of the other potential meeting participants is unavailable to meet at the first proposed meeting date. A second proposed meeting date is determined based on the meeting setup data and the user availability data.

Implementations may include one or more of the following features. For example, the meeting setup data may include a topic or a location of the meeting. The meeting setup data may include the first proposed meeting date and a meeting duration.

The first proposed meeting date may include a first proposed meeting day and a first proposed meeting start time and the second proposed meeting date may include a second proposed meeting day and a second proposed meeting start time. The second proposed meeting day may be the same day as the first proposed meeting day or may be a different day. The meeting setup data may specify a range of potential meeting start times on the first proposed meeting day.

The meeting setup data may include preferences specified by the initiating user that indicate a preference that the start time of the meeting be as early as possible on the first proposed meeting day or a preference that the start time of the meeting be as late as possible on the first proposed meeting day. A second proposed meeting start time may be determined by identifying a start time in the range of potential meeting start times during which the one or more other potential meeting participants have not indicate unavailability to participate in the meeting. The second proposed meeting start time may be determined by identifying multiple potential start times in the range of potential meeting start times during which one or more other potential meeting participants have not indicated unavailability to participate in the meeting and identifying the second proposed meeting start time from among the potential start times based on the preferences specified by the initiating user.

The other potential meeting participants may perceive second electronic scheduling invitations that include the second proposed meeting date. Additional user availability data may be accessed for the one or more other potential meeting participants in response to the second electronic scheduling invitations. Accessing the user availability data may include receiving the user availability data from the one or more other potential meeting participants. The user availability data may be updated with the additional user availability data. A meeting schedule confirmation message may be sent to the initiating user and to the one or more other potential meeting participants conditioned on whether the updated user availability data indicates that one or more other potential meeting participants are available to meet at the second proposed meeting date.

The meeting may include a conference call and the first scheduling invitations may include first conference call scheduling invitations. Accessing user availability data may include receiving user availability data from the one or more other potential meeting participants. Accessing user availability data may include receiving user availability data specified manually by the one or more other potential meeting participants in response to the first electronic scheduling invitation. Accessing user availability data may include accessing user availability data associated with a first calendar application and accessing user availability data associated with a second calendar application that is different from the first calendar application.

DESCRIPTION OF DRAWINGS

FIG. 9 illustrates an example of a user interface presented to a user upon the user accepting a conference call invitation.

FIG. 10 illustrates an example of a user interface presented to a user upon the user rejecting a conference call invitation.

FIG. 11 illustrates an example of a user interface presented to a user upon receipt of a call notification message.

FIG. 12 illustrates an example of a user interface presented to a user upon receipt of an updated call notification message.

FIG. 14 illustrates an example of a user interface presented to a user that initiates a conference call.

FIGS. 17A-17D are flow charts illustrating a process for scheduling a conference call or meeting using an electronic messaging system.

FIG. 18 illustrates an example of a user interface that enables the user to select from among a set of meeting/call scheduling setup options.

FIG. 19 illustrates an example of a user interface similar to the one shown in FIG. 16 but used to schedule a conference call or meeting rather than to initiate a conference call.

FIG. 20 illustrates an example of a user interface presented to an invitee to enable the invitee to respond to a meeting/call scheduling invitation.

FIG. 21 illustrates an example a user interface presented to a user to inform the user of the successful scheduling of a meeting/call.

FIG. 22 illustrates an example of a user interface that informs an inviter that a meeting/call could not be scheduled during a proposed day.

DETAILED DESCRIPTION

Figure 1A:
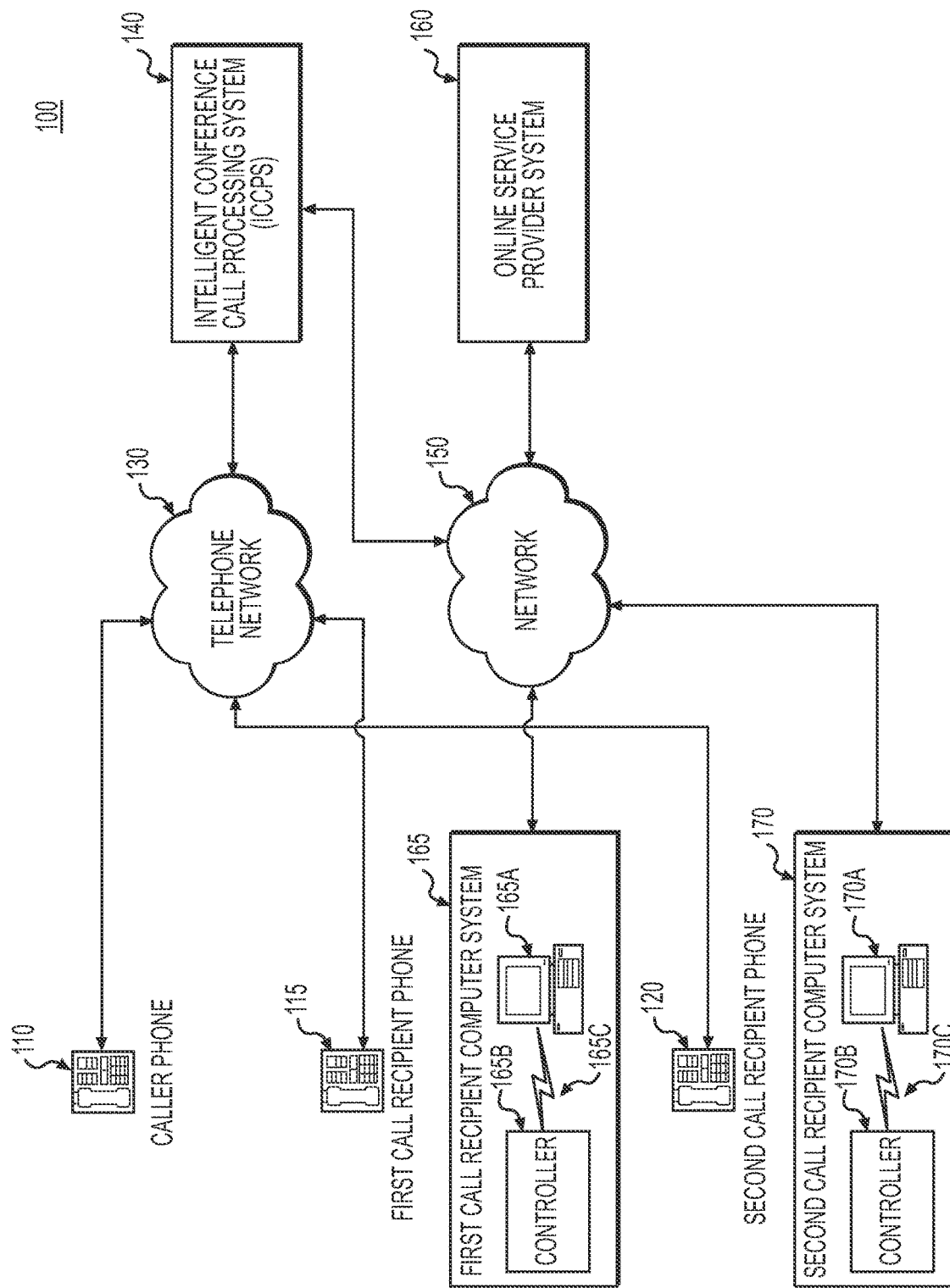
FIGS. 1A and 1B are block diagrams illustrating a communications system for initiating a conference call using an electronic messaging interface.

In one exemplary implementation, a communications system for initiating a conference call or scheduling a conference call or meeting using an electronic messaging interface includes a caller telephone device, multiple call recipient telephone devices and call recipient computer systems, a telephone network, an intelligent conference call processing system (ICCPS), a data network, and an online service provider system.

To initiate a conference call, for example, the caller telephone device is used by a caller to place a call over the telephone network to the ICCPS, which enables the caller to identify a community of interest, which includes a group of potential call recipients who share a common interest, trait, or characteristic or who are otherwise grouped together as an entity with which a caller may desire to communicate in a conference call. The ICCPS identifies the user identities associated with the members of the community of interest, requests the online presence of those user identities from the online service provider system, and determines their availability to receive electronic call invitations. For instance, where user identities are user identifiers, such as, for example, screen names, an Instant Messaging system may be used to determine the online status of each.

The ICCPS informs the caller of which members of the community of interest are available and enables the caller to select from among a set of options that may include, for example: (1) proceed with the call by sending electronic call invitations to only those members that are available to receive electronic call invitations; (2) proceed with the call by sending electronic call invitations to the members that are available and automatically sending electronic call invitations to unavailable members as they become available; (3) not proceed with the call but inform the caller when all members become concurrently available; (4) not proceed with the call but proceed with the call automatically conditioned on all members being concurrently available; (5) cancel the call; and (6) select another community of interest. Availability may be indicated with reference to online presence, login status with respect to a particular application or access service, and availability of telecom devices owned/ operational by a user, among other indicators or combination thereof. The ICCPS coordinates the initiation of the conference call in accordance with the caller's option selection.

To schedule a conference call or meeting, for example, an inviter uses the caller telephone device (e.g., a caller computer system) to access the ICCPS. The ICCPS prompts the inviter to input meeting/call scheduling setup data. The meeting/call scheduling setup data may include a meeting/ call topic, a community of interest, an initial proposed day and start time for the meeting/call, a duration of the meeting/ call, a start time scheduling window (i.e., a range of potential start times on the initial proposed day), and a start time preference (e.g., a preference to schedule the meeting/call as early as possible in the day or as late as possible in the day). After the inviter provides the meeting/call scheduling setup data, the ICCPS sends electronic meeting/call scheduling invitations to members in the community of interest. The electronic meeting/call scheduling invitations prompt the members to indicate their availability to meet or participate in a call at the initial proposed day and start time. The members respond to the invitations by providing the ICCPS with availability data that indicate their availability to participate in the meeting/call at the initial proposed day and start time for the meeting/call duration. Based on this availability data, the ICCPS determines whether the meeting or call may be scheduled at the initial proposed day and start time.

If at least one of the members is indicated as available to meet or participate in a call at the initial proposed day and start time, the ICCPS determines a second proposed start time on the initial proposed day based on the received member availability data and the inviter meeting/call scheduling data. Specifically, the ICCPS determines the second proposed start time by using the availability data to identify one or more potential start times in the start time window during which all members would be available or potentially available to participate in the meeting/call. If more than one potential start time is identified, the ICCPS chooses the second proposed start time to be the earliest or latest potential start time in accordance with inviter preferences.

The ICCPS automatically sends out electronic meeting/ call scheduling invitations to the members prompting them to indicate their availability to meet or participate in a call at the second proposed start time. The members respond to the electronic meeting/call scheduling invitations by providing additional member availability data. The ICCPS updates the stored availability data in accordance with the member responses.

If all of the members indicate that they are available to meet or participate in a call at the second proposed start time on the initial proposed day for the duration of the meeting/ call, the ICCPS sends out electronic meeting/call schedule confirmation messages to the members informing them that the meeting/call has been successfully scheduled at the second start time on the initial proposed day. If, however, at least one of the members indicates unavailability to meet or participate in a call at the second proposed start time on the initial proposed day for the duration of the meeting/call, the ICCPS determines a third proposed start time on the initial proposed day based on the updated member availability data and the meeting/call scheduling data.

In this manner, the ICCPS proceeds to schedule the meeting/call by iteratively determining an appropriate start time based on dynamically updated member availability data received in response to electronic meeting/call scheduling invitations. If, however, the member availability data indicates that a meeting/call cannot be successfully scheduled on the initial proposed day, the ICCPS, for example, may prompt the inviter to submit a second proposed day and start time, and the iterative scheduling process continues as necessary to determine a start time for the meeting/call on the second proposed day. Other implementations are described in more detail below.

Referring to FIG. 1A, one implementation of a communications system for initiating a conference call using an electronic messaging interface is identified at reference numeral 100. The communications system 100 of FIG. 1A includes a caller telephone device 110, a first call recipient telephone 115, a second call recipient telephone 120, a telephone network 130, an intelligent conference call processing system (ICCPS) 140, a data network 150, an online service provider system 160, a first call recipient computer system 165, and a second call recipient computer system 170. As such, FIG. 1A shows equipment that may be used by two representative call recipients, including their associated telephones 115 and 120 and computer systems 165 and 170. The communications system 100, however, may include any number of call recipients.

Figure 1B:
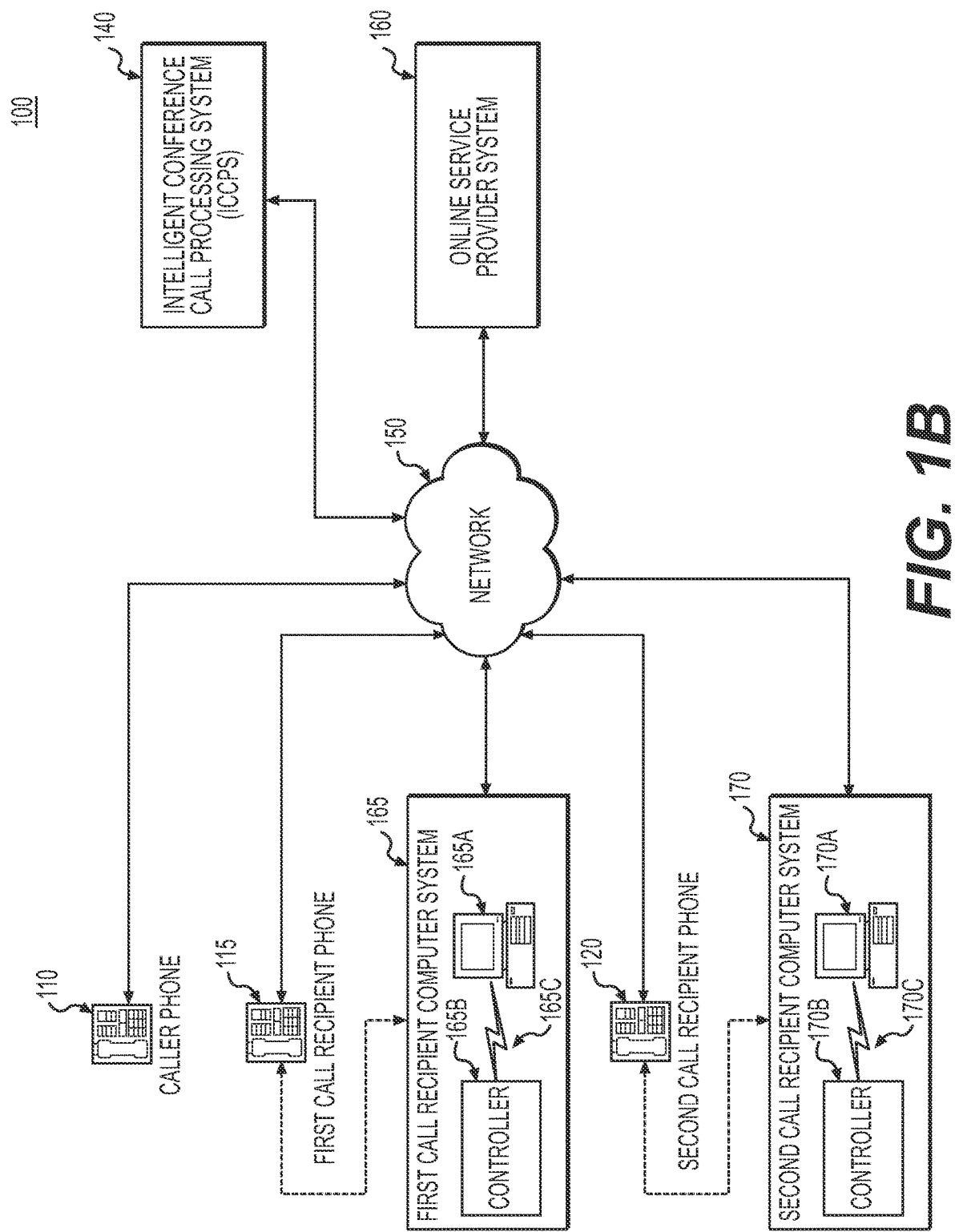

The caller telephone device 110 is used by a caller to place a call to the ICCPS 140 over the telephone network 130. The caller telephone device 110, the first call recipient telephone 115, and the second call recipient telephone 120 may be landline telephones that allow communications over the telephone network 130. In another implementation, any one or more of the call recipient telephone devices 115, 120 and the caller telephone device 110 may be a cellular telephone or a mobile personal digital assistant (PDA) with embedded cellular telephone technology. In yet another implementation, the call recipient telephone devices 115, 120 and the call recipient computer systems 165, 170 are respectively integrated into single computer systems capable of receiving calls over the telephone network 130 and receiving data over the data network 150. As shown in FIG. 1B, any one or more of the call recipient telephone devices 115, 120, and the caller telephone device 110 may be data devices that communicate with the ICCPS 140 over the network 150 using a voice communications protocol such as, for example, voice-over-IP.

The telephone network 130 is configured to enable direct or indirect voice communications between the caller telephone device 110, the call recipient telephone devices 115, 120, and the ICCPS 140. When a call is placed by the caller telephone device 110 to the ICCPS 140, the telephone network 130 is configured to send call-related information to the ICCPS 140 over a signaling channel. The call-related information includes call origin and call destination information. The call origin information may include the direct number of the caller telephone device 110 and the time and date when the call was initiated. The call destination information may include the direct number of the ICCPS 140, which, in some implementations, is associated with a specific community of interest. The call origin information may be delivered, for example, through a service known as Automatic Number Identification (ANI), and the call destination information may be delivered, for example, through a service known as Dialed Number Identification Service (DNIS).

The telephone network 130 may be of any type including, for example, the public switched telephone network (PSTN), international networks or a combination of networks. For example, the telephone network 130 may include the AT&T interexchange (IXC) network and/or central offices of local exchange carriers (LECs). The telephone network 130 is typically circuit-switched.

The ICCPS 140 is a computer system configured to receive calls from the caller telephone device 110 and enable the caller to identify a community of interest. Once a community of interest is identified, the ICCPS 140 is configured to send call notification messages to potential call recipients in the community of interest that are online or otherwise available to receive call notification messages and initiate a conference call between the caller and those potential call recipients that are interested in participating in the conference call.

A community of interest is a group of potential call recipients that share a common interest, trait, or characteristic or are otherwise grouped together as an entity with which a caller may desire to communicate in a conference call. For example, the community of interest may be a community consisting of members of a club (e.g., hunting club, skiing club, and reading club), members of an organization (e.g., National Rifle Association members in Washtenaw County, church members, and Ford employees), individuals with a common goal or cause (e.g., supporters of a presidential candidate, pro-life activists, and coworkers working on a cost-cutting initiative), individuals with a common characteristic (e.g., recovering drug addicts, individuals suffering from breast cancer, Boston Red Sox Fans, supervisors in an organization, students in Mr. Krupka's physics class, and managing partners in a law firm), or members that are grouped together for any other arbitrary reason (e.g., on the caller's buddy list).

A community of interest may be defined globally for all callers and/or may be tailored or personalized to a specific caller. For example, the caller may define one or more personalized communities of interest during service registration. Examples of caller-defined communities of interest include a community consisting of the caller's family, a community consisting of the caller's coworkers, a community consisting of the caller's friends, and a community consisting of the members of a personal contact list of the caller and/or the caller's Instant Messaging buddy list or some subgroup thereof (e.g., a buddy or contact group). Callers or other individuals also may subscribe to different globally defined communities of interest during service registration (e.g., weekly poetry reading and discussion, daily seminar, and advanced calculus course).

If a conference call is already in progress for the community of interest specified by the caller when the caller calls in, the caller may select to or automatically be added to the conference call if the caller is a member of that community of interest. A determination of whether the caller is a member of the community of interest may be done as part of the caller validation process or based on collected caller-related information (e.g., ANI information). If a caller is not a member of the community of interest, the caller typically will not be allowed to join the conference call in progress. In other implementations, a caller will only be allowed to initiate a conference call with a community of interest if that caller is a member of the community of interest.

The caller may identify the community of interest to the ICCPS 140 by calling a specific number that the ICCPS 140 associates with a particular community of interest. For example, the caller may call "1-800-Go Drows" to setup a conference call with the community leaders of the Drows suburbs in Pewaukee, Wis. Additionally or alternatively, the caller may call a general number and be prompted by the ICCPS 140 to input or otherwise specify the community of interest.

The caller also may manually specify each member in a community of interest. For example, the caller telephone device 110 may provide a visual display of potential call recipients and enable the caller to select or otherwise input the members in the particular community. The caller also may input a name for the manually created community of interest or, alternatively, a default name may be selected automatically (e.g., "manually created group"). The caller telephone device 110 may include or be integrated within or operate as a PDA or general purpose computer that stores locally the user identities of potential call recipients in, for example, an address book or communicates with the ICCPS 140 to receive the user identities of potential call recipients. Additionally or alternatively, the address book may reside in a remote host-based data store and be accessible to the telephone 110 and/or be accessible to or be a part of the ICCPS 140. In another implementation, the ICCPS 140 may send to the caller telephone device 110 only the user identities that are determined to be online or may send all user identities but may flag or otherwise denote the user identities that are online. The visual display also may allow the caller to send Instant Messages to the potential call recipients that are online and may initiate a conference call if all of the potential call recipients indicate availability to participate in the conference call.

After a community of interest has been identified, the ICCPS 140 determines the user identities of the members within the community of interest. The ICCPS 140 may store the user identities in a data store or, additionally or alternatively, may query one or more external systems to retrieve the user identities. Rather than or in addition to tracking presence information directly, the ICCPS 140 queries one (or more) external online service provider systems 160 for presence information corresponding to each user identity. Upon receiving the presence information from the online service provider system(s) 160, the ICCPS 140 generates a call notification message for each user identity that is determined to be online. The ICCPS 140 sends or publishes the call notification messages to the online service provider system(s) 160 which, in turn, send the call notification messages to the recipients. The call recipient computer systems 165, 170 receive the call notification messages from the online service provider system(s) 160 and enable the potential call recipients to perceive the call notification messages as, for example, pop-up windows in a visual display.

A call notification message (or electronic conference call invitation) typically includes the identity of the caller that initiated the conference call (determined based on, for example, Automatic Number Identification (ANI) information), an identifier for the community of interest designated by the caller, a subject matter or topic for the conference call (e.g., "The hottest places to hunt in Wisconsin—A discussion by famed hunter Bob Rayburn"), the expected duration of the conference call (e.g., 20 minutes), and a set of options that may be selected by the potential call recipient to indicate whether and how the potential call recipient will participate in the conference call and, in some implementations, how the potential call recipient wishes to connect to the ICCPS 140 (e.g., via a traditional telephone over the telephone network 130 or via a data telephone or computer over the data network 150). The ICCPS 140 is configured to receive, over the data network 150 and through the online service provider system(s) 160, the options selected by the potential call recipients in response to the call notification messages. The ICCPS 140 receives option selections at different times dependent on the time it takes for each individual potential call recipient to select from among the options presented in the call notification message. After the ICCPS 140 receives option selections from all of the potential call recipients or, additionally or alternatively, after a predetermined interval of time (e.g., 2 minutes), the ICCPS 140 processes the option selections. In another implementation, the ICCPS 140 processes the option selections as they are received.

When the ICCPS 140 receives an option selection from a potential call recipient, the ICCPS 140 may send an update call notification message to the call recipient computer systems 165, 170 associated with the other potential call recipients indicating the option selected by that potential call recipient. The update call notification message updates the call notification message by, for example, adding a status section to the call notification pop-up window or by adding a conference call participant status pop-up window that visually displays the conference call participation option selected by each call recipient. As each option selection is received by the ICCPS 140, another updated call notification message is sent to the potential call recipients and all of the potential call recipients (including those that have already responded) are able to see in the conference call participant status window or in the status section of the call notification window the responses already submitted by the other potential call recipients. If a potential call recipient has inputted a reason or message in response to, for example, selecting the option to not participate in the call, the status section of the call notification window or the call participant status window may display that message to all of the potential call recipients. The call participant status window also may optionally include a message informing nonparticipating potential call recipients whether the conference call is in progress and may include a link selectable by the non-participating potential call recipients to access or otherwise "jump-in" to the call when they become available to participate. The link is typically available only while the conference call is in progress.

Figure 6:
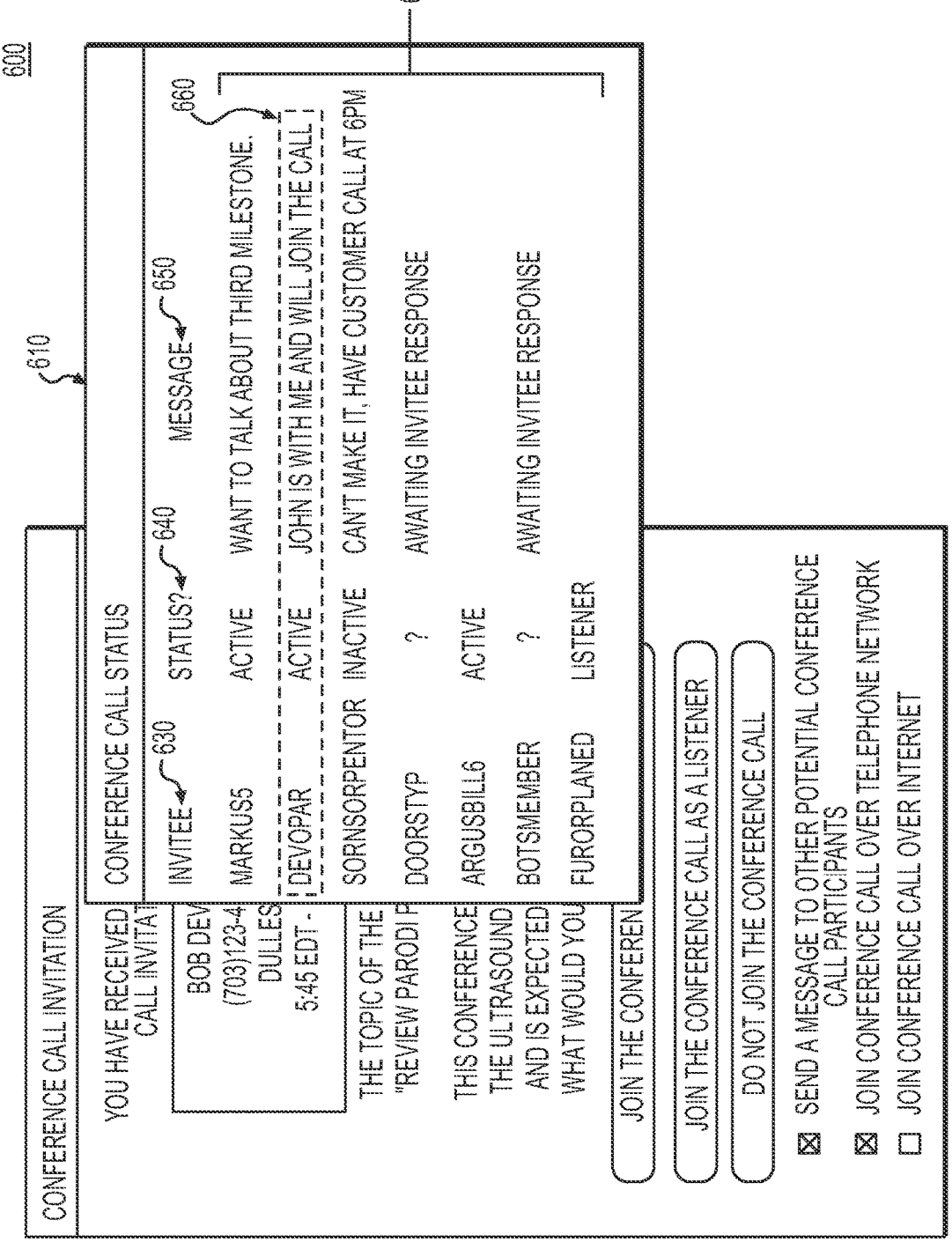
FIG. 6 illustrates an example of a user interface presented to a user upon receipt of an updated call notification message.

The ICCPS 140 may periodically revise the conference call participant status window or the status section of the call notification window to reflect the latest response status. The ICCPS 140 also may enable potential call recipients to opt-out of receiving update call notification messages, for a particular call or altogether. FIG. 6 shows an example of a user interface 600 including a conference call participant status window.

The ICCPS 140 processes the conference call connection options to establish bi-directional voice communication connections with the call recipients. If a call recipient has selected to connect to the conference call over the telephone network 130 using a traditional telephone connection, the ICCPS 140 identifies a direct number of a telephone associated with the user identity of the call recipient by, for example, accessing an account record in a configuration data store, and uses the direct number to place an outbound telephone call to the call recipient telephone 115, 120. If the direct number of the telephone associated with the user identity is busy or not answered, the ICCPS 140 is configured to send an error message to the call recipient computer system 165, 170 associated with that user. The error message may allow the call recipient to enter a new number to which the outbound call may be directed, or additionally or alternatively, to select to connect to the ICCPS 140 using the call recipient computer system 165, 170 (e.g., via Voice-over-IP).

If a call recipient has selected to connect to the conference call over the data network 150 using the call recipient computer system 165, 170, the ICCPS 140 employs a telephony gateway to establish a bi-directional audio channel between the telephony gateway and the call recipient computer system 165, 170 over the data network 150. The telephony gateway may be, for example, an Internet telephony gateway using a voice-over-IP communications protocol.

When the call recipient telephone devices 115, 120 and/or call recipient computer systems 165, 170 are connected to the ICCPS 140 for voice communications, the ICCPS 140 initiates a conference call in accordance with the conference call participation options selected by each participant. For example, if a participant desires to be a listener, the ICCPS 140 changes the bi-directional voice path or audio channel to a unidirectional voice path or audio channel. The unidirectional voice path or audio channel allows the call recipient to receive audio data and thus listen to the conference call but does not allow the call recipient to send audio data and thus contribute vocally to the conference call.

The data network 150 may be any type of network that carries data including, for example, the Internet, an intranet or any combination of data bearing networks. The data network 150 may include one or more wired or wireless networks (e.g., General Packet Radio Networks). The data network 150 may be, for example, a data network using Internet Protocol (IP). The term "data" as used herein is representation of information in a formalized manner suitable for communication, interpretation or processing. This information can include, for example, text, audio, image, video, and/or multimedia.

In some implementations, the data network 150 and the telephone network 130 are implemented as a single or otherwise integrated communication's network configured to enable voice communications between the caller telephone device 110, the call recipient telephone devices 115, 120, and the ICCPS 140, and to enable communications between the ICCPS 140, the online service provider system 160, and the call recipient computer systems 165, 170.

The online service provider system 160 is a computer system configured to provide online data communications services to users, detect online presence of a user of the call recipient computer system 165, 170, receive a call notification message from the ICCPS 140, generate and send the format data along with the call notification message to the call recipient computer system 165, 170, and send option selections from the call recipient computer system 165, 170 to the ICCPS 140. The online data communications services may include for example, e-mail services, Instant Messaging services, Internet access, and/or access to online content.

The online service provider system 160 may, for example, detect online presence of a user of the call recipient computer system 165, 170 by leveraging an Instant Messaging system, or by performing presence detection in a manner similar to that used to detect presence in an Instant Messaging system and/or in a manner similar to that disclosed in application Ser. No. 10/414,167, hereby incorporated by reference in its entirety (in which client-side communication device monitors are used). The online service provider system 160 is also configured to receive a call notification message from the ICCPS 140, generate format data that is used to format the call notification messages for presentation on the call recipient computer system 165, 170, and send the call notification messages to the call recipient computer system 165, 170 in near real time.

The format data may vary based on device type. For example, with limited capabilities, the format data for a PDA may enable the PDA to limit the call notification message to a visual indication of the incoming call (e.g., illumination of a light and a graphical display of a call icon and the caller telephone device direct number or identity proxy thereof) and may further limit the conference call options that are presented to the user to a subset of the full suite of options (e.g., the option to participate in the call or not to participate in the call). In contrast, the format data sent to a home computer may enable the home computer to provide, for example, an audio and visual indication of the call and to display full caller identity information including address, return telephone number, and other information about the caller accessible based on the caller telephone device number. The format data sent to the home computer also may enable the home computer to present to the user a significantly larger number of call handling options (e.g., the option to actively participate, to listen, to not participate, to connect over the telephone network, to connect over the data network, and to send audio or text messages to other participants).

The online service provider system 160 is also configured to transmit, in near real time, the option selection from the call recipient computer system 165, 170 to the ICCPS 140. Near real time transmission of the option selection is important because transmission delays can result in a delay in initiating the conference call. Accordingly, the online service provider system 160 may be configured to avoid or altogether prohibit queuing call notification messages or option selections or further processing the call notification messages or option selections in any way that increases transmission delay. The online service provider system 160 may be configured to provide this functionality in a manner similar to that used by Instant Messaging systems, or even to leverage Instant Messaging systems to enable transmission and receipt of instant messages in near real time.

The call recipient computer systems 165, 170 are configured to receive call notification messages and format data from the online service provider system 160, process the call notification messages in accordance with the format data to enable a user to perceive the call notification message, accept user selection of options offered by the call notification messages, and send the option selection to the online service provider system 160. The call recipient computer systems 165, 170 each include a device 165A, 170A capable of executing instructions under the command of a controller 165B, 170B. The device 165A, 170A may be a general purpose computer, such as a workstation or a personal computer, a PDA, a special purpose computer, an intelligent mobile telephone, a pager, or a set top box.

The controller 165B, 170B commands and directs communications between the device 165A, 170A of the call recipient computer system 165, 170 and the online service provider system 160. The controller 165B, 170B may include one or more software or hardware applications that enable digital communications to be received from the online service provider system 160. For example, the controller 165B, 170B may be a modified Instant Messaging application configured to receive notification messages and send option selections in a manner similar to that used to receive instant messages and send instant messages. The device 165A, 170A is connected to the controller 165B, 170B by a wired, wireless or virtual (i.e., when the controller is software running on the device) data pathway 165C, 170C capable of delivering data.

Figure 2A:
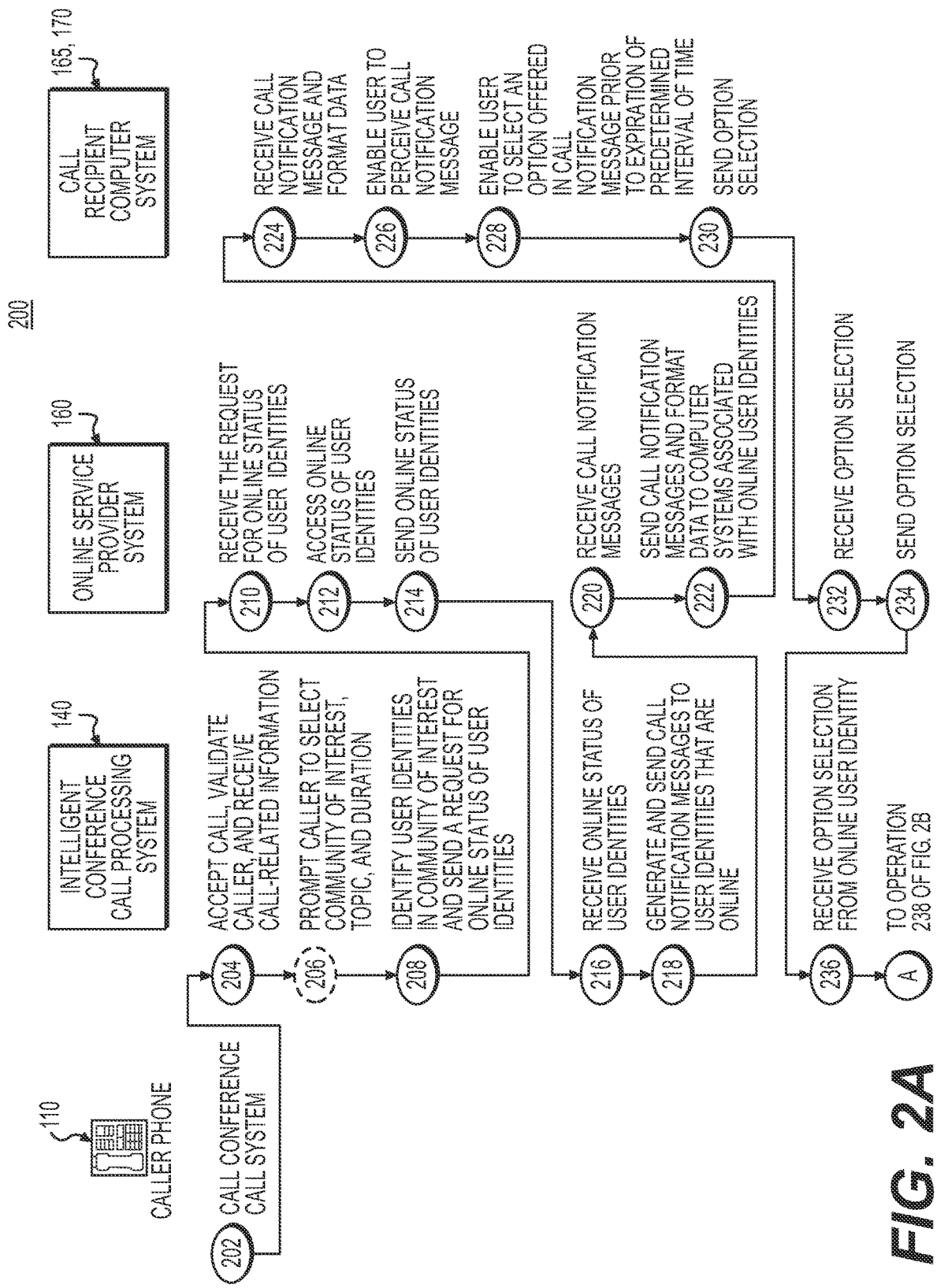
FIGS. 2A and 2B are flow charts illustrating a process for initiating a conference call using an electronic messaging interface.
Figure 2B:
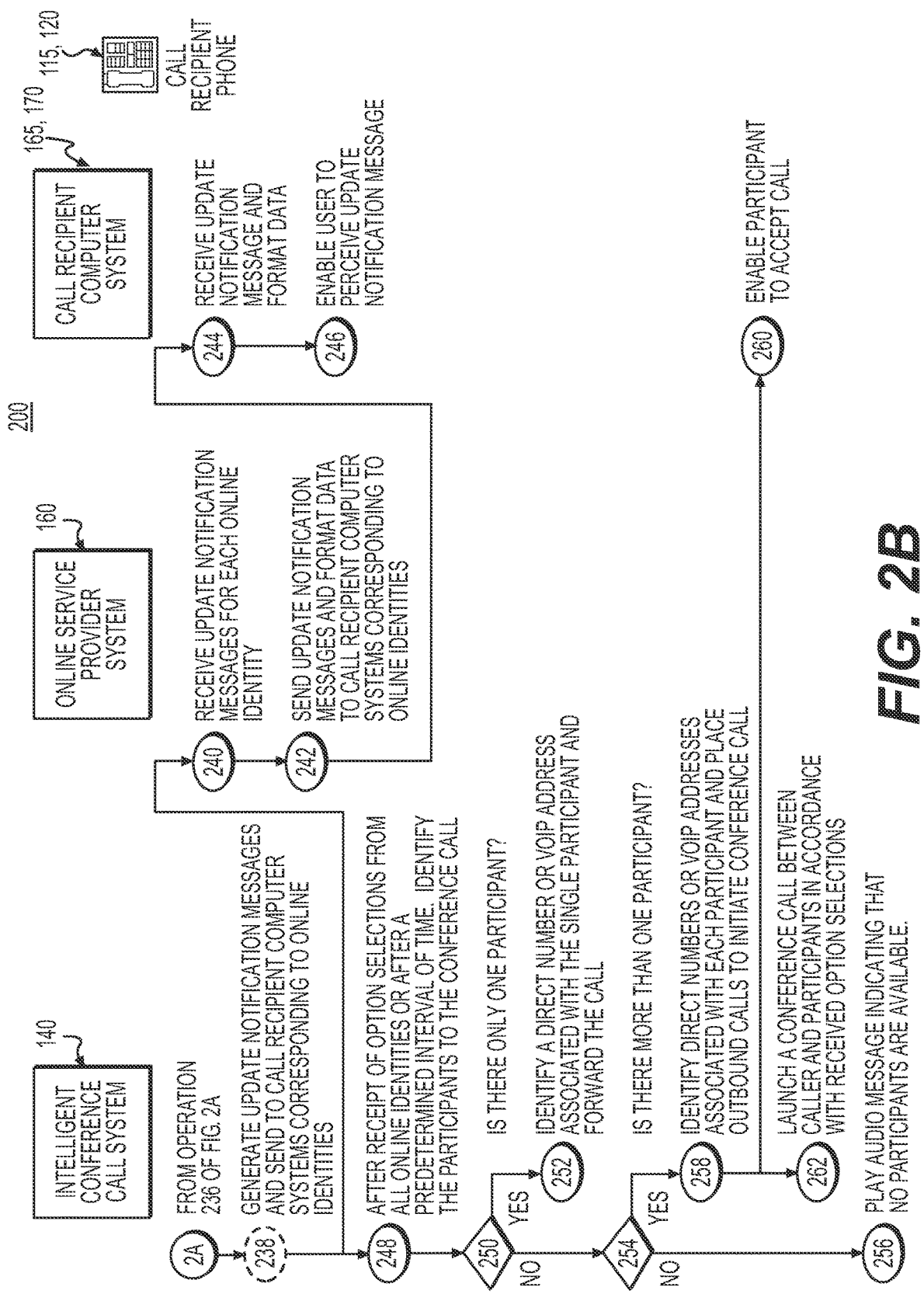

FIGS. 2A and 2B show a process 200 for initiating a conference call using an electronic messaging interface. For convenience, particular components described with respect to FIG. 1A are referenced as performing the process 200. However, similar methodologies may be applied in other implementations where different components are used to define the structure of the system, or where the functionality is distributed differently among the components shown by FIG. 1A.

The user of the caller telephone device 110 calls the ICCPS 140 (202). The ICCPS 140 accepts the call, validates the caller by, for example, prompting the caller for a caller identity and a password, and receives call-related information (204). Once the caller is validated, the ICCPS 140 prompts the caller to input a topic for the conference call and an expected conference call duration and prompts the caller to select a community of interest (206). In another implementation, the telephone number used to call the ICCPS 140 determines the community of interest and, therefore, selection of the community of interest is not necessary. The caller may be prompted to select a community of interest from a list of communities presented to the caller as audio or, alternatively, the caller may select the community of interest from a textual list sent to the caller telephone device 110 over the data network 130 (i.e., this implementation assumes that the caller telephone device 110 has data communication capabilities to receive and send data over the data network 150). The ICCPS 140 may access a configuration data store to retrieve community configuration data that is used to identify the set of communities of interest from which a given caller may select. The communities of interest may include communities available globally and personalized communities available only to the caller. The ICCPS 140 may use the call-related information to identify the caller and to access a personalized set of communities of interest tailored to or otherwise setup for that particular caller.

Once the caller has selected a community of interest, the ICCPS 140 identifies user identities associated with the selected community of interest and sends a request for the online status of the user identities (208). The online service provider system 160 receives the request for the online status of the user identities (210) and accesses the online status of the user identities (212). The online status of the user identities may be stored, for example, in a presence data store that is periodically updated in real-time in a manner similar to that used in Instant Messaging systems to reflect activity of a user at the call recipient computer system 165, 170. The online service provider system 160 sends the online status of the user identities to the ICCPS 140 (214).

The ICCPS 140 receives the online status of the user identities from the online service provider system 160 (216). If no user identities are online, the ICCPS 140 informs the caller through an audio message that no users are available to join the conference call and disconnects the call or prompts the caller for another community of interest (not shown). If one or more user identities are online, the ICCPS 140 generates and sends call notification messages addressed to the user identities that are online (i.e., online user identities) (218). The call notification messages typically are sent out in parallel by the ICCPS 140 to minimize transmission delays and the arrival time difference between call recipient computer systems 165, 170.

The online service provider system 160 receives the call notification messages for each online user identity (220) and sends the call notification messages along with format data to call recipient computer systems 165, 170 corresponding to the online identities (222). The receiving of the call notification messages and sending of the call notification messages and format data is performed in real time. The call notification messages typically are sent out in parallel by the online service provider system 160 to minimize transmission delays and the arrival time difference between call recipient computer systems 165, 170.

Figure 5A:
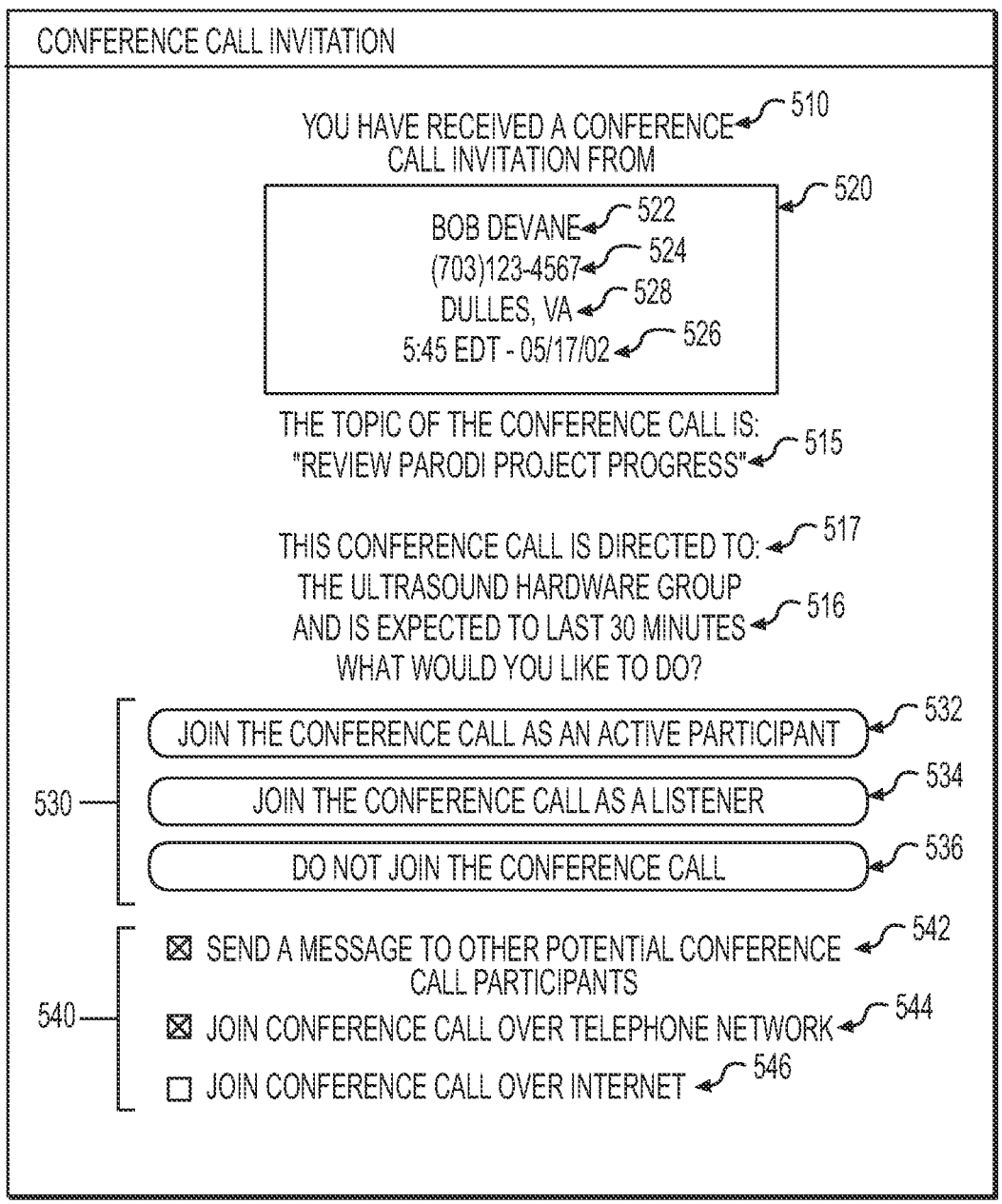
FIGS. 5A and 5B illustrate an example of a user interface presented to a user upon receipt of a call notification message.

Each call recipient computer system 165, 170 receives the call notification message and format data (224) and enables a user to perceive the call notification message (226). In one implementation, the call recipient computer system 165, 170 enables users to perceive the call notification message as a pop-up window or dialog box that appears on a visual display of the call recipient computer system 165, 170. FIG. 5A shows an example of a user interface 500 depicting a call notification message.

The call recipient computer system 165, 170 enables a user to select an option offered in the call notification message prior to expiration of a predetermined time interval (e.g., two minutes) (228). The call recipient computer system 165, 170 sends the option selection to the online service provider system 160 (230).

The online service provider system 160 receives the option selection (232) and sends the option selection to the ICCPS 140 (234), and does so in real time. The ICCPS 140 receives the option selection (236). The ICCPS 140 generates an updated call notification message for each online identity and sends the updated call notification messages to the online service provider system 160 (238). The online service provider system 160 receives the updated call notification messages (240) and sends the updated call notification messages to the corresponding call recipient computer systems 165, 170 (242).

Each call recipient computer system 165, 170 receives an updated call notification message (244) and enables a user to perceive the updated call notification message (246). In one implementation, the updated call notification message is presented to users as a dialog box or pop-up window that includes a status section visually displaying the conference call participation option selected by that potential call recipient and the options selected by any other potential call recipients that previously sent option selections to the ICCPS 140. The selected option is shown along with a user identifier corresponding to the potential call recipient from which the selected option was received. The status section also may include a message inputted by the potential call recipient in response to the notification message. For example, the message may indicate why the potential call recipient has chosen not to participate in the conference call. FIG. 6 shows an example of a user interface 600 including a conference call participant status window.

In another implementation, the status presented in the updated call notification message does not identify specific potential call recipients but rather presents a total number of potential call recipients that have responded to the call notification message by sending an option selection and the total number of potential call recipients that have not responded. The total number of potential call recipients that have responded may further be subdivided into the number of potential call recipients that have chosen to participate actively, participate as a listener, and not participate.

In yet another implementation, the updated call notification message also may be sent to the caller that initiated the conference call. The updated call notification message may be sent to a caller computer system (not shown) having similar characteristics as the call recipient computer systems 165, 170 or, additionally or alternatively, the updated call notification message may be sent to the caller telephone device 110 over the data network 150 (i.e., this implementation assumes that the caller telephone device 110 has data communication capabilities to receive and send data over the data network 150) or, alternatively, may be sent as an audio message over the telephone network 130. The audio message may inform the caller of the current participation status of the potential call recipients.

If the ICCPS 140 does not receive an option selection within a predetermined time interval from any of the call recipient computer systems 165, 170 that received call notification messages (e.g., at 224), the ICCPS 140 stops accepting option selections and identifies the participants to the conference call based on the already received option selections (248). The ICCPS 140 identifies the participants by analyzing the conference call participation option selections received from the potential call recipients.

The ICCPS 140 determines whether only one potential call recipient desires to participate in the conference call (250). If only one potential call recipient desires to participate in the conference call, the ICCPS 140 sends an audio message to the caller telephone device 110 informing the caller that only one participant wishes to join and that the call will be forwarded to the call recipient. If the conference call connection options associated with that call recipient indicate that the call recipient wishes to use the call recipient telephone 115, 120 to connect to the conference call over the telephone network 130, the ICCPS 140 forwards the call to the call recipient telephone 115, 120 by providing the telephone network 130 with the appropriate signaling information (252). If the conference call connection options associated with that call recipient indicate that the call recipient wishes to use the call recipient computer system 165, 170 to connect to the conference call over the data network 140, the ICCPS 140 establishes a bi-directional audio channel with the call recipient computer system 165, 170 and employs a telephony gateway to enable communication exchanges between the caller telephone device 110 and the call recipient computer system 165, 170 (not shown).

The ICCPS 140 determines whether more than one potential call recipient wishes to participate in the conference call (254). If more than one potential call recipient wishes to participate in the conference call, the ICCPS 140 establishes a bi-directional (or unidirectional, if the potential call recipient decides to listen to rather than to actively participate in the conference call) voice communications connection with each potential call recipient in accordance with their conference call connection option selection. Accordingly, for a potential call recipient that wishes to establish a communications connection over the telephone network 130 using the call recipient telephone 115, 120, the ICCPS 140 identifies a direct number associated with the potential call recipient and uses the direct number to place an outbound call to the call recipient telephone 115, 120 (258). When the call recipient accepts the call, the communications connection is setup (260). If the call recipient does not accept the call or is otherwise unavailable to receive the call (e.g., the line is busy), the ICCPS sends an error message to the corresponding call recipient computer system 165, 170. For a potential call recipient that wishes to establish a communications connection over the data network 150 using the call recipient computer system 165, 170, the ICCPS 140 employs a telephony gateway to establish a bi-directional audio channel with the call recipient computer system 165, 170 (not shown). Once all of the connections between the ICCPS 140 and the call recipients have been setup, the ICCPS 140 launches the conference call (262). In another implementation, the ICCPS 140 may launch the conference call as soon as one connection is setup between the ICCPS 140 and a call recipient. The ICCPS 140 enables each subsequent call recipient to access the call while the call is in progress by setting up an associated connection upon the subsequent call recipient selecting to participate in the call.

If no potential call recipients wish to participate in the conference call, the ICCPS 140 sends an audio message to the caller telephone device 110 indicating that no participants wish to join in the conference call. After sending or playing the audio message, the ICCPS 140 disconnects the call or enables the caller to select another community of interest (256).

Figure 3:
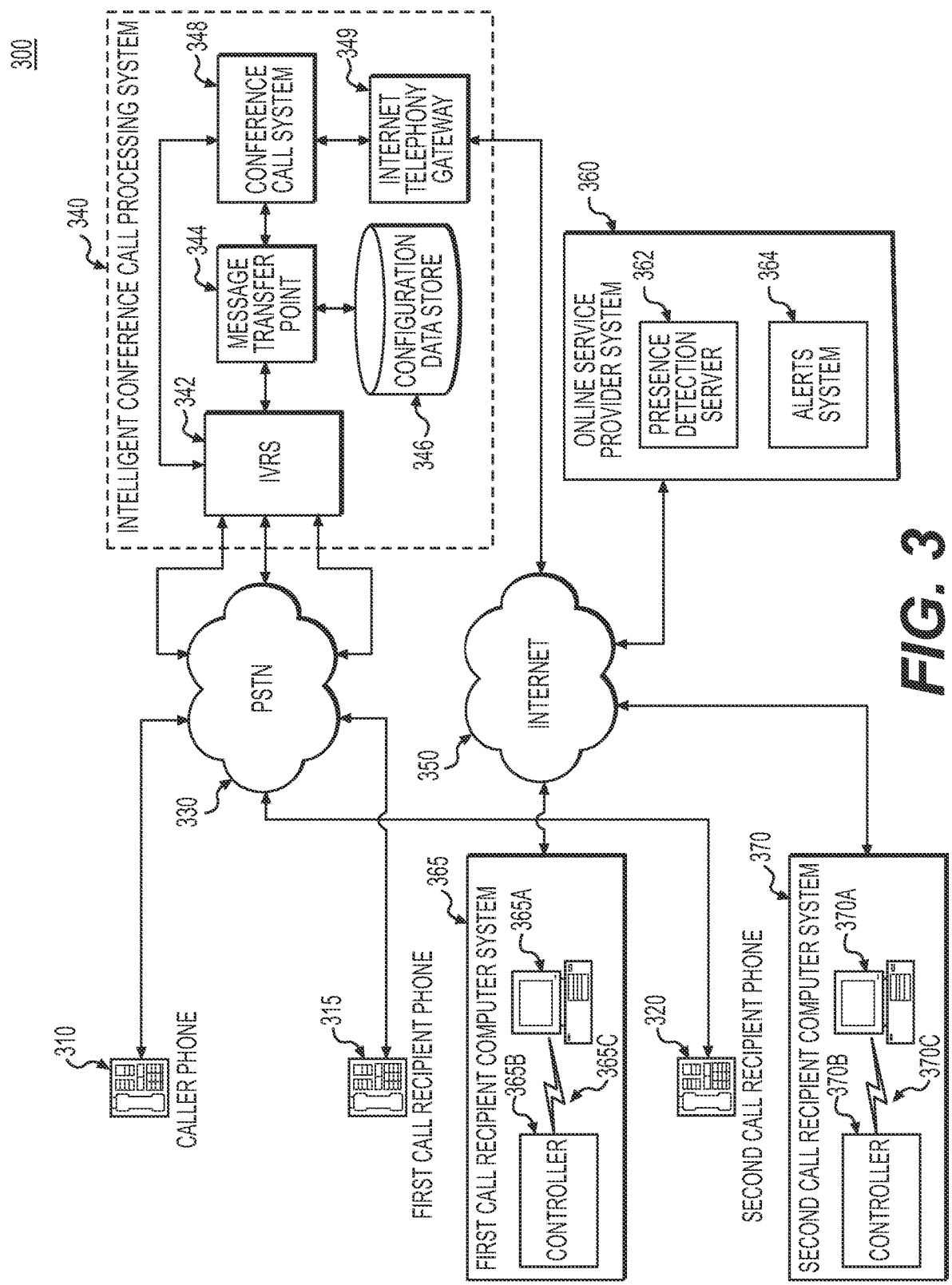
FIG. 3 is a block diagram illustrating a communications system for initiating a conference call using an electronic messaging interface.

FIG. 3 shows one exemplary implementation 300 of the communications system 100 of FIG. 1A configured to initiate a conference call using an electronic messaging interface. The communications system 300 includes a caller telephone device 310, a first call recipient telephone 315, a second call recipient telephone 320, the Public Switched Telephone Network (PSTN) 330, an ICCPS 340, the Internet 350, an online service provider system 360, a first call recipient computer system 365, and a second call recipient computer system 370. Each call recipient computer system 365, 370 includes a device 365A, 370A that communicates with a controller 365B, 370B over a data pathway 365C, 370C. Examples of each element within the communications system 300 of FIG. 3 are described broadly above with respect to FIG. 1A. In particular, the caller telephone device 310, the call recipient telephone devices 315, 320, the PSTN 330, the Internet 350, and the call recipient computer systems 365, 370 typically have attributes comparable to those described with respect to the caller telephone device 110, the call recipient telephone devices 115, 120, the telephone network 130, the data network 150, and the call recipient computer systems 165, 170 of FIG. 1A, respectively. Likewise, the ICCPS 340 and the online service provider system 360 typically have attributes comparable to and illustrate one possible implementation of the ICCPS 140 and the online service provider system 160 of FIG. 1A. FIG. 3 shows two representative call recipients and their associated telephones 315 and 320 and computer systems 365 and 370. The communications system 300, however, may include any number of call recipients.

The ICCPS 340 includes an interactive voice response system (IVRS) 342, a message transfer point 344, a configuration data store 346, a conference call system 348, and an Internet telephony gateway 349. The online service provider system 360 includes a presence server 362 and an alerts system 364.

The IVRS 342 is a telephony-facing computer system configured to send call handling instructions to the PSTN 330 and store, record, and send audio messages to the caller telephone device 310 through the PSTN 330. The IVRS 342 receives a call from the caller telephone device 310 and receives call-related information over a signaling channel from the PSTN 330.

The IVRS 342 may use the call-related information to validate the caller or, additionally or alternatively, may validate the caller by, for example, prompting the caller for a password and user identity. The IVRS 342 may send the call-related information and, if applicable, the user identity and password to the message transfer point 344. The message transfer point 344 may access the configuration data store 346 and validate the caller by verifying that the call-related information or user identity and password match with that in an active subscriber record.

The IVRS 342 also may send a request for community configuration data to the message transfer point 344. The community configuration data is general data or, additionally or alternatively, data specific to a caller that identifies the communities of interest selectable by the caller. After receiving the community configuration data, the IVRS 342 may prompt the caller to select a community of interest from those available to the caller. The IVRS 342 sends the caller community of interest selection to the message transfer point 344.

In another implementation, the IVRS 342 may send the call-related information including the direct number dialed by the caller to the message transfer point 344. The message transfer point 344 may then identify the community of interest by accessing the configuration data store 346 based on the direct number dialed by the caller. The community of interest may be uniquely identified in this manner, or, alternatively, the message transfer point 344 may use the direct number to identify and retrieve community configuration data representative of a set of communities of interest associated with the direct number. The message transfer point 344 may send this community configuration data to the IVRS 342 which may then prompt the caller to select from among this set of communities of interest.

The IVRS 342 also may be configured to send the appropriate instructions to the PSTN 330 over a signaling channel to forward the call to a direct number of a call recipient telephone 315, 320 if the message transfer point 344 indicates that only one participant wants join the conference call. If the message transfer point indicates that no participants want to join the conference call, the IVRS 342 may be configured to play an audio message to the caller indicating that no participants wish to join the call and may then disconnect the call or, alternatively, may prompt the caller to select another community of interest.

The IVRS 342 is also configured to place one or more outbound calls to potential call recipients if the message transfer point 344 indicates that more than one participant wants to join the conference call and at least one of the participants wants to connect to the conference call over the PSTN 330. Once a potential call recipient accepts the call, the IVRS 342 may transfer the voice path of the call over the PSTN 330 to the conference call system 348 via an intelligent transfer mechanism. The intelligent transfer mechanism may be, for example, Release Link Trunking or 2B-Channel Transfer. Alternatively, the IVRS 342 may internally connect the call to the conference call system 348 by setting up additional voice paths through the IVRS 342 to the conference call system 348.

The message transfer point 344 is an IP-facing computer system that performs various call management and data processing functions. These functions include validating a caller that calls the IVRS 342, accessing and sending community configuration data to the IVRS 342, receiving from the IVRS 342 and processing the caller community of interest selection, requesting from the presence detection server 362 the online status of the user identities corresponding to potential call recipients that are members of the selected community of interest, generating and sending call notification messages to the online potential call recipients via the alerts system 364, receiving option selections from the alerts system 364, and sending instructions corresponding to the received option selections to the IVRS 342, the conference call system 348, and the Internet telephony gateway 349.

The message transfer point 344 may access the configuration data store 346 to both validate a call received by the IVRS 342 and to retrieve community configuration data. The community configuration data may be, for example, indexed by or otherwise retrievable based on the telephone number of the caller, the user identity specified by the caller, and/or the direct number dialed by the caller.

The message transfer point 344 receives and processes the conference call participation option selections and the conference call connection option selections of the potential call recipients. If no participants desire to join the conference call, the message transfer point 344 instructs the IVRS 342 to send an audio message to the caller indicating that no participants wish to join the call. If only one participant desires to join the conference call and that participant has selected to join the conference call over the PSTN 330, the message transfer point 344 instructs the IVRS 342 to forward the call to the call recipient telephone 315, 320 of the single willing participant (i.e., to the direct number associated with the single willing participant). If one or more participants desire to join the conference call and have selected to join the call over the Internet 350, the message transfer point 344 instructs the Internet telephony gateway 349 to establish a bi-directional audio channel with the call recipient computer systems 365, 370 associated with each of the corresponding participants. If more than one participant desires to join the conference call and have selected to join the call over the PSTN 330, the message transfer point 344 instructs the IVRS 342 to place outbound calls to the call recipient telephone devices 315, 320 associated with the corresponding participants (i.e., to the direct numbers associated with the willing participants).

The message transfer point 344 also sends instructions to the conference call system 348 to setup the conference call. The instructions typically include the number of participants, the data indicating the level of participation of each participant (e.g., active participation or just listening), and identification information that allows the conference call system 348 to identify the connections through which each of the participants will participate in the conference call. In one implementation, the identification information includes the direct telephone numbers of the participants (e.g., the destination telephone number of the outbound calls placed by the IVRS 342 or the telephone number assigned to the participant by the Internet telephony gateway 349). The conference call system 348 may then identify the connection associated with that participant using, for example, DNIS. In another implementation, the identification information includes the channels or the trunk group through which the conference call system 348 receives the voice path associated with that participant. This implementation is typically used when the IVRS 342 internally connects the call associated with the participant to the conference call system 348 by setting up an additional voice path through the IVRS 342 to the conference call system 348.

The configuration data store 346 is a data storage device that is communicatively coupled to the message transfer point 344 and that includes account records, community configuration data records, and community data records. The account records store information related to a subscriber of the conference call service and may be indexed, for example, by subscriber telephone number and/or user identity. The account records may be accessed to determine whether the subscriber is an active subscriber and to determine the call notification message preferences of the subscriber.

Call notification message preferences are instructions typically specified by each user identity that indicate how the call notification message sent to that user identity should be formatted and what options should appear in the call notification message. The options may include call participation options and call connection options. The call participation options may include active participation, listener, no participation, and send audio or text message reply. The audio or text message reply is typically sent when the subscriber does not wish to participate in the conference call and to provide some reasons for not participating. The audio or text message reply to the call notification message may be inputted dynamically by the subscriber upon receipt of the call notification message or may be chosen from among a predetermined set of options (e.g., "Cannot participate due to other preexisting commitment," and "Sorry, but I am busy right now,"). The call connection options may include connecting to the conference call using a traditional telephone connection over the PSTN 330 using, for example, the call recipient telephone 315, 320, or connecting to the conference call using the call recipient computer system 365, 370 (e.g., which may be a data telephone) which may be configured to establish and communicate using a bi-directional audio channel over the Internet 350.

The community configuration data records store the community configuration data for that subscriber and may be indexed, for example, by subscriber telephone number and/or user identity. The community configuration data may take the form of a set of data entries specific to a subscriber that include community of interest identifiers for the communities of interest available to that subscriber. In another implementation, the account records include the community configuration data for that subscriber, and, therefore, community configuration data records are not used.

The community data records include a set of data entries specific to a community of interest that include user identifiers for the members in that community of interest. Each user identifier typically includes a telephone number for that user and may include other information related to establishing a bi-directional voice path with the user across the PSTN 330 or the Internet 350 (e.g., IP address information). The community data records may be indexed, for example, by community of interest identifiers. In another implementation, the data in the community data records, the account records, and the community configuration data records may be subdivided, stored, and indexed in a different fashion than that described above (i.e., all of the data may be accessible in a single data record and indexed by subscriber user identifier).

The conference call system 348 is a telephony-facing computer system configured to receive conference call setup instructions from the message transfer point 344 and initiate a conference call in accordance with the conference call setup instructions. The conference call system 348 receives or accesses information on the number and type of participants (interactive or listen only) and reserves the appropriate quantity of contiguous audio bridging resources. The conference call system 348 configures these resources for both bi-directional and unidirectional (listen-only) participants. It then assigns ports to each of these resources and audio paths are established to those ports.

The conference call system 348 also manages audio bridging resources during the session. For example, the conference call system 348 frees bridging resources when audio paths are no longer attached to ports and reconfigures bridging resources if a participant elects to change between bi-directional and uni-directional participation during the conference. It also re-allocates and adds resources if additional parties elect to join later, or if the session is extended. Additionally, the conference call system 348 de-allocates resources at completion of a session.

In particular, the IVRS 342 sets up voice paths between the call recipient telephone devices 315, 320 and the conference call system 348 for potential call recipients that choose to participate in the conference call over the PSTN 330. The Internet telephony gateway 349 sets up voice paths from the Internet telephony gateway 349 to the conference call system 348 for potential call recipients that choose to participate in the conference call over the Internet 350 using the recipient computer systems 365, 370. The conference call system 348 identifies the voice path connections of each participant based on the identification information included in the instructions received from the message transfer point 344. The conference call system 348 uses the identification information to establish a bi-directional audio bridge that connects the voice paths of the participants. If a participant is a listener, the conference call system may change the voice path to a unidirectional voice path.

The Internet telephony gateway 349 is a computer system configured to be a digital telephony interface that converts packets of encoded voice data received over the Internet 350 into audio sent over voice paths established between the Internet telephony gateway 349 and the conference call system 348. The Internet telephony gateway 349 may use a typical CODECs (e.g., G. 711, G.723, or G.728) to encode and decode the packets of voice data. When a potential call recipient chooses the option to connect to the conference call over the Internet, the message transfer point 344 instructs the Internet telephony gateway 349 to establish a bi-directional audio channel (or, in some implementations, a unidirectional audio channel if the potential call recipient chooses to only listen to the conference call) with the recipient computer system 365, 370. The Internet telephony gateway 349 may communicate with the recipient computer system 365, 370 using, for example, a voice-over-IP communications protocol such as H.323 or SIP.

The Internet telephony gateway 349 also receives from the message transfer point 348 the telephone number or trunk group assigned to the call recipient. The Internet telephony gateway 349 may use the assigned telephone number or trunk group to establish a voice path for that call recipient from the Internet telephony gateway 349 to the conference call system 348. Packets of voice data received from that call recipient may then be decoded, converted to audio, and sent to the conference call system 348 over the appropriate voice path assigned to that call recipient. Similarly, audio received over the voice path assigned to the call recipient may be encoded and converted to voice data packets by the Internet telephony gateway 349 and then sent to the call recipient computer system 365, 370 over the Internet 350. In another implementation, the Internet telephony gateway 349 and the conference call system 348 are implemented as a single or otherwise integrated system configured to handle connections over the Internet 350 and over the PSTN 330.

The presence server 362 is a server that receives, updates, and publishes online presence data for each identity. The presence server 362 enables the message transfer point 344 to access online status data for particular user identities. In one implementation, the presence server 362 is functionally similar to the central server in an Instant Messaging system that receives periodic online status updates from call recipient computer systems 365, 370. In another implementation, the presence server 362 is functionally similar to the presence detection system disclosed in application Ser. No. 10/414,167 that receives communication device status data and user availability to perceive communications data from a device monitor coupled to the device 365B, 370B of the call destination computer system 370. In this implementation, the message transfer point 344 includes the functionality of a device monitoring system.

The alerts system 364 is a computer system configured to enable real time or near real time transmission of call notification messages to call recipient computer systems 365, 370 from the message transfer point 344 and transmission of the option selections from call recipient computer systems 365, 370 to the message transfer point 344. The alerts system 364 is configured to provide this functionality in a manner similar to that used by Instant Messaging systems to enable transmission and receipt of instant messages in real time. Such a system has been described, for example, in application Ser. No. 10/320,712, hereby incorporated by reference.

Figure 4A:
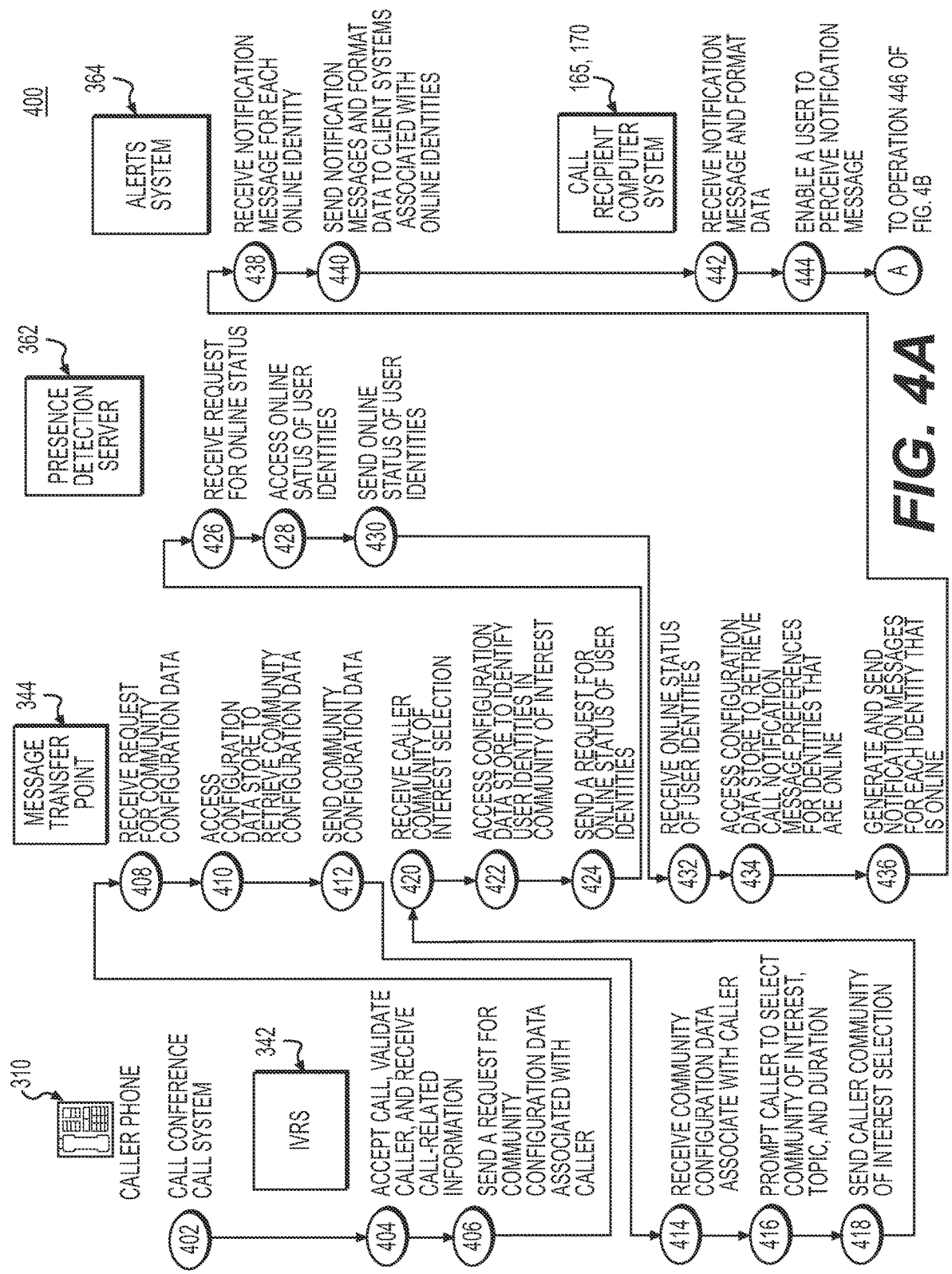
FIGS. 4A-4C are flow charts illustrating a process for initiating a conference call using an electronic messaging interface.
Figure 4B:
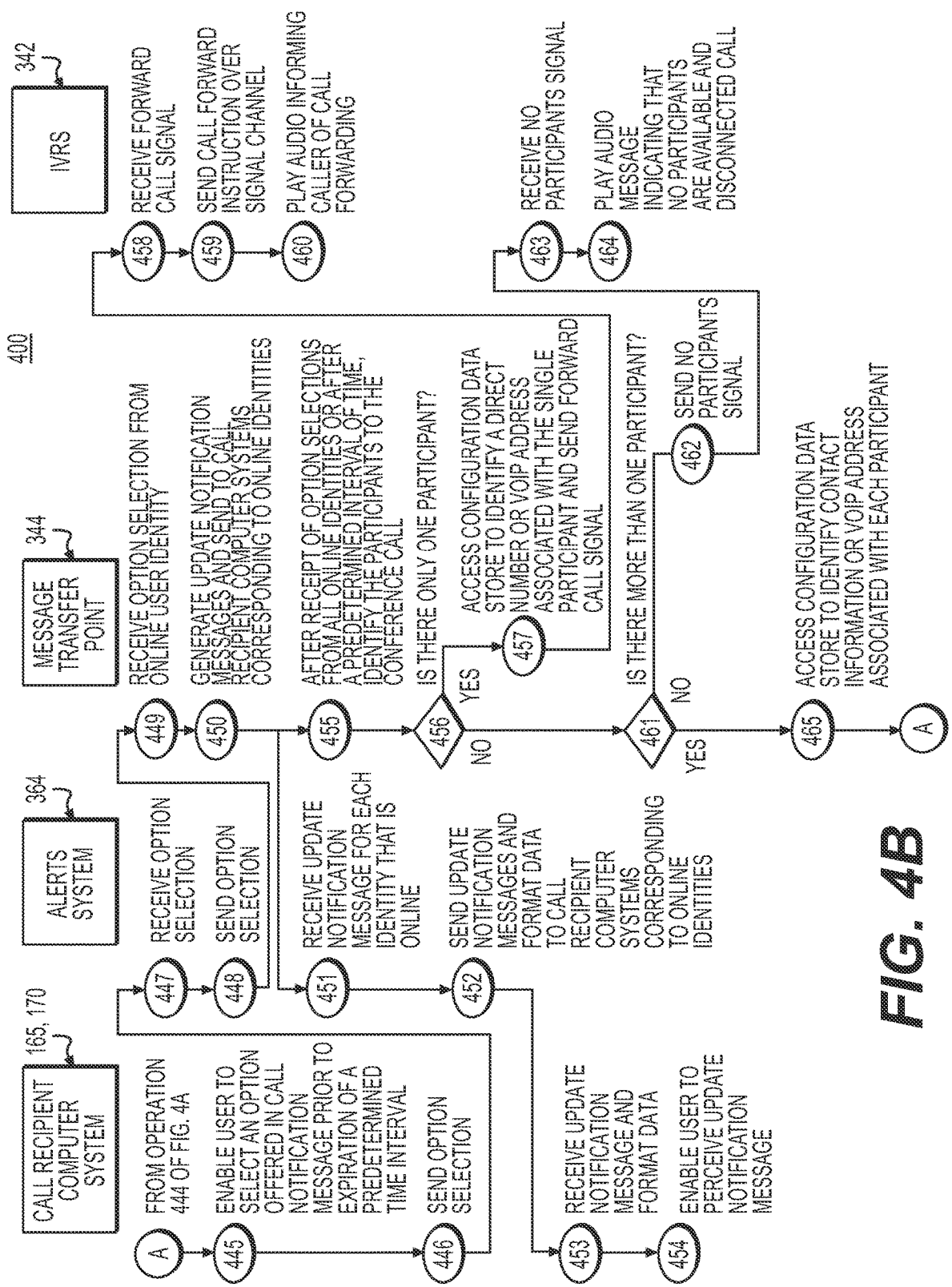
Figure 4C:
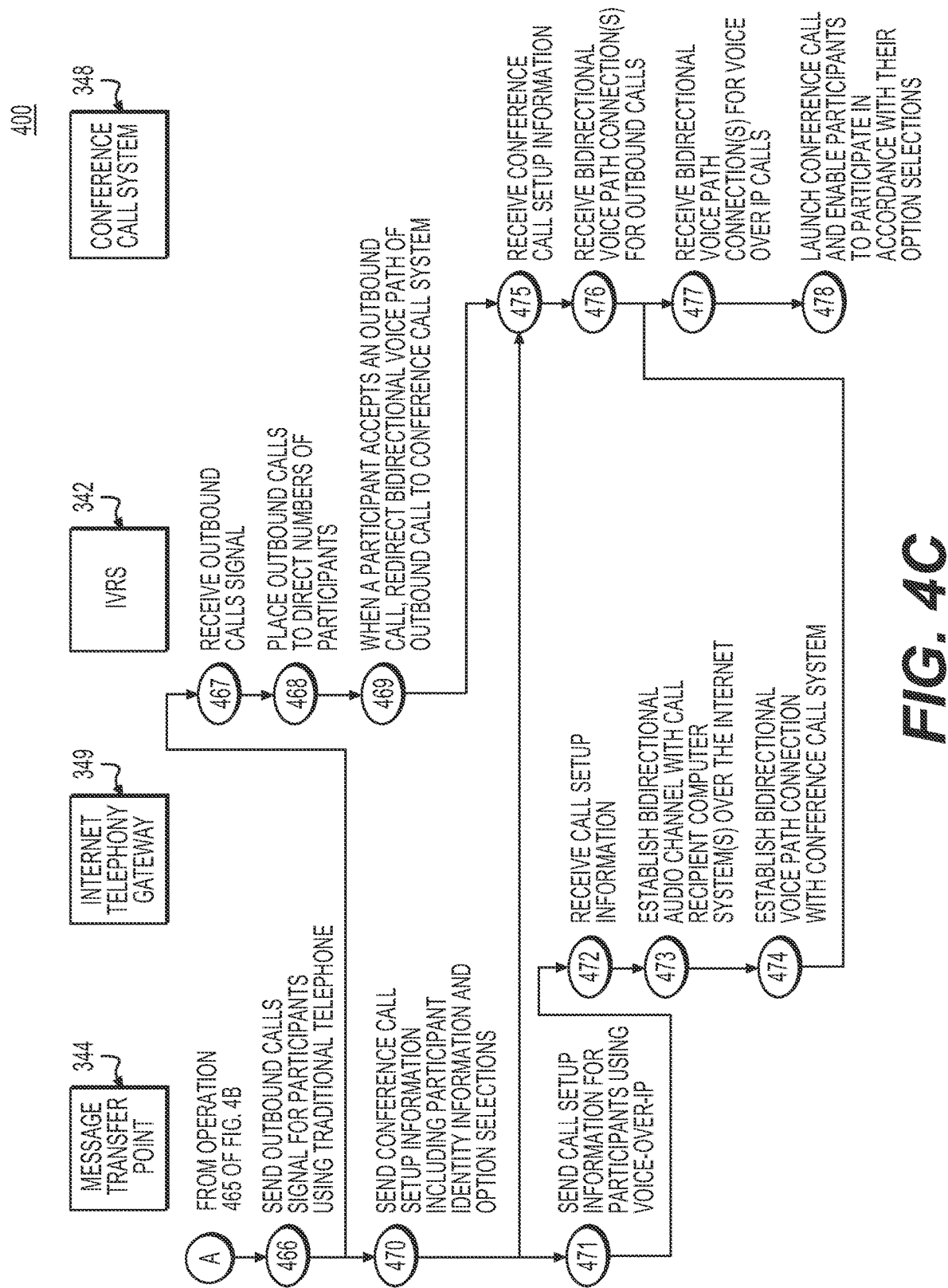

FIGS. 4A to 4C show a process 400 for initiating a conference call using an electronic messaging interface. For convenience, particular components described with respect to FIG. 3 are referenced as performing the process 400. However, similar methodologies may be applied in other implementations where different components are used to define the structure of the system, or where the functionality is distributed differently among the components shown by FIG. 3.

The user of the caller telephone device 110 calls the IVRS 342 (402). The IVRS 342 accepts the call, validates the caller by, for example, prompting the caller for a caller identity and a password, and receives call-related information from the PSTN 330 (404). Once the caller is validated, the IVRS 342 sends a request to the message transfer point 344 for community configuration data associated with the caller (406). The request includes call-related information sufficient to enable the message transfer point 344 to determine the user identity of the caller (e.g., the message transfer point 344 may determine the user identity of the caller based on the telephone number of the caller).

The message transfer point 344 receives the request for communication configuration data (408) and accesses the configuration data store 346 to retrieve the community configuration data from the community configuration data record associated with the user identity of the caller (410). The message transfer point 344 sends the community configuration data to the IVRS 342 (412).

The IVRS 342 receives the community configuration data associated with the caller (414) and prompts the caller to input a conference call topic and conference call duration and prompts the caller to select a community of interest from those included in the community configuration data (416). The IVRS 342, for example, may prompt the caller to select a community of interest using an audio menu-driven interface. Each community of interest may be designated by an audio label or audio description provided by the caller during service registration, and the IVRS 342 speaks the list of audio labels and prompts the caller to select from among the various communities of interest by, for example, pressing a key in the touch pad of the caller telephone device 310 or speaking a number associated with the selected community of interest. The IVRS 342 sends the caller selection to the message transfer point 344 (418).

In another implementation, the message transfer point 344 sends the community configuration data to the caller telephone device 310 over the Internet 350. The caller telephone device 310 may display the available communities of interest in a visual display as a list and enable the caller to select a community of interest from the list. The caller telephone device 310 then sends the selection across the Internet 350 to the message transfer point 344. This implementation assumes that the caller telephone device 310 has data communication capabilities to receive and send data over the Internet 350.

The message transfer point 344 receives the caller community of interest selection (420) and accesses the configuration data store 346 to identify the user identities included in the selected community of interest (422). The message transfer point 344 may identify the user identities by accessing the community data record corresponding to that community of interest. The message transfer point 344 sends a request to the presence detection server 362 for the online status of the user identities in the community of interest (424).

The presence detection server 362 receives the request for the online status of the user identities (426) and accesses the online status of the user identities in the community of interest (428). The presence detection server 362 sends the online status of the user identities to the message transfer point 344 (430).

The message transfer point receives the online status of the user identities (432) and determines whether at least one user identity is online. If no user identities are online, process 400 proceeds, to operation 462. If at least one user identity is online, the message transfer point 344 accesses the configuration data store 346 to retrieve the call notification message format information stored in the account records associated with each online user identity (434). The message transfer point 344 generates call notification messages for each user identity that is online in accordance with the retrieved call notification message formats and sends the call notification messages to the alerts system 364 (436).

The alerts system 364 receives the call notification messages (438) and sends the call notification messages along with format data to call recipient computer systems 365, 370 corresponding to the online user identities (440). The receiving of the call notification messages and sending of the call notification messages and format data may be performed in real time.

Each call recipient computer system 365, 370 receives the call notification message and format data (442) and enables a user to perceive the call notification message (444). In one implementation, the call recipient computer system 365, 370 enables the user to perceive the call notification message as a pop-up window or dialog box that appears on a visual display of the call recipient computer system 365, 370.

The call recipient computer system 365, 370 enables the user to select an option offered in the call notification message prior to expiration of a predetermined time interval (e.g., 2 minutes) (445). The call recipient computer system 365, 370 sends the option selection to the alerts system 364 (446).

The alerts system 364 receives the option selection (447) and sends the option selection to the message transfer point 344 (448). The alerts system 364 may be configured to receive and send the option selection to the message transfer point 344 in real time.

The message transfer point 344 receives the option selection (449) and generates an updated call notification message for each user identity that is online and sends the updated call notification messages to the alerts system 364 (450). The alerts system 364 receives the updated call notification messages (451) and sends the updated call notification message to the corresponding call recipient computer systems 365, 370 (452). Each call recipient computer system 365, 370 receives an updated call notification message (453) and enables a user to perceive the updated call notification message (454).

After the message transfer point 344 receives option selections from all call recipient computer systems 365, 370 or after a predetermined interval of time (e.g., 2 minutes), the message transfer point 344 identifies the participants to the conference call based on the received option selections (455). The message transfer point 344 determines whether only one participant wishes to join the call (456). If the conference call connection options associated with that call recipient indicate that the call recipient wishes to use the call recipient telephone 315, 320 to connect to the conference call over the PSTN 330, the message transfer point 344 sends a forward call signal to the IVRS 346 (457). The IVRS 346 receives the forward call signal (458), sends a call forward instruction to the PSTN 330 over a signal channel (459), and plays an audio message informing the caller that only one participant wishes to join and the call is being forwarded to that participant (460). The PSTN 330 forwards the call to the appropriate call recipient telephone 315, 320 in accordance with the forward call signal received from the IVRS 346.

If the conference call connection options associated with the one call recipient that wishes to participate in the call indicate that the call recipient wishes to use the call recipient computer system 365, 370 to connect to the conference call over the Internet 350, the message transfer point 344 sends appropriate call setup information to the Internet telephony gateway 349. The Internet telephony gateway 349 then enables the recipient computer system 365, 370 of the call recipient to communicate with the conference call system 348 over a bi-directional audio channel (not shown).

The message transfer point 344 determines whether more than one potential call recipient wishes to participate in the conference call (461). If no potential call recipients wish to join the conference call, the message transfer point 344 sends a no participants signal to the IVRS 342 (462). The IVRS 342 receives the no participants signal (463) and plays an audio indicating to the caller that no participants are available to join the conference call (464). The IVRS 342 then instructs the PSTN 330 to disconnect the call (464).

If more than one potential call recipient wishes to join the conference call, the message transfer point 344 accesses the configuration data store to identify contact information associated with each participant (465). If one or more participants have chosen to connect to the conference call over the PSTN 330, the message transfer point 344 sends an outbound calls signal to the IVRS 342 (466). The outbound calls signal includes the telephone numbers of those participants that have chosen to connect to the conference call over the PSTN 330. The IVRS 342 receives the outbound calls signal (467) and places outbound calls to the telephone numbers of the corresponding participants over the PSTN 330 (468). When a participant accepts an outbound call, the IVRS 342 redirects the bi-directional voice path of the outbound call to the conference call system 348 (469).

The message transfer point 344 also sends conference call setup information to the conference call system 348 (470). If one or more participants have chosen to connect to the conference call over the Internet 350 using, for example, voice-over-IP, the message transfer point 344 sends call setup information to the Internet telephony gateway 349 for each of the participants that selected to connect to the conference call over the Internet 350 (471). The call setup information varies depending on the communications protocol used by the Internet telephony gateway 349 but typically includes the IP addresses of the recipient computer systems 365, 370 associated with the respective participants. The call setup information also typically includes the telephone numbers and/or trunk group identifiers assigned to the respective participants. The Internet telephony gateway 349 receives the call setup information (472) and establishes a bi-directional audio channel with the recipient computer systems 365, 370 (473). The Internet telephony gateway 349 also establishes a bi-directional voice path with the conference call system 348 for the corresponding recipient computer system 365, 370 (474). The gateway 349 enables audio communication between a recipient computer system 365, 370 and the conference call system 348 by receiving voice data packets from the recipient computer system 365, 370 over the bi-directional audio channel, decoding the voice data packets, converting the voice data packets to audio, and sending the audio to the conference call system 348 over the voice path assigned to that call recipient computer system 365, 370.

The conference call system 348 receives conference call setup information from the message transfer point 344 (475). The conference call system also receives bi-directional voice path connections for the outbound calls placed by the IVRS 342 (476) and for the Internet telephony calls placed by the Internet telephony gateway 349 (477). Once all participants have been connected to the conference call system 348 over a voice path, the conference call system 348 launches a conference call that enables participants to participate in accordance with their option selections (478).

In another implementation, the message transfer point 344 does not wait to receive option selections from all online identities before setting up the conference call. Rather, the message transfer point 344, the Internet telephony gateway 349, and the IVRS 342 perform operations 465-478 as soon as one or two participants agree to join the call. Additional participants may then join the conference call in progress by selecting the option to join the conference call in the updated call notification message. The updated call notification message may indicate to the remaining potential call recipients that the conference call is in progress. In this implementation, the additional participants may be allowed to select to join the conference call at any time during its duration (i.e., they are not forced to select a participation option in the predetermined time interval). Alternatively, the additional participants may be allowed to join the conference call only for a predetermined interval of time while the conference call is in progress (e.g., one minute).

FIG. 5A shows a user interface 500 that may be presented to the user by the call recipient computer system 165, 170, 365, 370 upon receipt of a call notification message. The user interface 500 includes a statements 510, 515, 516, and 517 informing the user of the conference call invitation, the topic of the conference call (e.g., "Review Parodi project progress"), the expected duration of the conference call (e.g., "30 minutes"), and the community of interest invited to join the conference call (e.g., "The Ultrasound Hardware Group"), respectively. The user interface 500 also includes caller-related information 520. The caller-related information 520 may include the name of the caller 522 (e.g., Bob Devane), the direct number of the caller telephone device 524 (e.g., (703) 123-4567), the time and date when the call was received 526 (e.g., 5:45 EDT on May, 17, 2002), and/or other caller-related information 528 that may be determined based on the direct number of the caller telephone device 310. The other caller-related information 528 may include, for example, a caller-approved identifier (e.g., a replacement for the caller's name if the caller does not wish to disclose his or her name), the geographic location of the caller (e.g., Dulles, Va.) and information stored in an address book or calendar that is accessible based on the direct number of the caller telephone device 110 (e.g., Meeting scheduled with Bob on Saturday Jul. 12, 2003). Such information may be stored locally at the call recipient computer system 165, 170, 365, 370 or may be accessible from a remote device across the data network 150 or the Internet 350.

The user interface 500 also includes participation option buttons 530 and checkboxes 540 that may be selected by the user to react to the call. The participation option buttons 530 may include, for example, an option button to join the conference call as an active participant 532, an option button to join the conference call as a listener 534, and an option button to not join the conference call 536. The checkboxes 540 may include, for example, a checkbox 542 to send a message to the other potential participants of the conference call, a checkbox 544 to join the conference call over the telephone network 130 or the PSTN 330, and a checkbox 546 to join the conference call over the data network 150 or the Internet 350.

Selecting the option button to join the call as an active participant 532 results in the user joining the call and being able to both listen and speak to the other participants. Selecting the option button to join the conference call as a listener 534 results in the user joining the call and being able to listen but not speak to the other participants. Selecting the option button to not join the conference call 536 results in the user rejecting the invitation to join the conference call.

Figure 5B:
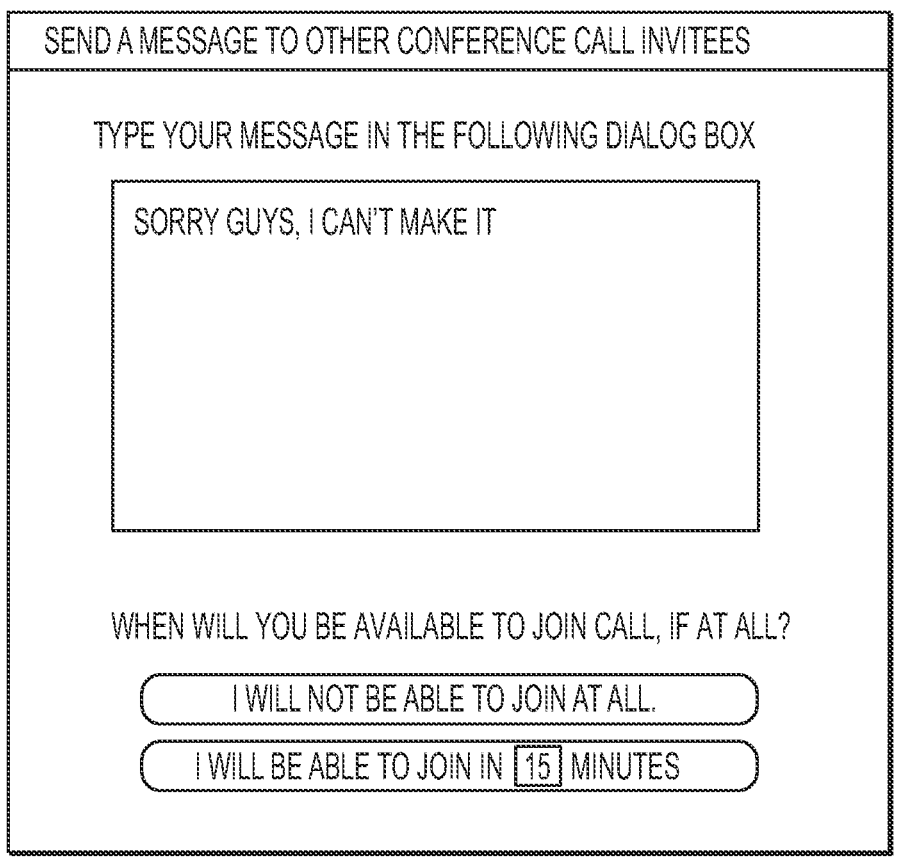

The user may choose to send a message to the other potential conference call participants by selecting (i.e. "checking") checkbox 542. If the user selects checkbox 542, upon the user selecting one of the participation option buttons 530, the user is prompted to input (or speak) a message or to select a predetermined message from a list of messages. The message is sent as part of the option selection to the ICCP 140, 340. In another implementation, the user interface 500 does not include checkbox 542 and the user is only prompted to input a message if the user selects to not participate in the conference call. The user may be prompted to input why he or she is unavailable to join the conference call and when he or she would be available to join such a call. FIG. 5B shows an exemplary user interface 550 that may be presented to the user to prompt the user to input why he or she is unavailable to join the conference call.

The user may choose to connect to the conference call over the telephone network 130 or over the PSTN 330 by selecting checkbox 544. The user may choose to connect to the conference call over the data network 150 or over the Internet 350 by selecting checkbox 546.

In another implementation, some or all of the call participation or call connection options selectable using the user interface 550 may not be available. Instead, some or all of the call participation and/or call connection option selections may be predetermined based on a set of default option selections previously setup for the user and chosen by or for the user. The default option selections may be stored in the subscriber account records and may vary based on the caller identity.

The user interface 500 may vary depending on the capabilities of the call recipient computer systems 165, 170, 365, 370 and the format data received from the online service provider system 160, 360. As mentioned before, call recipient computer systems 165, 170, 365, 370 with more limited capabilities may provide less caller-related information 510 and less call participation options 530 and checkboxes 540 while call recipient computer systems 165, 170, 365, 370 with greater capabilities may provide more caller-related information 510 and more options 530 and checkboxes 540.

FIG. 6 shows a user interface 600 that may be presented to the user by the call recipient computer system 165, 170, 365, 370 upon receipt of an updated call notification message. The user interface 600 includes a conference call status window 610. The conference call status window 610 includes a list 620 of data entries. Each data entry corresponds to a potential participant in the community of interest. The list 620 is divided into an invitee column 630, a status column 640, and a message column 650. A representative data entry 660 is shown.

The invitee column 630 displays the user identities of the potential participants. The status column 640 includes the participation status of the potential participants. The participation status may be designated, for example, as "active" to indicate an active participant, "inactive" to indicate a potential participant who will not be joining the conference call, "listener" to indicate a participant that will listen to the conference call but not otherwise participate in the conference call, and "?" to indicate a potential participant that has yet to select a participation option in response to a call notification message. The message column 650 includes messages sent by the potential participants to be viewed by all potential participants. The messages typically relate to the conference call or the message sender's participation in the conference call. The representative data entry 660 shows that the user identity "devoPar" has chosen to actively participate in the conference call and has sent to the other potential participants the message "John is with me and will join the call."

In another implementation, the information disclosed in the conference call status window 610 may be incorporated into the user interface 500 in a separate portion of the user interface 500 designated as, for example, "Conference Call Status." In yet another implementation, the conference call status window 610 only shows a total number of invitees for each status category (e.g., 3 active, 2 listener, 1 inactive, and 5?) and only shows a data entry 660 for those potential participants that send a message to the other potential participants.

Figure 15A:
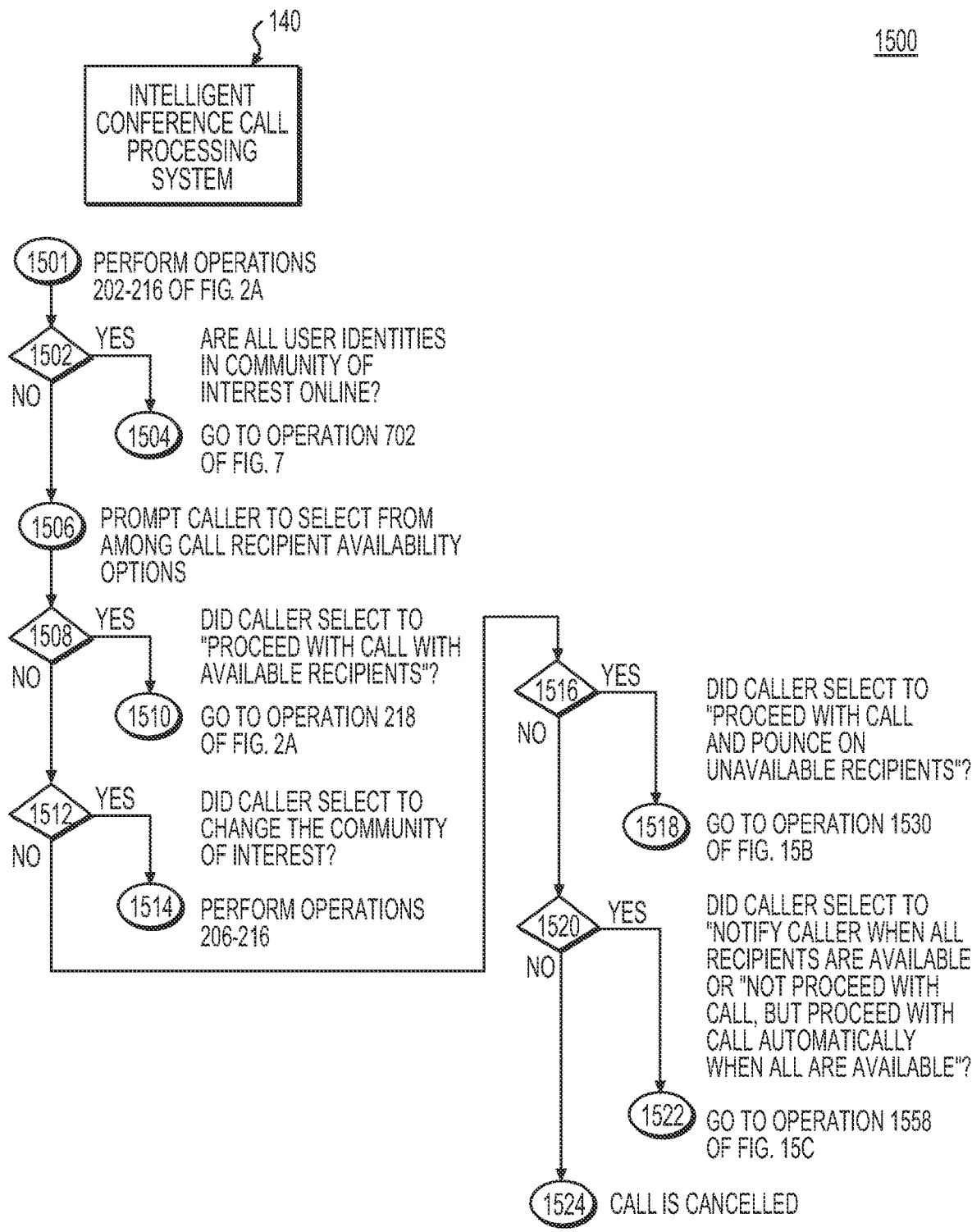
FIGS. 15A-15C are flow charts illustrating a process for initiating a conference call using an electronic messaging interface that provides an initiating user with enhanced flexibility in sending out conference call invitations to potential call recipients that are not currently online.
Figure 15B:
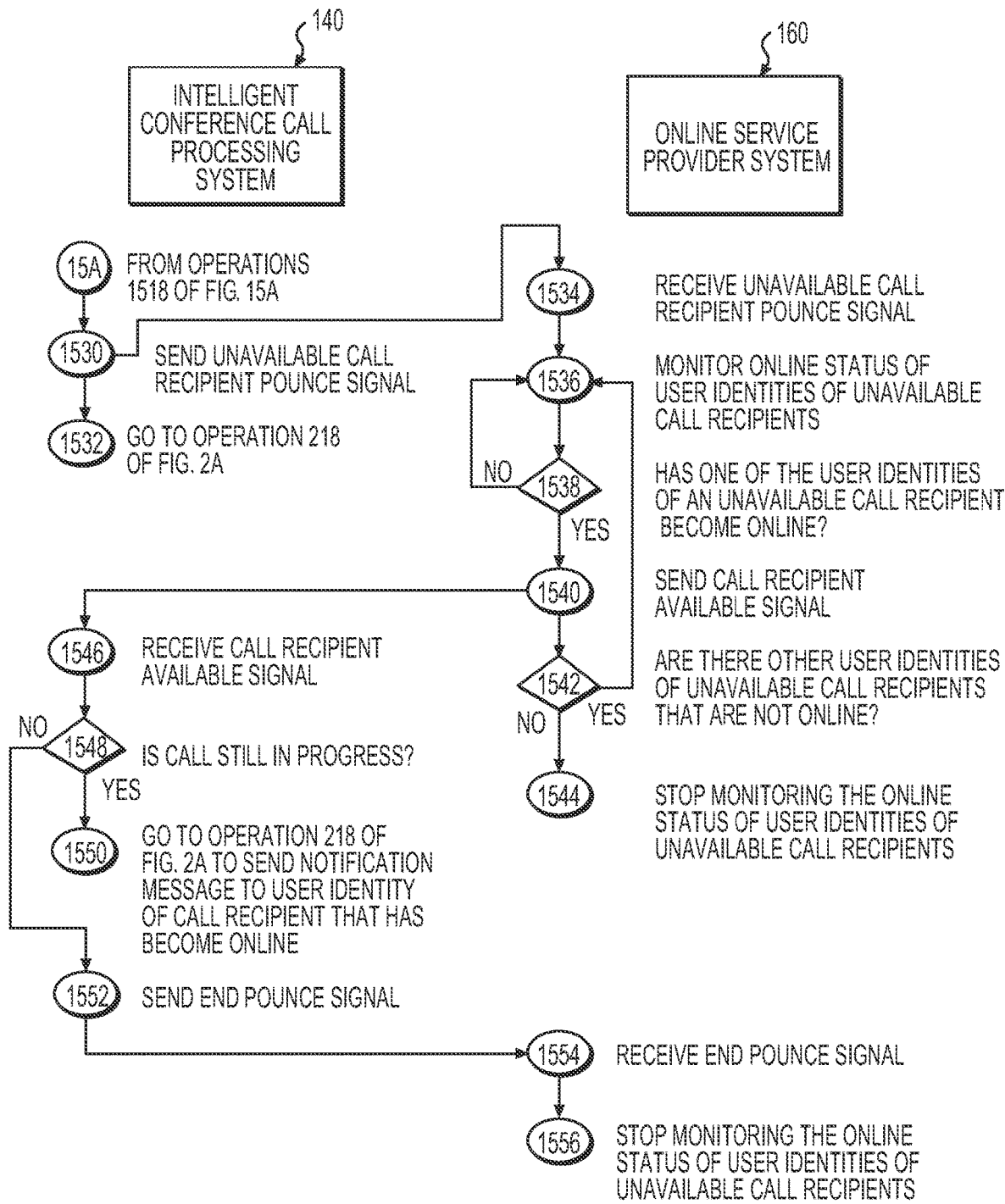
Figure 15C:
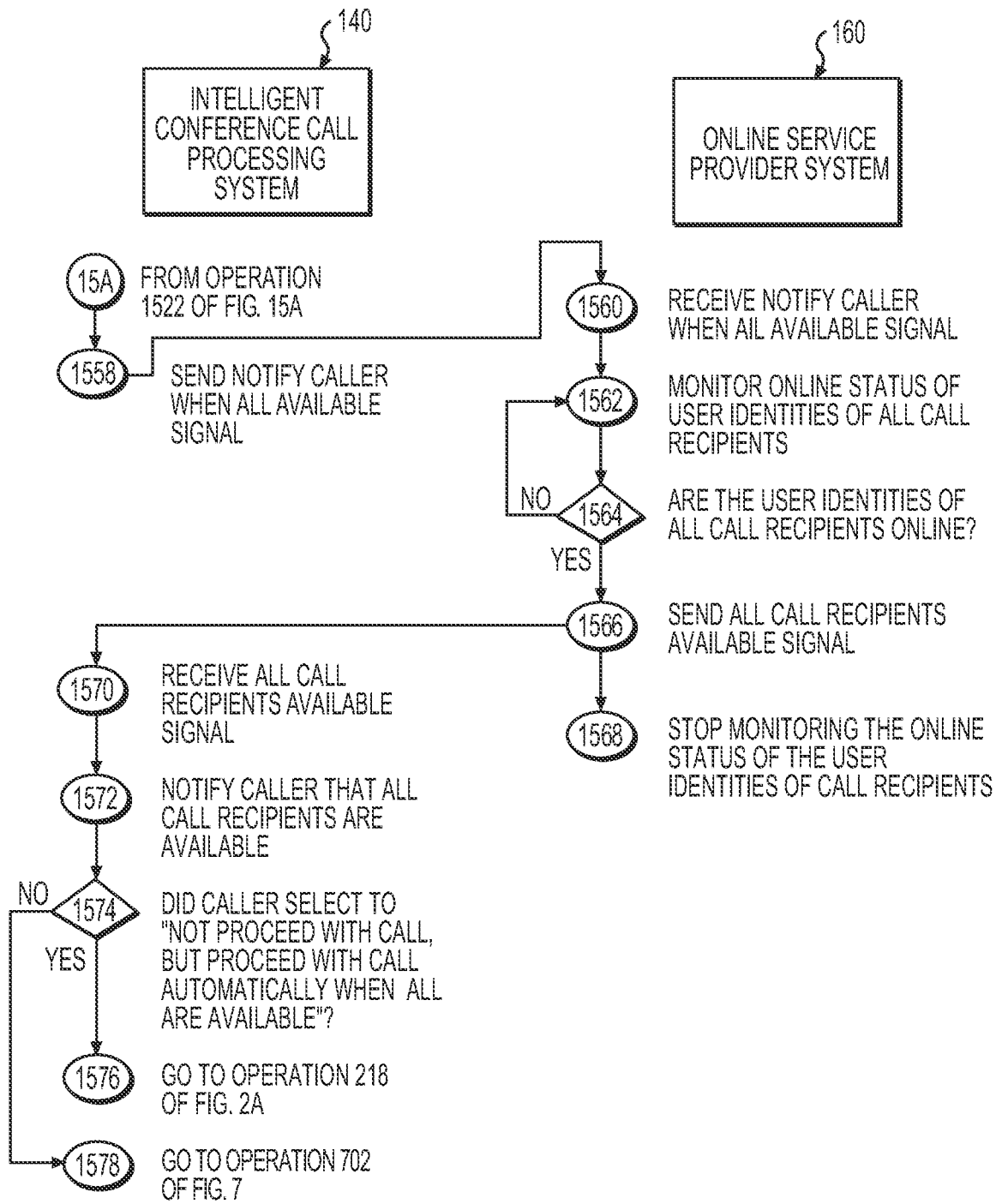

FIGS. 15A-15C show a process 1500 for initiating a conference call using an electronic messaging system that provides an initiating caller with enhanced flexibility in sending out conference call invitations (i.e., call notification messages) to potential call recipients that are not currently online. For convenience, particular components described with respect to FIG. 1A are referenced as performing the process 1500. However, similar methodologies may be applied in other implementations where different components are used to define the structure of the system, or where the functionality is distributed differently among the components shown by FIG. 1A. Process 1500 incorporates by reference many of the operations of process 200.

At 1501, operations 202-216 of process 200 are performed to validate a caller, prompt the caller to select a community of interest, topic, and duration, identify user identities in the community of interest, and receive the online status of the user identities in the community of interest. The ICCPS 140 determines whether all of the user identities in the community of interest are online (1502). If all of the user identities in the community of interest are online, process 1500 proceeds to operation 702 of process 700 (FIG. 7A) (1504) to enable the caller to select to proceed with the call, cancel the call, or choose another community of interest. If all of the user identities in the community of interest are not online, the ICCPS 140 prompts the caller to select from among call recipient availability options (1506).

Figure 16:
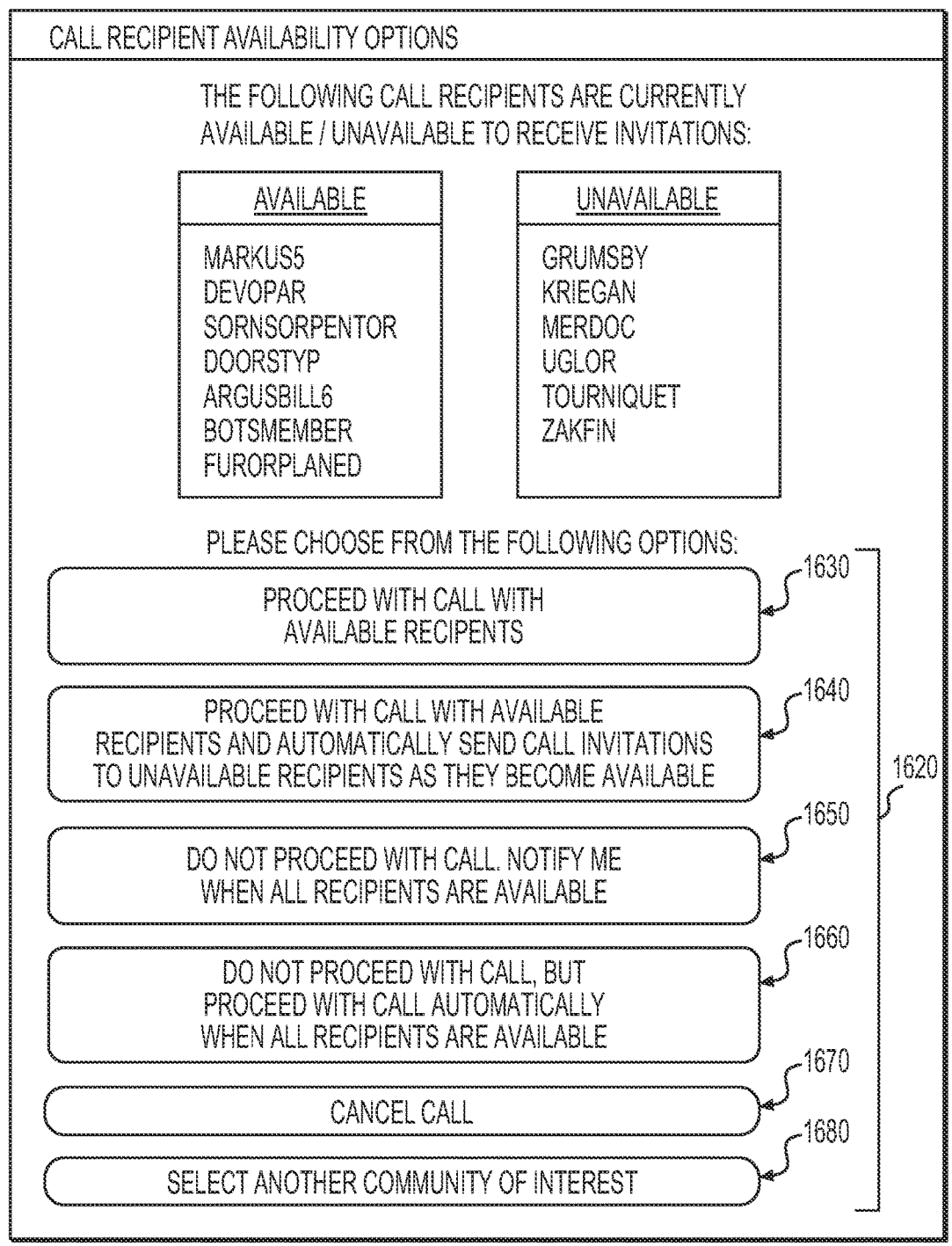
FIG. 16 illustrates an example of a user interface that presents to the user the identities of the call recipients that are available and unavailable to receive conference call invitations and enables user selection of call recipient availability options.
Figure 17A:
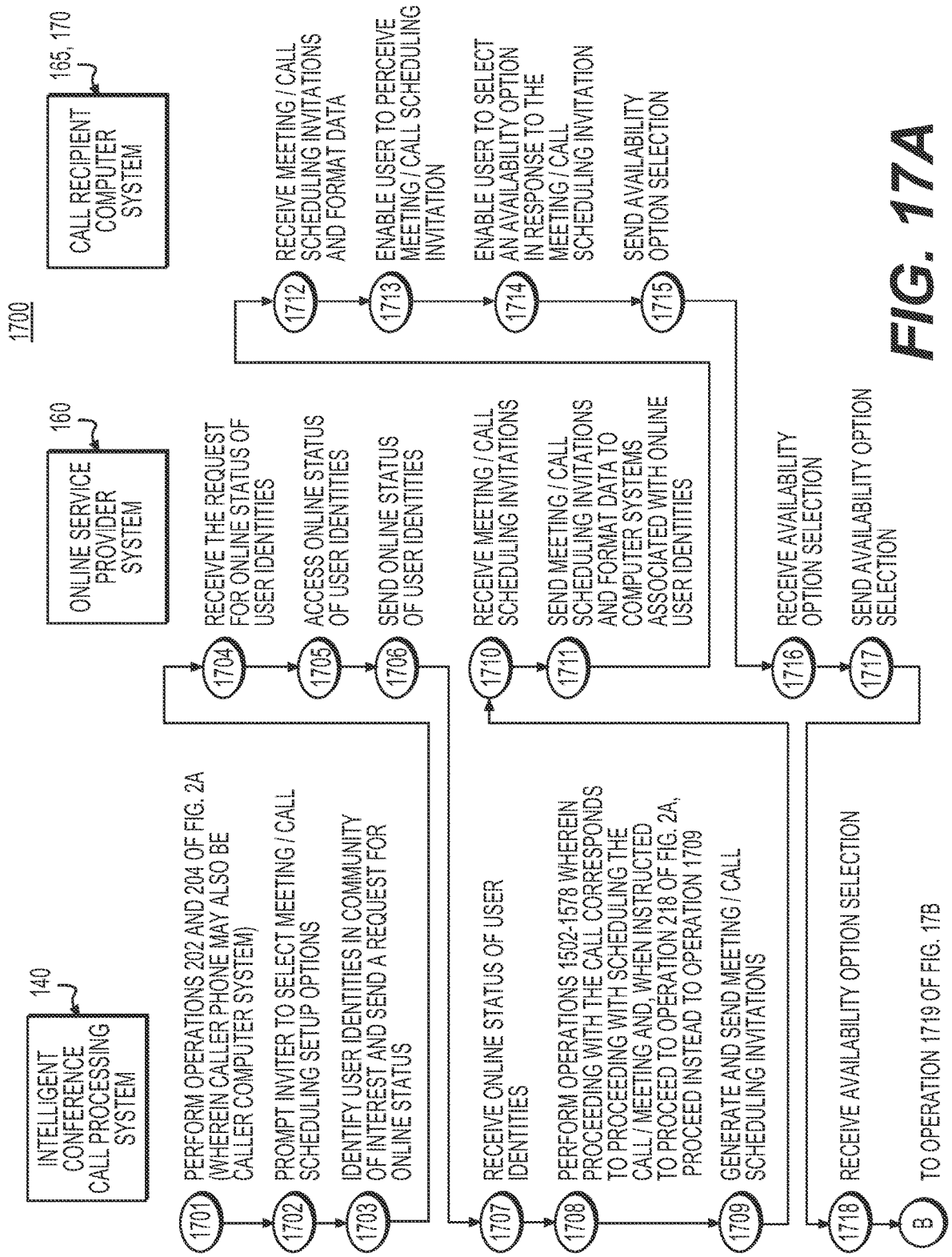
Figure 17B:
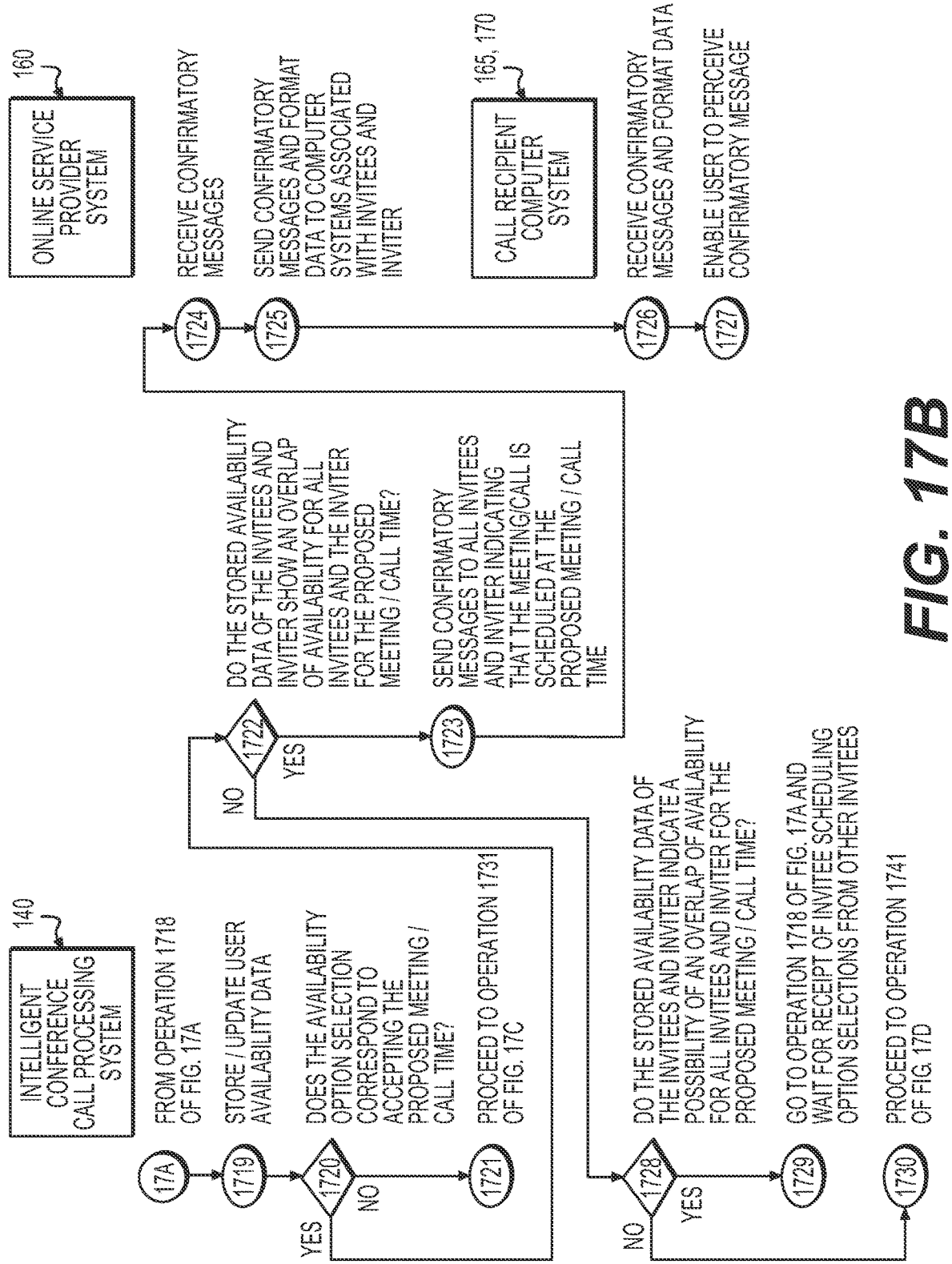
Figure 17D:
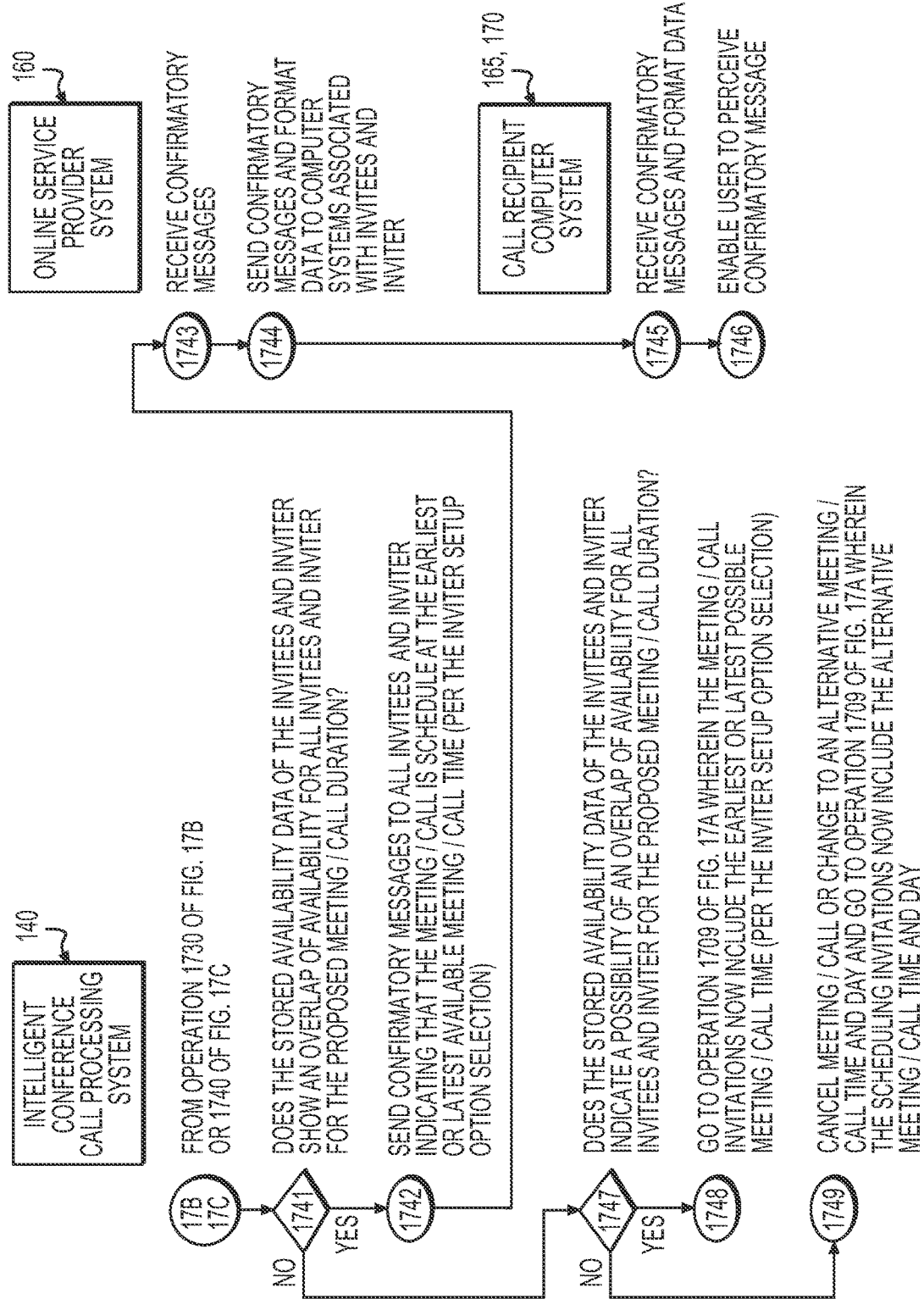

FIG. 16 shows an exemplary graphical user interface 1600 configured to display the user the identities of the call recipients that are available and unavailable to receive conference call invitations and enable user selection of call recipient availability options. The user interface 1600 includes a call recipient display area 1610 that visually indicates which call recipients are available and which call recipients are unavailable to receive conference call invitations The user interface also includes an option display area 1615 with which the user may interact to select a call recipient availability option. In this example, the option display area 1615 includes a set of option buttons 1620. The set of option buttons 1620 include: an option button 1630 selectable to setup and initiate the conference call with the currently available call recipients; an option button 1640 selectable to setup and initiate the conference call with the currently available call recipients while automatically sending call invitations to unavailable call recipients as they become available; an option button 1650 selectable to not setup or initiate the conference call at the present time but rather to inform or notify the user when all call recipients are concurrently available to receive conference call invitations; an option button 1660 selectable to not setup or initiate the conference call at the the present time but to automatically send conference call invitations to all call recipients when all call recipients become concurrently available; an option button 1670 selectable to cancel the conference call; and an option button 1680 selectable to change the community of interest.

Referring back to FIGS. 15A-15D, if the caller selects the option to "proceed with call with available recipients" by, for example, selecting the option button 1630 (1508), process 1500 proceeds to operation 218 of FIG. 2A to setup and initiate the conference call with only those call recipients associated with user identities that are online (1510). If the caller selects the option to "change the community of interest" by, for example, selecting the option button 1680 (1512), process 1500 proceeds to operations 206-216 of FIG. 2A and then returns to operation 1502 (1514). If the caller selects the option to "proceed with the call and pounce on unavailable recipients" by, for example, selecting the option button 1640 (1516), process 1500 proceeds to operation 1530 to setup and initiate the call and to automatically send out conference call invitations to unavailable call recipients as the user identities associated with those call recipients come online (1518). If the caller selects the option to "notify caller when all recipients are available" by, for example, selecting the option button 1650 (1520), process 1500 proceeds to operation 1558 to monitor the online status of user identities associated with the call recipients and to notify the caller when all of the call recipient user identities are concurrently online (1522). If the caller selects the option to "not proceed with the call, but proceed with the call automatically when all recipients are available" by, for example, selecting the option button 1660 (1520), process 1500 proceeds to operation 1558 to monitor the online status of user identities associated with the call recipients and to setup and initiate the conference call when all of the call recipient user identities are concurrently online (1522). If the caller does not select any of the aforementioned options, the call may be canceled (1524) (e.g., after a predetermined interval of time or when the caller specifically selects an option to cancel the call).

More particularly with respect to FIGS. 15A and 15B, if the caller selects the option to "proceed with the call and pounce on unavailable recipients" (1518 of FIG. 15A), the ICCPS 140 sends an unavailable call recipient pounce signal to the online service provider system 160 (1530 of FIG. 15B). In some implementations, the unavailable call recipient pounce signal identifies the identities corresponding to the unavailable call recipients. The online service provider system 160 receives the unavailable call recipient pounce signal (1534) and begins monitoring the online status of the user identities associated with the unavailable call recipients (1536). The online service provider system 160 monitors the online status to detect when one of the user identities associated with an unavailable call recipient comes online (1538).

If one of the user identities associated the an unavailable call recipient comes online, the online service provider system 160 sends a call recipient available signal to the ICCPS 140 (1540). The call recipient available signal typically identifies the user identity that has come online. Prior to, concurrent with, or subsequent to sending the call recipient available signal, the online service provider system 160 determines whether any other user identities of unavailable call recipients have yet to come online (1542). If there are other user identities associated with unavailable call recipients that have yet to come online, the online service provider system continues monitoring (1536). If however, all of the user identities associated with unavailable call recipients have at some point come online while being monitored by the online service provider system 160, the online service provider system 160 stops monitoring (1544).

The ICCPS 140 receives the call recipient available signal (1546) and determines whether the conference call is still in progress (1548). If the conference call is still in progress, process 1500 proceeds to operation 218 of process 200 to automatically send a conference call invitation (i.e., a call notification message) to the call recipient associated with the user identity that has come online (1550). Notably, in this implementation of process 200 the conference call is already setup and in progress and the call recipient may select to asynchronously join or "jump into" the conference call.

If the conference call is no longer in progress, the ICCPS 140 sends an end pounce signal to the online service provider system 160 (1552). The online service provider system 160 receives the end pounce signal (1554) and stops monitoring the online status of the user identities associated with unavailable call recipients (1556). In another implementation, the ICCPS 140 sends an end pounce signal automatically when the conference call terminates to instruct the online service provider system 160 to stop monitoring.

And, more particularly with respect to FIGS. 15A and 15C, if the caller selects the option to "notify caller when all recipients are available" or the option to "not proceed with the call, but proceed with the call automatically when all recipients are available" (1520 of FIG. 15A), the ICCPS 140 sends a notify caller when all available signal to the online service provider system 160 (1558 of FIG. 15C). The online service provider system 160 receives the notify caller when all available signal (1560) and begins to monitor the online status of the user identities associated with all of the call recipients (1562). The online service provider system 160 monitors the identities to determine when the user identities of all of the call recipients are concurrently online (1564).

When the user identities of all of the call recipients are concurrently online, the online service provider system 160 sends an all call recipients available signal to the ICCPS 140 (1566) and stops monitoring (1568). The ICCPS 140 receives the all call recipients available signal (1570) and notifies the caller that all of the call recipients are now available (1572). The ICCPS 140 may, for example, present to the caller a pop-up window that informs the caller that all of the call recipients are now available. If the caller selected the option to "not proceed with the call, but proceed with the call automatically when all recipients are available," process 1500 proceeds to operation 218 of process 200 to proceed with the call by automatically sending out conference call invitations (1576). Otherwise, process 1500 then proceeds to operation 702 of process 700 to enable the caller to choose to proceed with the conference call (1578). FIGS. 17A-17D show a process 1700 for scheduling a conference call or meeting using an electronic messaging system. In process 1700, the caller is referred to more generally as an "inviter" to better reflect that this implementation is not limited to a call context. For convenience, particular components described with respect to FIG. 1A are referenced as performing the process 1700. However, similar methodologies may be applied in other implementations where different components are used to define the structure of the system, or where the functionality is distributed differently among the components shown by FIG. 1A. Process 1500 incorporates by reference many of the operations of process 200.

Operations 202-204 of process 200 are performed to validate an inviter (1701). The inviter may use a caller phone 110 to call the ICCPS 140 and/or a caller computer system to access the ICCPS 140. Once the inviter has been validated, the ICCPS 140 prompts the inviter to select from among a set of meeting/call scheduling setup options (1702).

FIG. 18 shows an exemplary graphical user interface 1800 configured to enable caller selection from among a set of meeting/call scheduling setup options. The user interface 1800 includes various fields 1810 that may be populated or otherwise filled in by the user. The fields 1810 include: a meeting/call topic field 1812 in which the user may input the topic of the call or meeting (e.g., "Review Parodi Project Progress"); a community of interest field 1814 in which the user may input the community of interest that will receive call/meeting schedule invitations (e.g., "The Ultrasound Hardware Group"); a location of meeting field 1816 which is optionally displayed if setting up a meeting rather than a call and in which the user may input a location of the meeting (e.g., "The Lafayette Conference Room"); a meeting/call day field 1818 in which the user may input an initial proposed day during which the user wishes the meeting/conference call to be scheduled (e.g., "10/31/05"); a meeting/call start time field 1820 in which the user may input a proposed start time for the meeting/call (e.g., "10 AM"); a meeting duration field 1822 in which the user may input the expected duration of the meeting (e.g., "1 Hour"); and a start time window field 1824 in which the user may input a range of time from which the start time of the meeting/call may be chosen if unable to schedule the meeting/call at the proposed start time (i.e., unable to schedule the meeting/call at 10 AM). In this example, the start time window is "9 AM to 5 PM", and therefore, the range of possible start times for the meeting/call is any time between 9 AM and 5 PM. In some implementations, the start time window is the same as the user's availability for the proposed day. For example, the user may only be available to meet from 10 AM-2 PM and 3 PM-6 PM on Oct. 31, 2005, and, therefore, the user specifically sets the start time window to be 10 AM-1 PM and 3 PM-5 PM (i.e., since the duration of the meeting is 1 hour). In another implementation, the start time window is automatically determined by accessing a stored calendar associated with the user.

The user interface 1800 also includes a start time preference display 1826 with which the user may interact to indicate whether the user prefers, when multiple start times are possible, selection of a start time that is earlier or later in the day. For example, if all invitees are available to participate in the meeting/call at 11 AM-12 PM and at 3 PM-4 PM on Oct. 31, 2005, then the meeting start time will be at 11 AM if the start time preference indicates that the inviter prefers start times early in the day and will be scheduled at 3 PM if the start time preference indicates that the inviter prefers start times later in the day.

The user interface 1800 also includes an inviter availability display 1828 with which the user may interact to specify his or her availability during the proposed day of the meeting/call. In this exemplary user interface, the user may choose to not specify his or her availability on the proposed day (in which case his or her availability is determined iteratively and dynamically through operations 1709-1749 of the described scheduling process 1700), specify his or her availability as being the same as the start time window inputted into field 1824, manually specify his or her availability, and automatically specify his or her availability based on stored calendar information specific to the user. For example, the user's availability may be depicted as a timeline between 9 AM and 6 PM (i.e., the beginning time of the start time window to the end time of the start time window plus the duration of the meeting) that includes contiguous blocks of time, some of which are designated as unavailable and some of which are designated as available.

Notably, the availability of the user may be obtained by interfacing and accessing stored calendar information from an application that provides time organization and calendar functions. The calendar information may be stored locally or on a remote server. The described processes and systems thereby enable users with different calendar applications (e.g., MICROSOFT OUTLOOK, NETSCAPE CALENDAR) to share availability information and automatically setup meetings/conference calls with each other and with users that have no stored calendar information.

Once the user has provided the information in the fields 1810, the start time preference display 1826 and the inviter availability display 1828, the user may select to submit the call/meeting setup information by selecting, for example, a submit button 1830. Alternatively, the user may cancel the call/meeting setup at any time by selecting, for example, the cancel button 1832.

Referring back to FIGS. 17A-17D, once the inviter has selected the meeting/call scheduling setup options by, for example, interacting with the graphical user interface 1800, the ICCPS 140 identifies the user identities in the community of interest chosen by the inviter and sends a request to the online service provider system 160 for the online status of the user identities (1703). The online service provider 160 receives the request for the online status of the user identities (1704), accesses the online status of the user identities (1705), and sends the online status of the user identities to the ICCPS 140 (1706).

The ICCPS 140 receives the online status of the user identities (1707) and performs operations 1502-1578 of process 1500 (1708). However, when performing operations 1502-1578, references to "proceeding with the call" are replaced by "proceeding with scheduling the call or meeting" and instructions to proceed to operation 218 of process 200 are replaced by instructions to proceed to operation 1709. Moreover, when performing operation 1548, the ICCPS 140 checks whether the meeting/call as scheduled by the available call recipients has not already occurred rather than checking whether the call is still in progress. If the scheduled meeting/call has not already occurred, then process 700 proceeds to operation 1709 and a meeting/call scheduling invitation is sent to the previously unavailable recipient. If the scheduled meeting/call has already occurred, an end pounce signal is sent to the online service provider system 160 and the monitoring of the online status is ended.

FIG. 19 shows a graphical user interface 1900 that corresponds to the graphical user interface 1600 but that is configured for scheduling calls/meetings rather than initiating a conference call.

The ICCPS 140 generates and sends meeting/call scheduling invitations to recipients associated with user identities that are online (1709). The online service provider system 1709 receives the meeting/call scheduling invitations (1710) and sends the meeting/call scheduling invitations and format data to computer systems associated with the user identities that are online (1711). The call recipient computer systems 165,170 receives the meeting/call scheduling invitations and format data (1712), enables the user to perceive the meeting/call scheduling invitations and format data (1713), and enables users to select an availability option from among a set of availability options in response to the meeting/call scheduling invitation (1714).

FIG. 20 shows an exemplary graphical user interface 2000 configured to enable an invitee to respond to a meeting/call scheduling invitation. The user interface 2000 may present information related to the inviter and to the proposed call or meeting that is similar to that presented in the user interface 500 (e.g., the topic, the community of interest, and the duration). The user interface 2000 also includes a statement 2005 prompting the user to respond to a proposed meeting/call day and time (e.g., "Are you available to participate in this conference call on Oct. 31, 2005 at 10-11 AM?"). The user may respond by selecting one of a set of availability option boxes 2010. The set of availability option boxes 2010 include an option box 2015 selectable to accept the proposed meeting/call time and day. Selection of the option box 2015 results in, for example, transmission of user availability data to the ICCPS 140 that indicates that the user is available during the interval of time corresponding to the proposed meeting/call (e.g., the user availability data reflects that the user is available from 10 AM-11 AM on Oct. 31, 2005).

The set of availability option boxes 2010 also may include an option box 2020 selectable to indicate that the user is unavailable to join the call/meeting at all on the proposed day. Selection of the option box 2020 results in, for example, transmission of user availability data to the ICCPS 140 that indicates that the user is completely unavailable on the proposed day (e.g., the user availability data reflects that the user is not available at all on Oct. 31, 2005). In another implementation, the user interface 2000 includes an option box selectable to indicate that the user is not available to join the call/meeting on any day.

The set of availability option boxes 2010 also may include an option box 2030 selectable to indicate that the user is unavailable to join the call/meeting at the proposed time but is available to join the call/meeting at a different time on the proposed day. The user may specify an alternative time on the proposed day by, for example, moving a time block 2032 along a timeline bar 2034. The length of the time block 2032 corresponds to the duration of the proposed call or meeting. The length of the timeline bar 2034 may be limited by the start time window designated by the inviter (e.g., if the start time window is 9 AM-5 PM and the duration of the meeting is 1 hour, the timeline bar 2034 may be limited to 9 AM-6 PM to prevent the user from being able to propose a new meeting/call start time that falls outside of the start time window). For example, the user may indicate that he or she is unavailable to participate in the call/meeting at 10 AM-11 AM on Oct. 31, 2005 but is available to participate in the call/meeting at 11 AM-12 PM. Selection of the option box 2030 and manual designation of an alternative meeting/call time results in, for example, transmission of user availability data to the ICCPS 140 that indicates that the user is unavailable during the proposed time of the meeting but is available during a manually entered alternative time (e.g., the user availability data reflects unavailability from 10 AM-11 AM on Oct. 31, 2005 and reflects availability from 11 AM-12 PM on Oct. 31, 2005).

The set of availability option boxes 2010 also may include an option box 2040 selectable to indicate that the user is available to join the call/meeting if the call/meeting takes place during an availability time block that is manually entered by the user. The user may manually enter one or more time blocks of varying length (i.e., time durations) on a timeline bar 2044. For example, the user may indicate that he or she is only available to participate in a call/meeting from 9 AM-10 AM and from 2 PM-6 PM on Oct. 31, 2005. As described above, the start time window specified by the inviter may limit the length of the timeline bar. Selection of the option box 2040 and manual designation of availability time blocks results in, for example, transmission of user availability data to the ICCPS 140 that indicates that the user is available at the times corresponding to the manually entered availability time blocks and unavailable at the times that fall outside of the manually entered availability time blocks (e.g., the user availability data reflects availability from 9 AM-10 AM and from 2 PM-6 PM and unavailability from 10 AM-2 PM on Oct. 31, 2005).

The set of availability option boxes 2010 also may include an option box 2050 selectable to indicate that the user is available to join the call/meeting if the call/meeting takes place during a block of time that calendar information specific to the user designates as not being occupied. Calendar information for the user may be stored locally or remotely and may indicate that certain time periods throughout the proposed day are occupied by various activities. Selection of the option button 2050 results in, for example, transmission of user availability data to the ICCPS 140 that indicates that the user is available to participate in the meeting/call on the proposed day at any time that is not otherwise occupied by activities per the user's calendar information. For example, the user's calendar information may indicate that the user has to give a client presentation from 9 AM-2:30 PM on Oct. 31, 2005 but is then free from 2:30 PM-6 PM. In this example, selection of the option box 2050 results in, for example, transmission of user availability data to the ICCPS 140 that indicates that the user is not available from 9 AM-2:30 PM and is available from 2:30 PM-6 PM.

Once the user has selected from among the set of availability option boxes 2010 (and manually provided additional availability information as necessary), the user may select to submit the availability option selection and information to the ICCPS 140 by selecting, for example, a submit button 2060.

In another implementation, a user is not presented with the user interface 2000 in response to receipt of a conference call invitation. Rather, the user sets up preferences that enable the call recipient computer system 165, 170 to automatically select one or more of the availability options and automatically communicate the selected option to the online service provider system 160 in response to receipt of a conference call invitation. For example, the user may select to automatically send user availability data corresponding to calendar information specific to the user in response to a conference call invitation.

Referring back to FIGS. 17A-17D, once the invitee has selected and submitted an availability option, the call recipient computer system 165, 170 sends or otherwise communicates the availability option to the online service provider system 160 (1715). In some implementations, the communicated availability option selection includes corresponding invitee availability data. The online service provider system 160 receives or is made aware of the availability option selection (1716) and sends or communicates the availability option selection to the ICCPS 140 (1717).

The ICCPS 140 receives or is made aware of the availability option selection (1718) and stores or updates the corresponding user availability data (1719). In some implementations, the ICCPS 140 monitors for receipt of availability option selections from invitees for a predetermined interval of time (one day) before designating invitees that have not responded during that interval of time as being unavailable and eliminating them from participating in both the meeting and the scheduling of the meeting. This predetermined interval of time may be specified by the inviter.

The ICCPS 140 determines whether the communicated availability option selection corresponds to accepting the proposed meeting/call time (1720). If the availability option selection does not correspond to accepting the proposed meeting/call time, process 1700 proceeds to operation 1731 (1721). If the availability option selection corresponds to accepting the proposed meeting/call time, the ICCPS 140 determines whether the stored availability data for the invitees and inviter show an overlap of availability for the inviter and all of the invitees for the proposed meeting/call time (1722).

If the stored availability data for the inviter and all of the invitees show an overlap of availability for the proposed meeting/call time, the ICCPS 140 sends or communicates confirmatory messages to all of the invitees and to the inviter indicating that the meeting/call is scheduled at the proposed meeting/call time (1723). For example, if the inviter and all of the invitees affirmatively indicate that they are available from 10 AM-11 AM on Oct. 31, 2005, then the meeting/call is scheduled and confirmatory messages are communicated. The online service provider 160 receives or is made aware of the confirmatory messages (1724) and sends or communicates the confirmatory messages and format data to computer systems associated with the invitees and with the inviter (1725). The computer systems associated with the invitees (e.g., the call recipient computer systems 165, 170) and the computer system (or phone) associated with the inviter (not shown) receive or are made aware of the confirmatory messages arid format data (1726) and enable their respective users to perceive the confirmatory messages (1727).

FIG. 21 shows an exemplary graphical user interface 2100 configured to inform a user of the successful scheduling of a meeting/call. The user interface 2100 includes a statement 2110 that informs the user that the call/meeting has been successfully scheduled at a specified time and day. In another implementation, the user interface 2100 also identifies the users that will participate in the scheduled meeting/call by, for example, displaying their associated user identifiers. In yet another implementation, the user interface 2100 enables the user to select to update their calendar information to reflect the newly scheduled meeting/call and/or setup a reminder to remind them of the newly scheduled meeting/call at some point prior to the meeting/call. Notably, the updating of calendar information is application independent in that the system may update calendar information for each user even if the users use different calendar applications. In yet another implementation, the user interface 2100 enables the user to specify that the conference call should be automatically launched and the user should automatically receive a conference call invitation at or shortly prior to the scheduled time of the call.

Referring back to FIGS. 17A-17D, if the stored availability data associated with the inviter and with all of the invitees does not indicate that the inviter and all of the invitees are available during the proposed meeting/call time, the ICCPS determines whether the availability data associated with the inviter and with all of the invitees indicate a possibility of an overlap of availability for the proposed meeting/call time (1728). If the stored availability data indicate a possibility of an overlap of availability for the inviter and all invitees for the proposed meeting/call time, process 1700 proceeds to operation 1718 to await further receipt of scheduling option selections from other invitees (1729). For example, if the proposed meeting/call time is 10 AM-11 AM on Oct. 31, 2005 and the inviter and two of three invitees have affirmatively indicated availability from 10 AM-11 AM on Oct. 31, 2005 and the third invitee has not yet provided any information about his or her availability on 10 AM-11 Am on Oct. 31, 2005, then a possibility exists that the inviter and all three invitees will be available to participate in a meeting/call from 10 AM-11 AM on Oct. 31, 2005. In such a situation, the ICCPS 140 waits to receive an availability option selection and corresponding availability data from the third invitee before determining whether or not the meeting may be scheduled at 10 AM-11 AM on Oct. 31, 2005.

If the stored availability data does not indicate a possibility of an overlap of availability for the inviter and all invitees for the proposed meeting/call time (1730), process 1700 proceeds to operation 1741. For example, if the proposed meeting/call time is 10 AM-11 AM on Oct. 31, 2005, process 1700 proceeds to operation 1741 if the inviter or any one of the invitees has affirmatively indicated that they are unavailable during that time.

If the availability option selection does not correspond to accepting the proposed meeting/call time, the ICCPS 140 determines whether the availability option selection proposes a new meeting/call time (1731). For example, the availability option selection may reject and indicate unavailability at the proposed meeting/call time of 10 AM-11 AM on Oct. 31, 2005, and may instead propose a new meeting/call time from 11 AM-12 PM on Oct. 31, 2005.

If the availability option selection corresponds to rejecting the proposed meeting/call time and proposing a new meeting/call time, the ICCPS 140 determines whether the stored availability data for the invitees and inviter show an overlap of availability for the inviter and all of the invitees for the proposed new meeting/call time (1732). If the stored availability data for the inviter and all of the invitees show an overlap of availability for the proposed new meeting/call time, the ICCPS 140 sends or communicates confirmatory messages to all of the invitees and to the inviter indicating that the meeting/call is scheduled at the proposed new meeting/call time (1733). For example, if the inviter and all of the invitees affirmatively indicate that they are available from 11 AM-12 PM on Oct. 31, 2005, then the meeting/call is scheduled and confirmatory messages are communicated. The online service provider 160 receives or is made aware of the confirmatory messages (1734) and sends or communicates the confirmatory messages and format data to computer systems associated with the invitees and with the inviter (1735). The computer systems associated with the invitees (e.g., the call recipient computer systems 165, 170) and the computer system (or phone) associated with the inviter (not shown) receive or are made aware of the confirmatory messages and format data (1736) and enable their respective users to perceive the confirmatory messages (1737).

If the stored availability data associated with the inviter and with all of the invitees does not indicate that the inviter and all of the invitees are available during the proposed new meeting/call time, the ICCPS determines whether the availability data associated with the inviter and with all of the invitees indicate a possibility of an overlap of availability for the proposed new meeting/call time (1738). If the stored availability data indicate a possibility of an overlap of availability for the inviter and all invitees for the proposed new meeting/call time, process 1700 proceeds to operation 1709 wherein new meeting/call scheduling invitations are sent to only those users (i.e., invitees and inviter) that have yet to specify availability or unavailability information for the proposed new meeting time (1739). For example, if the proposed new meeting/call time is 11 AM-12 PM on Oct. 31, 2005 and the two of three invitees have affirmatively indicated availability at 11 AM-12 PM on Oct. 31, 2005 and the inviter and the third invitee have not yet provided any information about his or her availability at 11 AM-12 PM on Oct. 31, 2005, then a possibility exists that the inviter and all three invitees will be available to participate in a meeting/call from 11 AM-12 PM on Oct. 31, 2005. In such a situation, the ICCPS 140 sends new meeting/call scheduling invitations to the inviter and the third invitee to request their availability to participate in a meeting/call at 11 AM-12 PM on Oct. 31, 2005. The ICCPS 140 waits to receive an availability option selection and corresponding availability data from the inviter and the third invitee before determining whether or not the meeting may be scheduled at 11 AM-12 PM on Oct. 31, 2005.

If the stored availability data does not indicate a possibility of an overlap of availability for the inviter and all invitees for the proposed new meeting/call time (1740), process 1700 proceeds to operation 1741. For example, if the proposed new meeting/call time is 11 AM-12 PM on Oct. 31, 2005, process 1700 proceeds to operation 1741 if the inviter or any one of the invitees has affirmatively indicated that they are unavailable during that time.

If the stored availability data does not indicate a possibility of an overlap of availability for the inviter and all invitees for the proposed meeting/call time or, if applicable, for a proposed new meeting/call time, the ICCPS 140 determines whether the availability data associated with the inviter and with all of the invitees indicate a possibility of an overlap of availability for the duration of the proposed meeting/call for the proposed day (1741). For example, if the duration of the meeting is one hour on Oct. 31, 2005, the ICCPS 140 determines whether the availability data for the inviter and invitees shows an overlap of availability for at least one hour during the day of Oct. 31, 2005.

If the stored availability data indicate an overlap of availability for the inviter and all invitees for the proposed meeting/call duration for the proposed day (limited by the start time window), the ICCPS 140 chooses the meeting start time to be the earliest or latest possible available start time during the proposed day. The choice of start time is determined based on the inviter meeting/call schedule setup option selection. The ICCPS 140 sends or communicates confirmatory messages to all of the invitees and to the inviter indicating that the meeting/call is scheduled at the chosen meeting/call time (1742). For example, if the inviter and all of the invitees affirmatively indicate that they are available from 8 AM-9 AM and from 2 PM-4 PM on Oct. 31, 2005 and the inviter selected that the start time be as late as possible, then the meeting/call is scheduled at 3 PM-4 PM and confirmatory messages are communicated.

The online service provider 160 receives or is made aware of the confirmatory messages (1743) and sends or communicates the confirmatory messages and format data to computer systems associated with the invitees and with the inviter (1744). The computer systems associated with the invitees (e.g., the call recipient computer systems 165, 170) and the computer system (or phone) associated with the inviter (not shown) receive or are made aware of the confirmatory messages and format data (1745) and enable their respective users to perceive the confirmatory messages (1746).

If the stored availability data associated with the inviter and with all of the invitees does not indicate that the inviter and all of the invitees are available for the proposed meeting/call duration during the proposed day, the ICCPS 140 determines whether the availability data associated with the inviter and with all of the invitees indicate a possibility of an overlap of availability for the proposed meeting/call duration during the proposed day (1747). If the stored availability data indicate a possibility of an overlap of availability for the inviter and all invitees for the proposed meeting/call duration during the proposed day, the ICCPS 140 chooses the proposed meeting start time to be the earliest or latest possible potential start time during the proposed day. The choice of start time is determined based on the inviter meeting/call schedule setup option selection. Process 1700 then proceeds to operation 1709 wherein new meeting/call scheduling invitations are sent to only those users (i.e., invitees and/or inviter) that have yet to specify availability or unavailability information for the chosen potential meeting time (1748). For example, if the inviter and two of the three invitees have affirmatively indicated availability from 8 AM-9 AM and from 2 PM-4 PM on Oct. 31, 2005 and the third invitee has only affirmatively indicated availability from 11 AM-12 PM, then a possibility exists that the inviter and all three invitees may be able to participate in a meeting/call that takes place anytime between 8 AM-9 AM and 2 PM-4 PM. If the inviter selected that the start time be as late as possible, the ICCPS 140 chooses the potential meeting/call time to be 3 PM-4 PM on Oct. 31, 2005. In such a situation, the ICCPS 140 sends a new meeting/call scheduling invitation to the third invitee to request his or her availability to participate in a meeting/call at 3 PM-4 PM on Oct. 31, 2005. The ICCPS 140 waits to receive an availability option selection and corresponding availability data from the third invitee before determining whether or not the meeting may be scheduled at 3 PM-4 PM on Oct. 31, 2005.

If the stored availability data does not indicate a possibility of an overlap of availability for the inviter and all invitees for the proposed meeting/call duration during the proposed day, the ICCPS 140 informs the inviter that the meeting cannot be scheduled and enables the inviter to choose to either cancel the meeting/call, reschedule the meeting/call to an alternate day and time, or proceed with scheduling the meeting/call at the current proposed time and day irrespective of whether all invitees can attend (1749). If the inviter proposes an alternative day and time, process 1700 proceeds to operation 1709 to send out new meeting/call scheduling invitations that present the proposed new alternative day and time. FIG. 22 shows an exemplary user interface 2200 that informs the inviter that the meeting/call could not be scheduled during the proposed day and enables the inviter to select to cancel the meeting/call, reschedule the meeting/call to an alternate day and time, or proceed with scheduling the meeting/call at a proposed time and day. Additionally or alternatively, the inviter may select to schedule the meeting/call at a start time during which the largest number of participants are concurrently available or during which certain inviter selected/specified participants are concurrently available.

Figure 23:
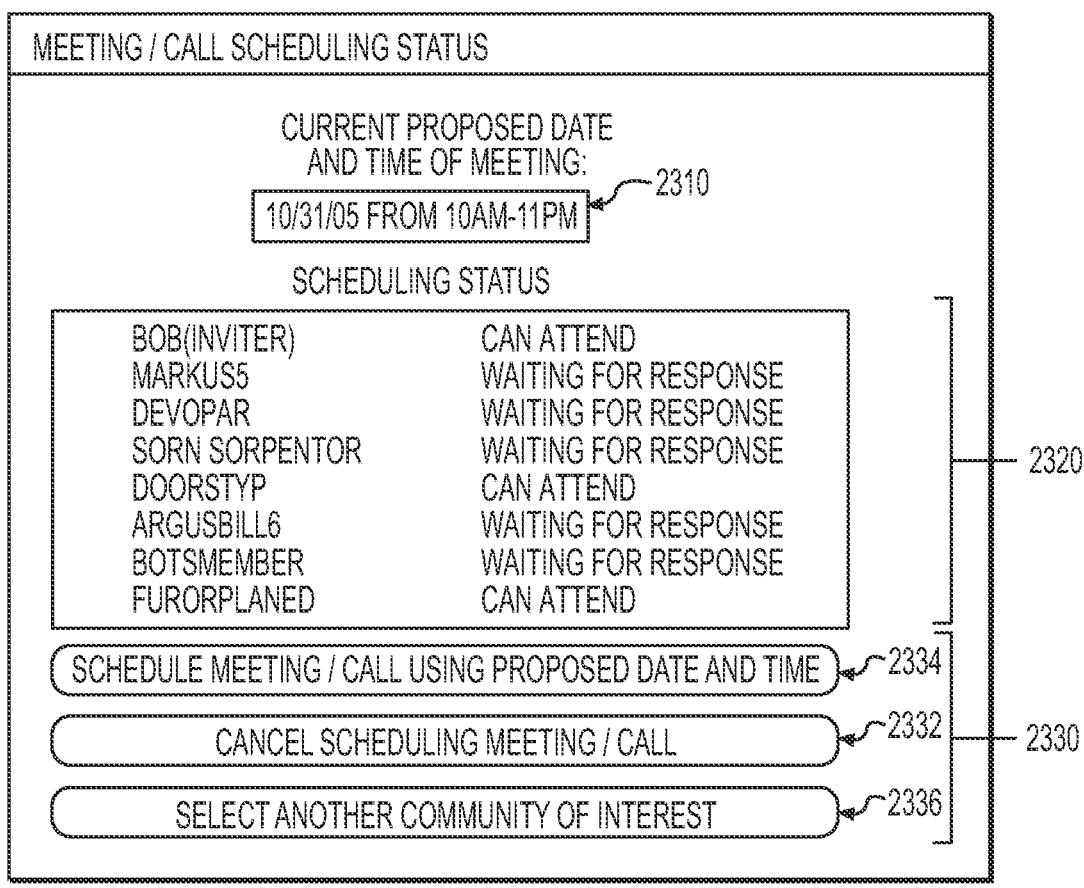
FIG. 23 illustrates an example of a user interface that shows the status of responses to meeting/call scheduling invitations.
Figure 24A:
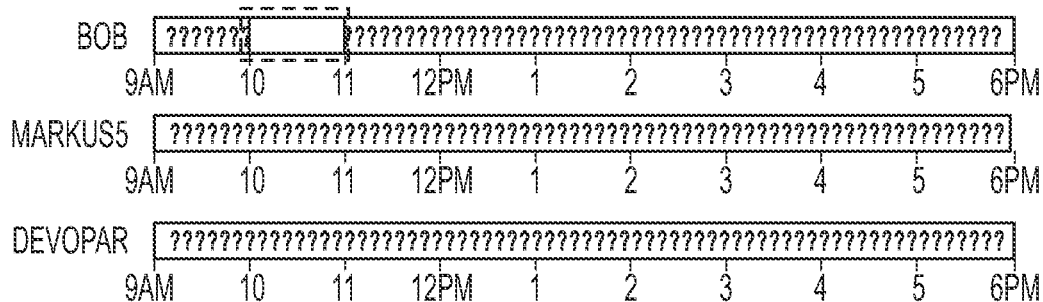
FIG. 24A-24F are graphical representations of user availability data.
Figure 24B:
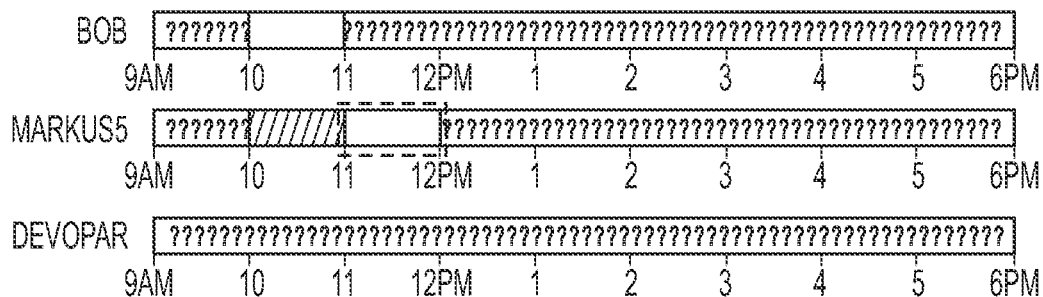
Figure 24C:
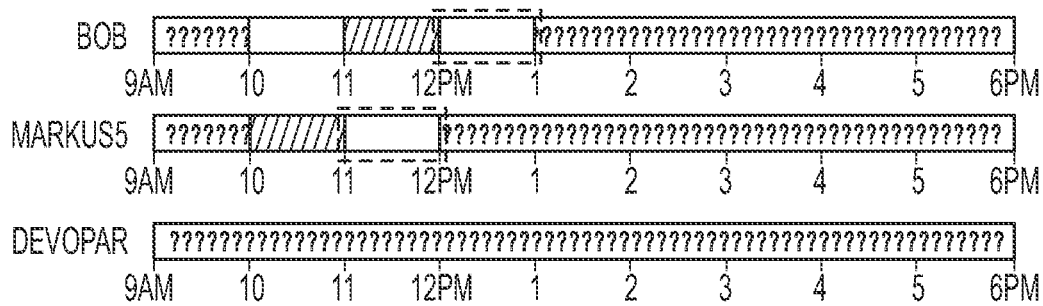
Figure 24D:
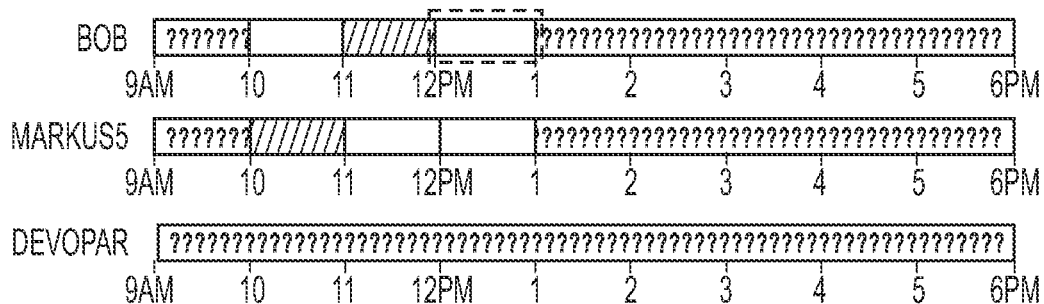
Figure 24E:
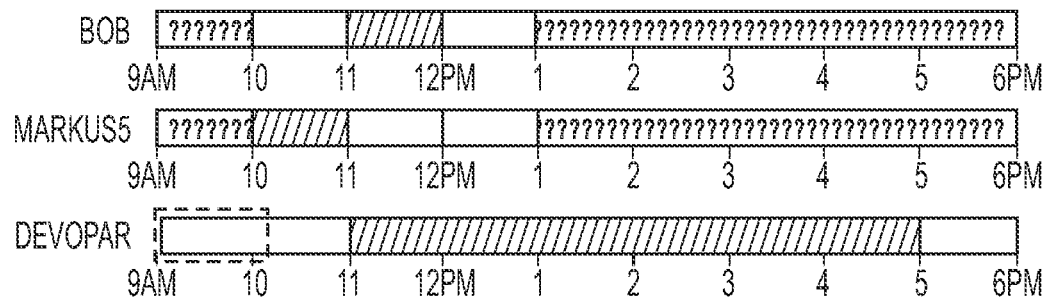
Figure 24F:
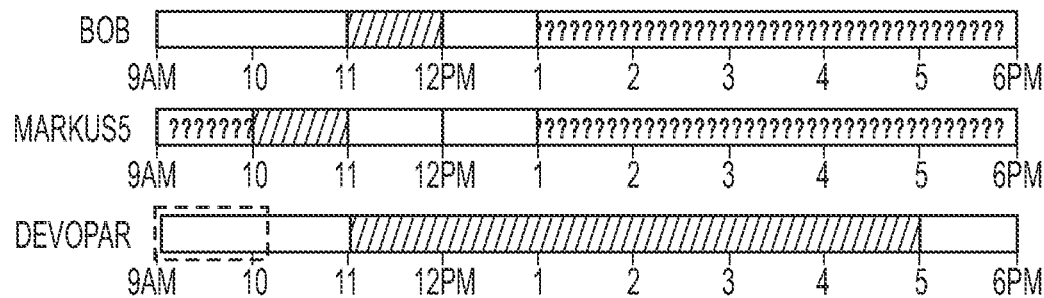

In another implementation, the ICCPS 140 periodically provides the inviter with the current status of user responses to meeting/call scheduling invitations and enables the inviter to schedule, cancel, or modify the meeting/call prior to completion of the scheduling process 1700. FIG. 23 shows an exemplary user interface 2300 that shows the status of responses to meeting/call scheduling invitations and enables the inviter to cancel or modify the scheduling process. The user interface 2300 displays a statement reflecting the current proposed meeting/call time 2310, a list of potential participants and their current response status 2320, and a set of option buttons 2330 selectable to cancel the scheduling process 2332, short-circuit the scheduling process by choosing to schedule the meeting/call at the proposed time and day (or, in some implementations, another inviter-specified time and day) irrespective of the availability of invitees 2334, and cancel the scheduling process by choosing another community of interest 2336.

FIGS. 24(*a*)-24(*f*) are graphical representations of user availability data as the data changes during an exemplary scheduling process involving an inviter identified as "Bob" and two invitees identified as "MarkUS5" and "devoPar." In setting up the meeting, Bob has indicated that the start time window is 9 AM-5 PM, the start time preference is as early as possible in the day, the duration of the meeting is one hour, the initial proposed start time is 10 AM, and the proposed day is Oct. 31, 2005 (operation 1702). Bob chose a community of interest that consists of MarkUS5 and devoPar, both of which are online and available to receive meeting scheduling invitations.

As shown in FIG. 24(*a*), when the meeting scheduling invitations are initially sent out (operation 1709), the current proposed meeting time is 10 AM-11 AM and the availability data for Bob 2402 indicate that he is available from 10 AM-11 AM. Bob did not provide any other availability data when he set up the meeting. The ICCPS 140 also does not have any availability data for MarkUS5 and devoPar at the time that the initial meeting scheduling invitations are sent out.

MarkUS5 responds to the meeting scheduling invitation by selecting an availability option that indicates that he is not available during the proposed meeting time of 10 AM-11 AM but is available if the meeting is rescheduled to 11 AM-12 PM. The ICCPS 140 receives MarkUS5's availability option selection and stores or updates his availability data in accordance with the option selection (operation 1719). The ICCPS 140 determines that the option selection does not accept the proposed meeting time (i.e., 10 AM-11 AM) (operation 1720) and offers a new proposed meeting time (i.e., 11 AM-12 PM) (operation 1731). The stored availability data at this point in the process is graphically shown in FIG. 24(*b*) and shows a possible availability overlap at 11 AM-12 PM (operation 1738). Accordingly, the ICCPS 140 sends out new meeting scheduling invitations to Bob (i.e., the inviter) and devoPar wherein they are asked to respond to a new proposed meeting time of 11 AM-12 PM (operation 1739). In this example, devoPar did not get a chance to respond to the 10 AM-11 AM meeting scheduling invitation (i.e., the meeting scheduling invitation that proposes a meeting time of 10 AM-11 AM) which is now automatically replaced by the 11 AM-12 PM meeting scheduling invitation.

Bob responds to the 11 AM-12 PM meeting scheduling invitation by selecting an availability option that indicates that he is not available during the proposed meeting time of 11 AM-12 PM but is available if the meeting is rescheduled to 12 PM-1 PM. The ICCPS 140 receives Bob's availability option selection and updates his availability data in accordance with the option selection (operation 1719). The ICCPS 140 determines that the option selection does not accept the current proposed meeting time (i.e., 11 AM-12 PM) (operation 1720) and instead offers a new proposed meeting time (i.e., 12 PM-1 PM) (operation 1731). The stored availability data at this point in the process is graphically shown in FIG. 24(*c*) and shows a possible availability overlap at 12 PM-1 PM (operation 1738). Accordingly, the ICCPS 140 sends out new meeting scheduling invitations to MarkUS5 and devoPar wherein they are asked to respond to a new proposed meeting time of 12 PM-1 PM (operation 1739). In this example, devoPar did not get a chance to respond to the 11 AM-12 PM meeting scheduling invitation which is now automatically replaced by the 12 PM-1 PM meeting scheduling invitation.

MarkUS5 responds to the 12 PM-1 PM meeting scheduling invitation by selecting an availability option that indicates that he is available during the proposed meeting time of 12 PM-1 PM. The ICCPS 140 receives MarkUS5's availability option selection and stores or updates his availability data in accordance with the option selection (operation 1719). The ICCPS 140 determines that the option selection accepts the proposed meeting time (i.e., 12 PM-1 PM) (operation 1720). The stored availability data at this point in the process is graphically shown in FIG. 24(*d*) and shows a possible availability overlap at 12 PM-1 PM (operation 1728). Accordingly, the ICCPS 140 waits on devoPar to respond to the 12 PM-1 PM meeting scheduling invitation. (operation 1729).

devoPar responds to the 12 PM-1 PM meeting scheduling invitation by selecting an availability option that indicates that he is available to meet on the proposed day if calendar information specific to him indicates that he is available. The ICCPS 140 receives devoPar's availability option selection, accesses his calendar information for the proposed day, and stores or updates his availability data in accordance with his calendar information (operation 1719). The stored availability data at this point in the process is graphically shown in FIG. 24(*e*) and shows that devoPar is available from 9 AM-11 AM, unavailable from 11 AM-5 PM, and available from 5 PM-6 PM.

The availability option selection, therefore, does not correspond to accepting the proposed meeting time of 12 PM-1 PM because the corresponding availability data does not show availability from 12 PM-1 PM (operation 1720). The availability option selection also does not correspond to proposing a new meeting time since no such new meeting time was specifically proposed by devoPar (operation 1731). The ICCPS 140, therefore, determines whether the stored availability data shows an overlap of availability for Bob, MarkUS5, and devoPar for the one hour duration of the meeting (operation 1741). As shown in FIG. 24(*e*), no such availability overlap exists. The ICCPS 140 then determines whether the stored availability data shows the possibility of an overlap of availability for Bob, MarkUS5, and devoPar for the one hour duration of the meeting (operation 1747). As shown in FIG. 24(*e*), a possible overlap exists from 9 AM-10 AM and from 5 PM-6 PM. The ICCPS 140 chooses 9 AM-10 AM as the new proposed meeting time per the setup option selected by Bob and sends out new corresponding meeting scheduling invitations to Bob and MarkUS5 (operation 1748).

MarkUS5 responds to the 9 AM-10 AM meeting scheduling invitation by selecting an availability option that indicates that he is available during the proposed meeting time of 9 AM-10 AM. The ICCPS 140 receives MarkUS5's availability option selection and stores or updates his availability data in accordance with the option selection (operation 1719). The ICCPS 140 determines that the option selection accepts the proposed meeting time (i.e., 9 AM-10 AM) (operation 1720). The stored availability data at this point in the process is graphically shown in FIG. 24(*f*) and shows a possible availability overlap at 9 AM-10 AM (operation 1728). Accordingly, the ICCPS 140 waits on Bob to respond to the 9 AM-10 AM meeting scheduling invitation. (operation 1729).

Bob responds to the 9 AM-10 AM meeting scheduling invitation by selecting an availability option that indicates that he is available during the proposed meeting time of 9 AM-10 AM. The ICCPS 140 receives Bob's availability option selection and stores or updates his availability data in accordance with the option selection (operation 1719). The ICCPS 140 determines that the option selection accepts the proposed meeting time (i.e., 9 AM-10 AM) (operation 1720). The stored availability data at this point in the process is graphically shown in FIG. 24(*g*) and shows an availability overlap at 9 AM-10 AM (operation 1722). Accordingly, the ICCPS 140 sends out confirmatory messages to Bob, MarkUS5, and devoPar indicating that the meeting has been successfully scheduled for 9 AM-10 AM on Oct. 31, 2005 (operations 1723-1727).

In some implementations, the availability data for users may be setup prior to any call or meeting scheduling and in lieu of responding to meeting/call scheduling invitations. In these implementations, the availability data is setup as a preference selection that may vary, for example, by inviter or by community of interest. For example, some invitees may indicate beforehand that they are always available or unavailable to participate in meetings/calls from certain inviters or that involve certain communities of interest. Additionally or alternatively, they may indicate that they are always available if their calendar permits to participate in meetings/calls from certain inviters or that involve certain communities of interest (or invitees).

A number of implementations have been described. Nevertheless, it will be understood that various modifications may be made. For example, the systems and processes refer to a voice path and a signaling channel with respect to the telephone network 130. In some implementations, the voice path and the signaling channel are separated (i.e., out-of-band signaling). In other implementations, the voice path and the signaling channel are integrated into one channel (i.e., in-band signaling) that handles the transmission of audio data as well as the transmission of call handling data.

Figure 7:
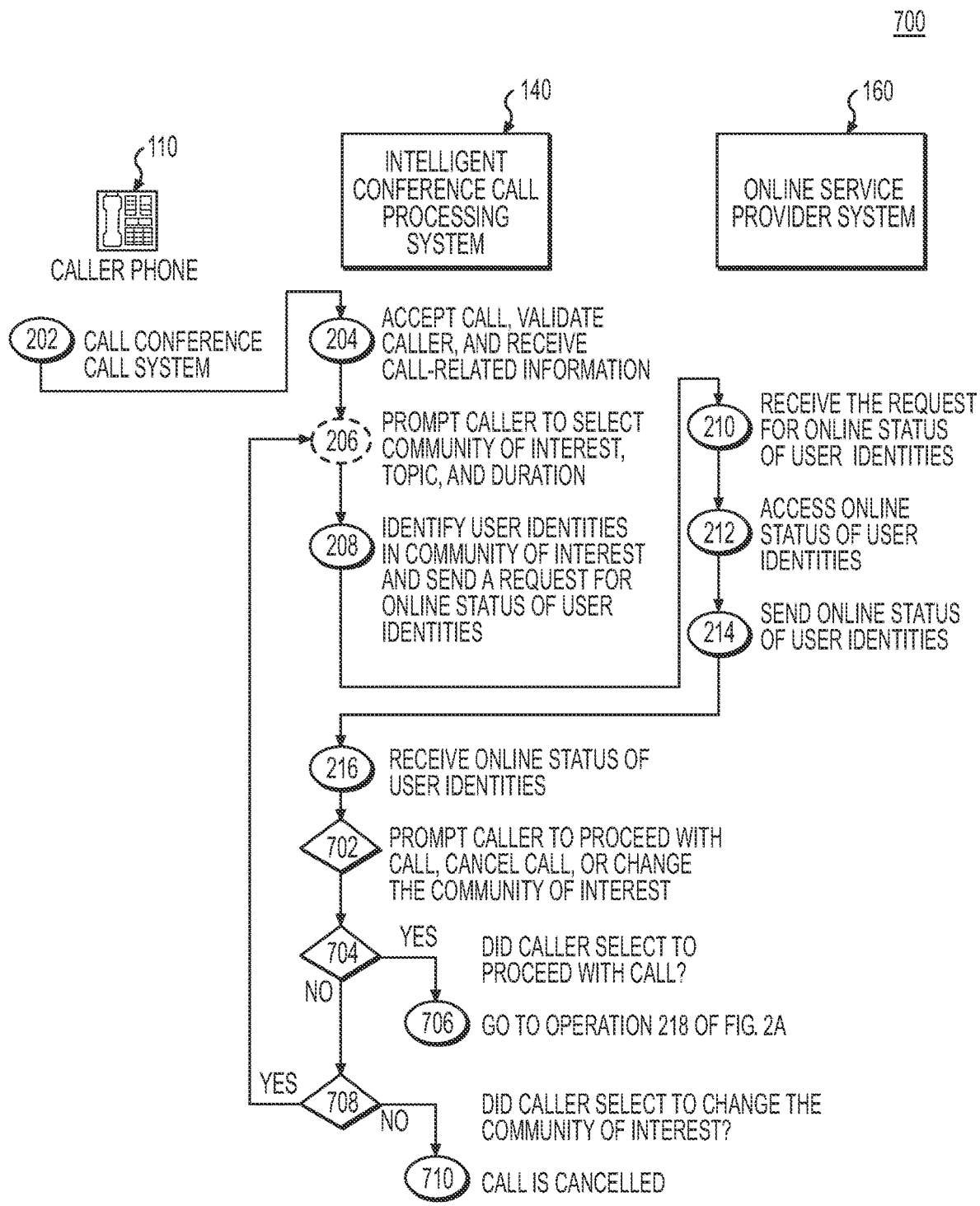
FIG. 7 is a flow chart illustrating a process for initiating a conference call using an electronic messaging interface.
Figure 8:
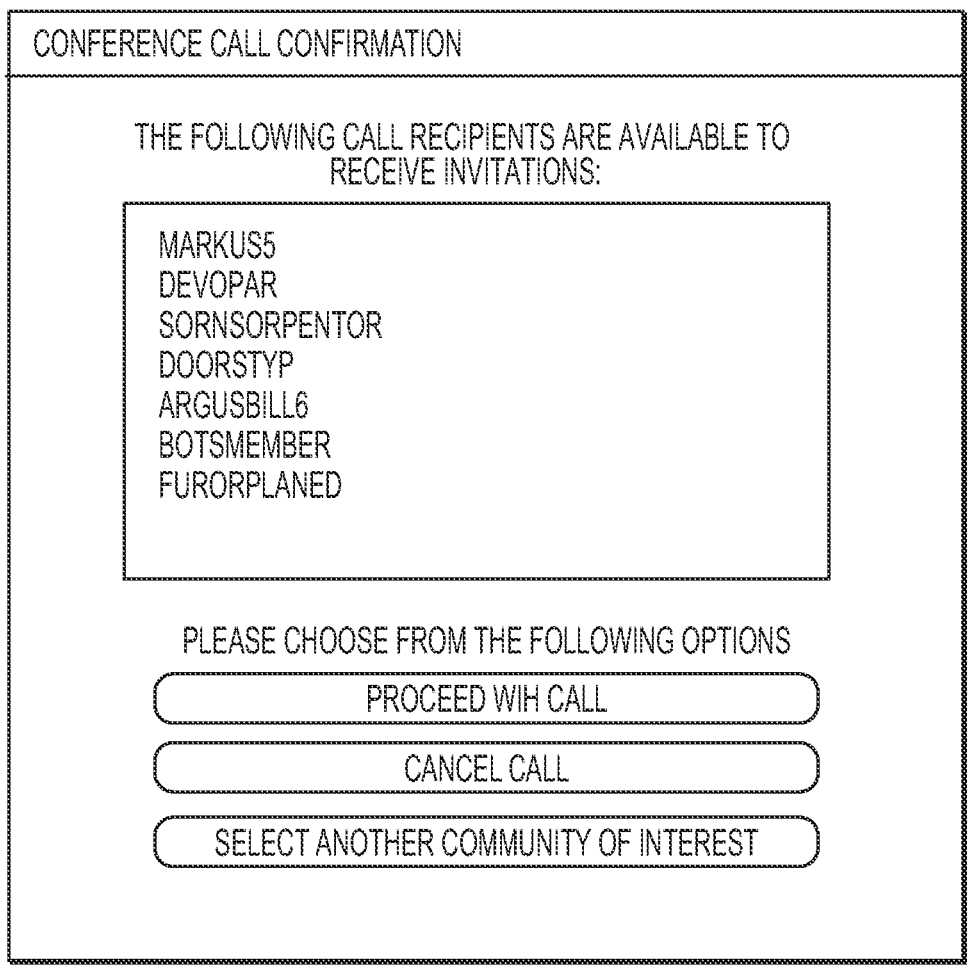
FIG. 8 illustrates an example of a user interface presented to a user that initiates a conference call.

Prior to sending call notification messages, the ICCPS 140, 340 may send a message to the caller telephone device 110 that informs the caller of the online status of the call recipients in the community of interest that was identified by the caller. The ICCPS 140, 340 may give the caller the option to proceed with the conference call, cancel the conference call, or select another community of interest. If the caller selects to proceed with the conference call, then the ICCPS 140, 340 may send out call notification messages as discussed above. FIG. 7 shows a process 700 that includes the operations of the process 200 but with the additional operations 702-710 that enable the above-described functions. FIG. 8 shows a user interface 800 that informs the caller of the online status of the call recipients in the community of interest and prompts the caller to select from among a set of option buttons to proceed with the conference call, cancel the conference call, or select another community of interest.

In another implementation, the ICCPS 140, 340 may request the online status of user identities associated with the communities of interest from which the caller may select prior to prompting the caller to select or identify a community of interest. The pool of potential communities of interest or call recipients from which the caller may select may be reduced based on the determined online status of the identities associated with the communities of interest. For example, if no user identities in a give community of interest are online, then the caller is not allowed to select that community of interest.

Instead of making outbound calls (operation 258 in process 200 and operations 466-469 of process 400), the ICCPS 140, 340 may send connection telephone numbers (and pass code identities) to the call recipient computer systems 165, 170 associated with the call recipients that choose to participate in the call. The call recipient computer systems 165, 170 may display the connection telephone numbers (and pass code identity), and the call recipients may use the connection telephone numbers to call into the ICCPS 140, 340 and to join the conference call (by inputting the pass code identity). Sending connection telephone numbers (and pass code identities) may replace placing outbound calls for one or more of the call recipients.

FIG. 9 shows a user interface 900 that provides the call recipient with a connection telephone number and a pass code identity usable by the call recipient to participate in the conference call. User interface 900 also may inform the call recipient of the amount of time that the conference call has been in progress and the expected duration of the conference call. Alternatively, the ICCPS 140, 340 may send connection telephone numbers (and pass code identities) regardless of whether the call recipient has chosen to participate in the call. The call recipient may use the connection telephone number to call the ICCPS 140, 340 and thereby accept the call via the act of calling in.

FIG. 10 shows a user interface 1000 similar to the user interface 900 but directed to a call recipient that has chosen not to participate in the conference call.

In yet another implementation, the conference call connection options may include an option to access the conference call by dialing into the conference call manually. Upon selecting this option, a connection telephone number is displayed that may be used by the call recipient to dial into the ICCPS 140, 340. FIG. 11 shows a user interface 1100 that is similar to the user interface 500 but with an additional call connection option to join the conference call by manually dialing in.

The conference call participation options may include an option to record the conference call. Selecting the option to record the conference call results in the message transfer point 344 instructing the IVRS 342 to establish a unidirectional voice path with the conference call system 348. The IVRS 342 receives the audio of the conference call through the unidirectional voice path and records the conference call as an audio file. The IVRS 342 sends the audio file to the message transfer point 344. The message transfer point 344 accesses the e-mail address of the potential call recipient that selected to record the conference call. The e-mail address of the potential call recipient may be stored as additional contact information in the community data records. The message transfer point 344 may access the e-mail address by, for example, accessing the community data records stored in the configuration data store 346. The message transfer point 344 may then send the audio file containing the conference call recording as an attachment to an e-mail sent to the corresponding e-mail address. The message transfer point 344 also may send an updated call notification message to all of the participants to inform them that the conference call is or will be recorded.

In another implementation, when a potential call recipient selects the option to take the conference call, the potential call recipient may be prompted to input a telephone number to which the outbound call will be placed by the ICCPS 140, 340. The potential call recipient may then join the conference call by answering the outbound call placed to that specified telephone number.

In yet another implementation, the potential call recipients may select and submit audio messages that are queued up by the IVRS 342 and played to the participants at the start of the conference call. The audio message may be predetermined and stored in an audio file at the call recipient computer system 365, 370. Additionally or alternatively, the audio message may be spoken by the potential call recipient and recorded in an audio file by the call recipient computer system 365, 370. The audio file may then be sent to the message transfer point 344 as part of the option selection of the potential call recipient. Additionally or alternatively, the option selection may include a pointer to the audio file which is stored in a data store communicatively coupled to the message transfer point 344. The message transfer point 344 receives or otherwise accesses the audio file and sends it or makes it available to the IVRS 344. The IVRS 344 queues up any audio files received from message transfer point 344 and establishes a unidirectional voice path with the conference call system 348. Once the conference call is initiated, the IVRS 344 may inform the participants of the number of audio messages sent by the potential call recipients and may then convert each audio file to audio and play sequentially or otherwise the audio to the participants of the conference call.

In another implementation, the caller telephone device 110, 310 may be a data telephone and may call the ICCPS 140, 340 over the data network 150 or over the Internet 350. The telephony gateway in the ICCPS 140 may encode and decode voice data packets as necessary to enable the ICCPS 140, 340 to provide the same functionality as described above.

The call notification user interface and the call recipient computer systems 165, 170 may allow a call recipient to send text messages irrespective of whether the call recipient has selected a call participation option. In this implementation, the text message is unbundled from the conference call option selection of the call recipient and enables the call recipient to exchange communications (e.g., chat) with other call recipients prior to or subsequent to selecting to participate in the call. The communication exchange may be in a separate standalone window (e.g., a chat window) or may be presented to the other call recipients by the updated call notification message (e.g., in the status section of a call notification window or in the conference call participant status window). This communication by text messages may be implemented in a manner similar to that used for establishing chat rooms or for establishing multi-user Instant Messaging sessions. For example, the text messages sent by the call recipients may be shown in the message column 650 and may be dynamically updated as new text messages are sent. In contrast, the entries in the status column 640 change only when the call recipient has selected a call participation option. FIG. 12 shows a user interface 1200 similar to the user interface 600 but with an additional stand-alone chat window.

Figure 13:
FIG. 13 illustrates an example of a user interface presented to a user that enable the user to send a message to other conference call invitees.

Alternatively, the text messages may be sent to the caller and/or to one or more of the other call recipients as e-mails or as instant messages. For example, when a call recipient selects to not participate in a conference call, the call notification user interface and the call recipient computer systems 165, 170 may enable the recipient to send an instant message or an e-mail to the caller and/or to the other call recipients. The e-mail or instant message may explain why the call recipient is not able to participate in the conference call and optionally when the call recipient will be available. FIG. 13 shows a user interface 1300 similar to the user interface 550 but with the options to send the message as an e-mail or as an instant message.

An updated call notification message also may be sent to a caller computer system (not shown). The caller computer system may be a stand-alone system or may be integrated with the caller telephone device 110 as a single computer system. Upon receiving the updated call notification message, the caller computer system may enable the caller to perceive a conference call participant status window. FIG. 14 shows a user interface 1400 that enables the caller to cancel or reschedule the conference call and to view the conference call participant status. The user interface 1400 also enables the caller to send text messages to the other call recipients. For example, the caller may use the interface 1400 to send a text message to the call recipients to inform them that the conference call is going to be rescheduled due to, for example, the unavailability of certain call recipients and then may select the option in the user interface 1400 to cancel the conference call. The user interface 1400 allows this exchange of text messages via a chat window.

In another implementation, a conference call may be scheduled using a call waiting interface as described in U.S. application Ser. No. 10/895,389, filed on Jul. 21, 2004, and titled CONFERENCE CALLS VIA AN INTELLIGENT CALL WAITING INTERFACE, hereby incorporated by reference. In this implementation, a caller may choose to schedule a conference call rather than proceed with a conference call upon being notified that less than all of the call recipients are available to take the call or, alternatively, certain specified call recipients are unavailable to take the call.

Accordingly, other implementations are within the scope of the following claims.

What is claimed is:

1. A computer-implemented method for electronically scheduling an online meeting, the method comprising:

receiving one or more requests from one or more users requesting to be associated with a first group of users;

in response to the one or more requests, associating the one or more users with the first group by linking a profile or identifier of each of the users with a profile or identifier of the first group;

receiving a meeting request from a first user device of a first user associated with the first group, the meeting request including meeting setup information and identity information of the first user, the setup information including participation limited to the one or more users associated with the first group, the one or more users associated with the first group including a second user and a third user;

receiving indication of a selected media file from the first user device of the first user, the selected media file configured to be played during the meeting;

determining whether the second user and the third user are associated with the first group;

based on determining that the second and third user are associated with the first group, transmitting an invitation to a second user device of the second user and a third user device of the third user, the invitation including one or more connection options;

determining whether one of the second user and the third user are online awaiting participation in the meeting;

based on determining that at least one of the second user and the third user is online awaiting participation in the meeting, connecting the at least one of the second user and the third user by the one or more connection options; and transmitting the selected media file to at least one of the second user device and the third user device to play during the meeting.

2. The computer-implemented of claim 1, further comprising:

wherein the selected media file includes an audio message.

3. The method of claim 1, wherein the meeting setup information includes a topic of the meeting or a location of the meeting.

4. The method of claim 1, wherein the meeting setup information includes a meeting duration.

5. The method of claim 1, further comprises:
   transmitting a pounce signal in order to determine whether one of the second user and the third user that are online and available.

6. The method of claim 1, wherein a second proposed meeting start time is determined by identifying a start time in the range of potential meeting start times during which one or more of the second user and the third user have not indicated unavailability to participate in the meeting.

7. The method of claim 6, wherein:
   the second proposed meeting start time is determined by identifying multiple potential start times in the range of potential meeting start times during which the one or more of the second user and the third user have not indicated unavailability to participate in the meeting; and
   identifying the second proposed meeting start time from among the multiple potential start times based on the preferences specified by the initiating user.

8. A system for electronically scheduling an online meeting, the system comprising:
   a storage device that stores a set of instructions and at least one processor that is configured to execute the set of instructions for:
   receiving one or more requests from one or more users requesting to be associated with a first group of users;
   in response to the one or more requests, associating the one or more users with the first group by linking a profile or identifier of each of the users with a profile or identifier of the first group;
   receiving a meeting request from a first user device of a first user associated with the first group, the meeting request including meeting setup information and identity information of the first user, the setup information including participation limited to the one or more users associated with the first group, the one or more users associated with the first group including a second user and a third user;
   receiving indication of a selected media file from the first user device of the first user, the selected media file configured to be played during the meeting;
   determining whether the second user and the third user are associated with the first group;
   based on determining that the second and third user are associated with the first group, transmitting an invitation to a second user device of the second user and a third user device of the third user, the invitation including one or more connection options;
   determining whether one of the second user and the third user are online awaiting participation in the meeting;
   based on determining that at least one of the second user and the third user is online awaiting participation in the meeting, connecting the at least one of the second user and the third user by the one or more connection option; and
   transmitting the selected media file to at least one of the second user device and the third user device to play during the meeting.

9. The system of claim 8, wherein the processor is further configured for:
   wherein the selected media file includes an audio message.

10. The system of claim 8, wherein the meeting setup information includes a topic of the meeting or a location of the meeting.

11. The system of claim 8, wherein the meeting setup information includes a meeting duration.

12. The system of claim 8, wherein the processor is further configured for:
    transmitting a pounce signal in order to determine whether one of the second user and the third user that are online and available.

13. The system of claim 8, wherein a second proposed meeting start time is determined by identifying a start time in the range of potential meeting start times during which one or more of the second user and the third user have not indicated unavailability to participate in the meeting.

14. The system of claim 13, wherein:
    the second proposed meeting start time is determined by identifying multiple potential start times in the range of potential meeting start times during which the one or more of the second user and the third user have not indicated unavailability to participate in the meeting; and
    identifying the second proposed meeting start time from among the multiple potential start times based on the preferences specified by the initiating user.

15. A non-transitory computer readable medium encoded with instructions, which when executed by at least one processor, cause the processor to perform operations comprising:
    receiving one or more requests from one or more users requesting to be associated with a first group of users;
    in response to the one or more requests, associating the one or more users with the first group by linking a profile or identifier of each of the users with a profile or identifier of the first group;
    receiving a meeting request from a first user device of a first user associated with the first group, the meeting request including meeting setup information and identity information of the first user, the setup information including participation limited to the one or more users associated with the first group, the one or more users associated with the first group including a second user and a third user;
    receiving indication of a selected media file from the first user device of the first user, the selected media file configured to be played during the meeting;
    determining whether the second user and the third user are associated with the first group;
    based on determining that the second and third user are associated with the first group, transmitting an invitation to a second user device of the second user and a third user device of the third user, the invitation including one or more connection options;
    determining whether one of the second user and the third user are online awaiting participation in the meeting;
    based on determining that at least one of the second user and the third user is online awaiting participation in the meeting, connecting the at least one of the second user and the third user by the one or more connection options; and
    transmitting the selected media file to at least one of the second user device and the third user device to play during the meeting.

16. The non-transitory computer-readable medium of claim 15, further comprising:

receiving, from one or more of the second user and the third user, a selection or submission of a recorded audio message configured to be queued and played during the multiple party meeting.

17. The non-transitory computer-readable medium of claim 15, wherein the meeting setup information includes a topic of the meeting or a location of the meeting.

18. The non-transitory computer-readable medium of claim 15, wherein the meeting setup information includes the first proposed meeting schedule that includes a meeting duration.

19. The non-transitory computer-readable medium of claim 15, further comprises:
   transmitting a pounce signal in order to determine whether one of the second user and the third user that are online and available.

20. The non-transitory computer-readable medium of claim 15, wherein a second proposed meeting start time is determined by identifying a start time in the range of potential meeting start times during which one or more of the second user and the third user have not indicated unavailability to participate in the meeting.

\* \* \* \* \*